(12) United States Patent
Akenine-Möller et al.

(10) Patent No.: US 8,644,627 B2
(45) Date of Patent: Feb. 4, 2014

(54) USING RESOLUTION NUMBERS TO DETERMINE ADDITIONAL COMPONENT VALUES

(71) Applicant: Telefonaktiebolaget L M Ericsson, Stockholm (SE)

(72) Inventors: Tomas Akenine-Möller, Lund (SE); Jacob Munkberg, Malmö (SE); Petrik Clarberg, Lund (SE); Jon Hasselgren, Bunkeflostrand (SE); Jacob Ström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/747,793

(22) Filed: Jan. 23, 2013

(65) Prior Publication Data
US 2013/0251276 A1  Sep. 26, 2013

Related U.S. Application Data

(62) Division of application No. 12/161,851, filed as application No. PCT/SE2007/000053 on Jan. 22, 2007, now Pat. No. 8,369,629.

(60) Provisional application No. 60/760,934, filed on Jan. 23, 2006, provisional application No. 60/855,748, filed on Nov. 1, 2006.

(51) Int. Cl.
*G06K 9/36* (2006.01)
*G06K 9/00* (2006.01)

(52) U.S. Cl.
USPC ........... 382/232; 382/235; 382/251; 382/166; 382/238; 382/162

(58) Field of Classification Search
None
See application file for complete search history.

(56) References Cited

U.S. PATENT DOCUMENTS 5,049,990 A * 9/1991 Kondo et al. ............ 375/240.24
5,148,271 A   9/1992 Kato et al.
(Continued)

FOREIGN PATENT DOCUMENTS

WO  2005/059839 A1  6/2005
WO  2006/006915     1/2006
WO  2006/210178     9/2006
(Continued)

OTHER PUBLICATIONS

International Search Report for PCT/SE2007/000053, mailed Jun. 27, 2007.
(Continued)

*Primary Examiner* — David Zarka
*Assistant Examiner* — Ha Le
(74) *Attorney, Agent, or Firm* — Nixon & Vanderhye, P.C.

(57) ABSTRACT

First and second codewords are determined, based on first feature vector components of the image elements in an image block, as representations of a first and second component value. Third and fourth codewords are determined, based on second vector components, as representations of a third and fourth component value. First $N_1$ and second $N_2$ resolution numbers are selected based on the relation of a distribution of the first vector components and a distribution of the second vector components. $N_1$ additional component values are generated based on the first and second component values and $N_2$ additional component values are generated based on the third and fourth component values. Component indices indicative of the generated component values are then provided for the different image elements.

17 Claims, 19 Drawing Sheets

(56) References Cited

U.S. PATENT DOCUMENTS

| | | | |
|---|---|---|---|
| 5,327,502 A * | 7/1994 | Katata et al. | 382/239 |
| 5,703,652 A * | 12/1997 | Kondo et al. | 375/240.24 |
| 5,956,431 A | 9/1999 | Iourcha et al. | |
| 6,658,146 B1 | 12/2003 | Iourcha et al. | |
| 6,683,978 B1 | 1/2004 | Iourcha et al. | |
| 7,155,057 B2 | 12/2006 | Kondo | |
| 7,573,508 B1 * | 8/2009 | Kondo et al. | 348/224.1 |
| 7,945,102 B2 * | 5/2011 | Kondo | 382/232 |
| 2005/0286780 A1 | 12/2005 | Takahashi et al. | |

FOREIGN PATENT DOCUMENTS

| | | |
|---|---|---|
| WO | 2006/126949 | 11/2006 |
| WO | 2007/021227 A1 | 2/2007 |

OTHER PUBLICATIONS

Written Opinion of the International Searching Authority, mailed Jun. 27, 2007.

http://www.ati.com/products/radeonx800/3DcWhitePaper.pdf ATI. TM. Radeon.TM. X800 3Dc.TM. White Paper.

Munkberg et al, "High-Quality Normal Map Compression", Graphics Hardware (2006), ACM Press, pp. 96-101.

Strom et al, "iPACKMAN: High Quality, Low Complexity Texture Compression for Mobile Phones", Graphics Hardware (2005), ACM Press, pp. 63-70.

Pettersson et al, "Texture Compression: THUMB—Two Hues Using Modified Brightness". Proceedings of Sigrad, Lund, (2005) pp. 7-12.

* cited by examiner

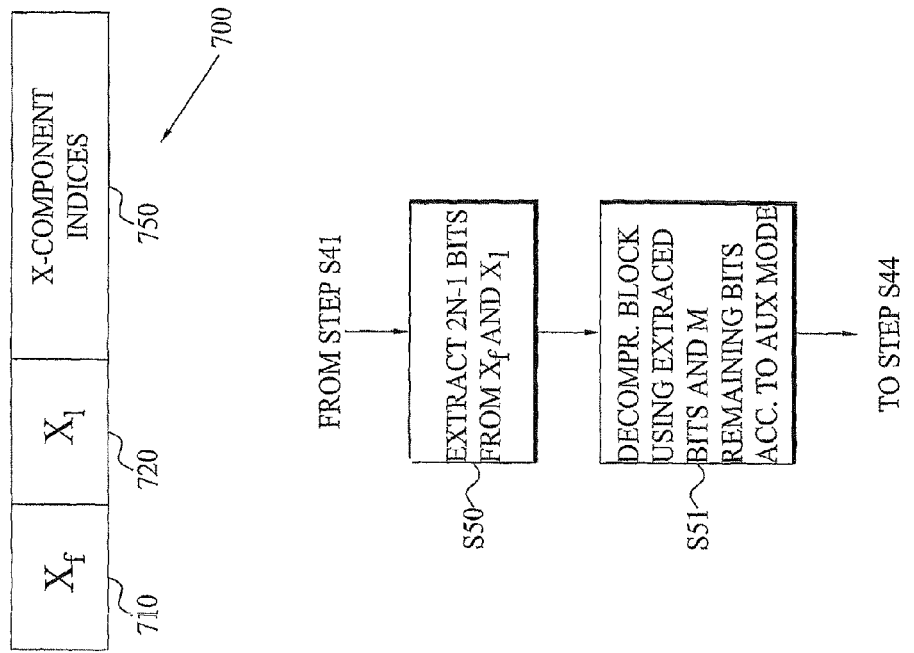
Fig. 23
Fig. 24
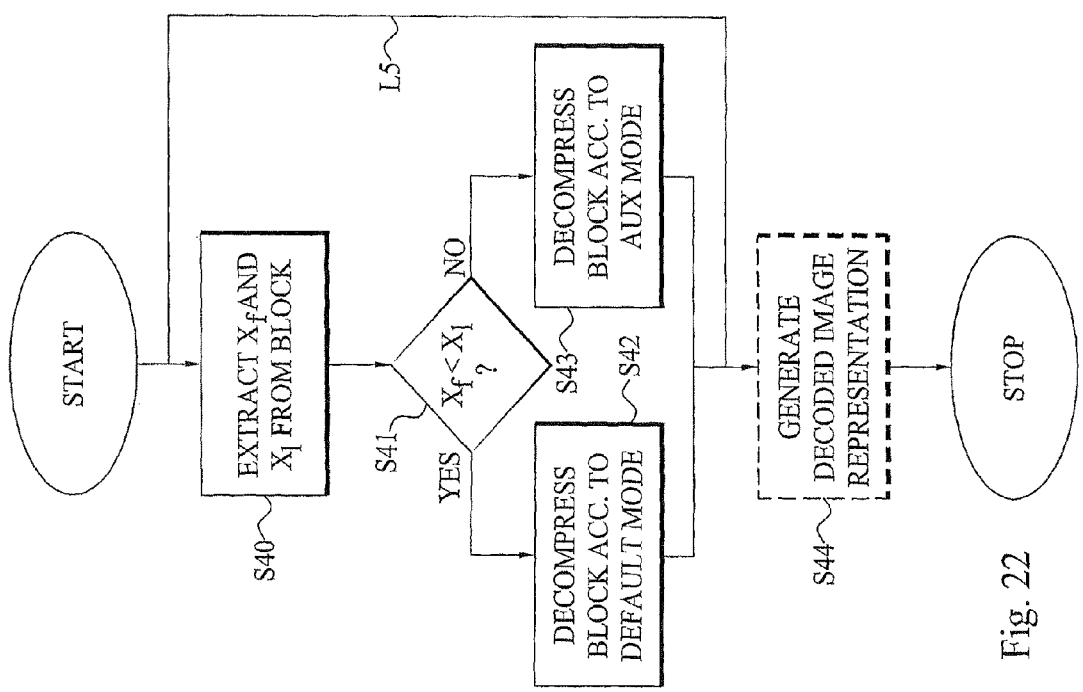
Fig. 22

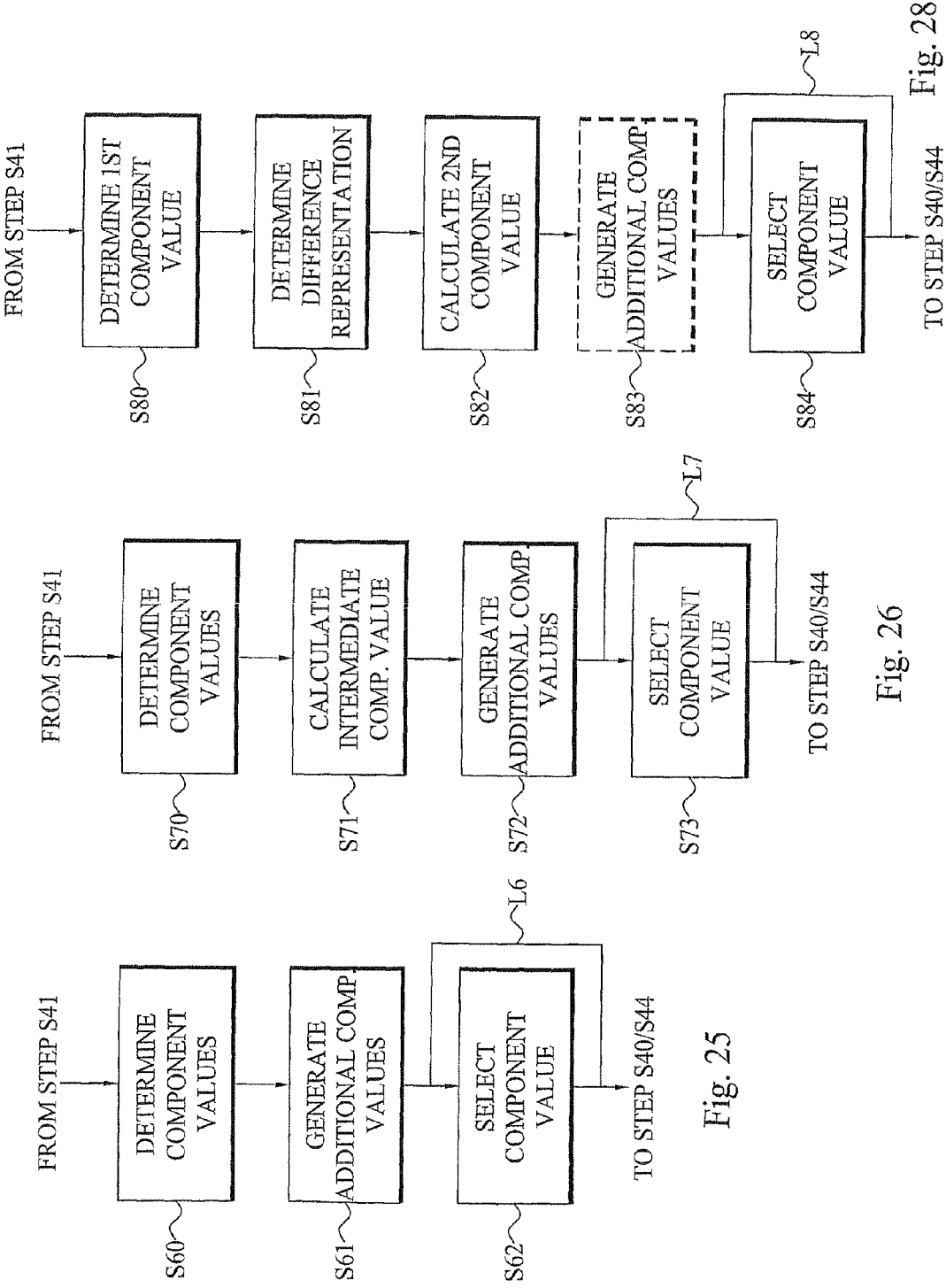

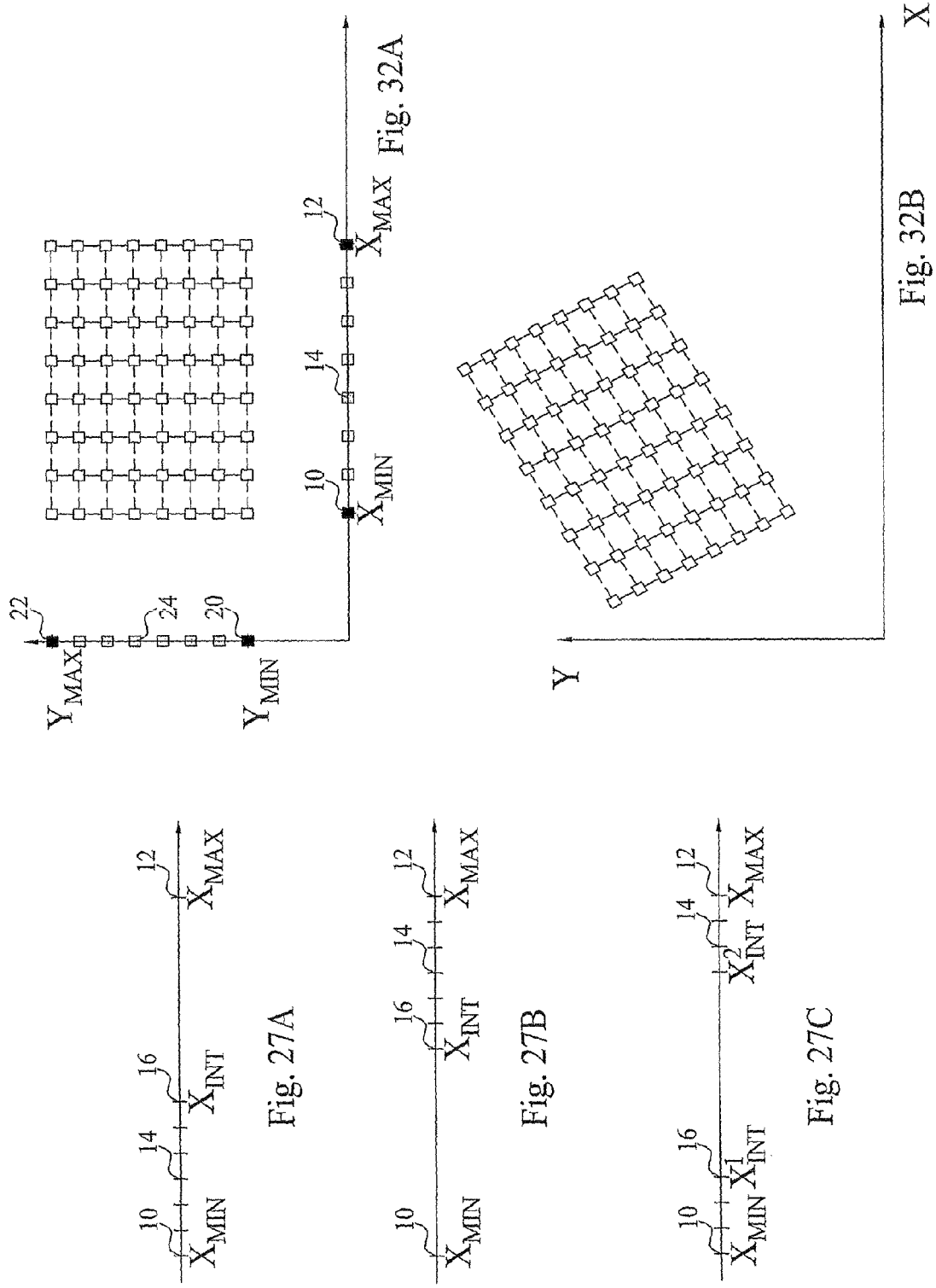

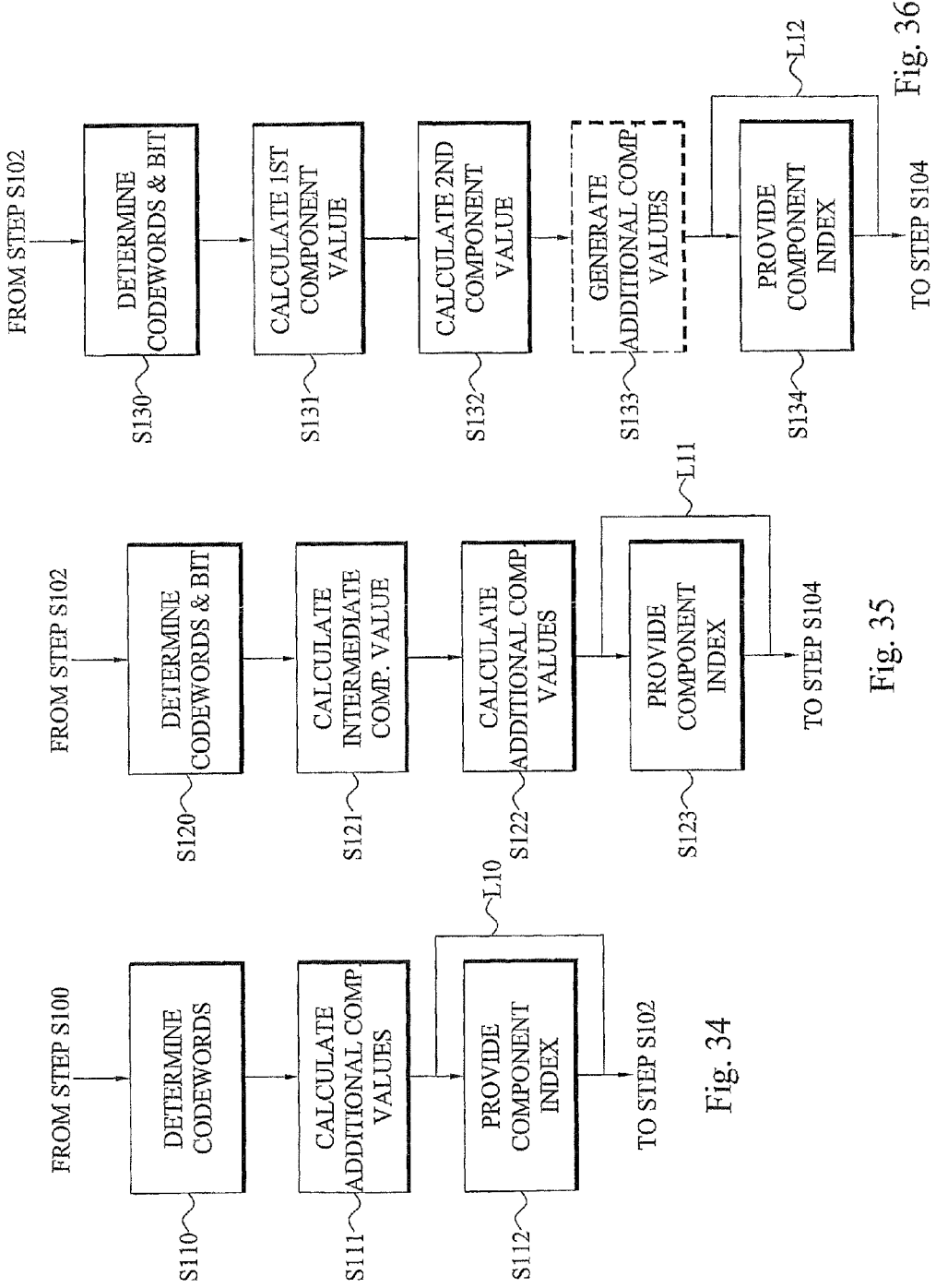

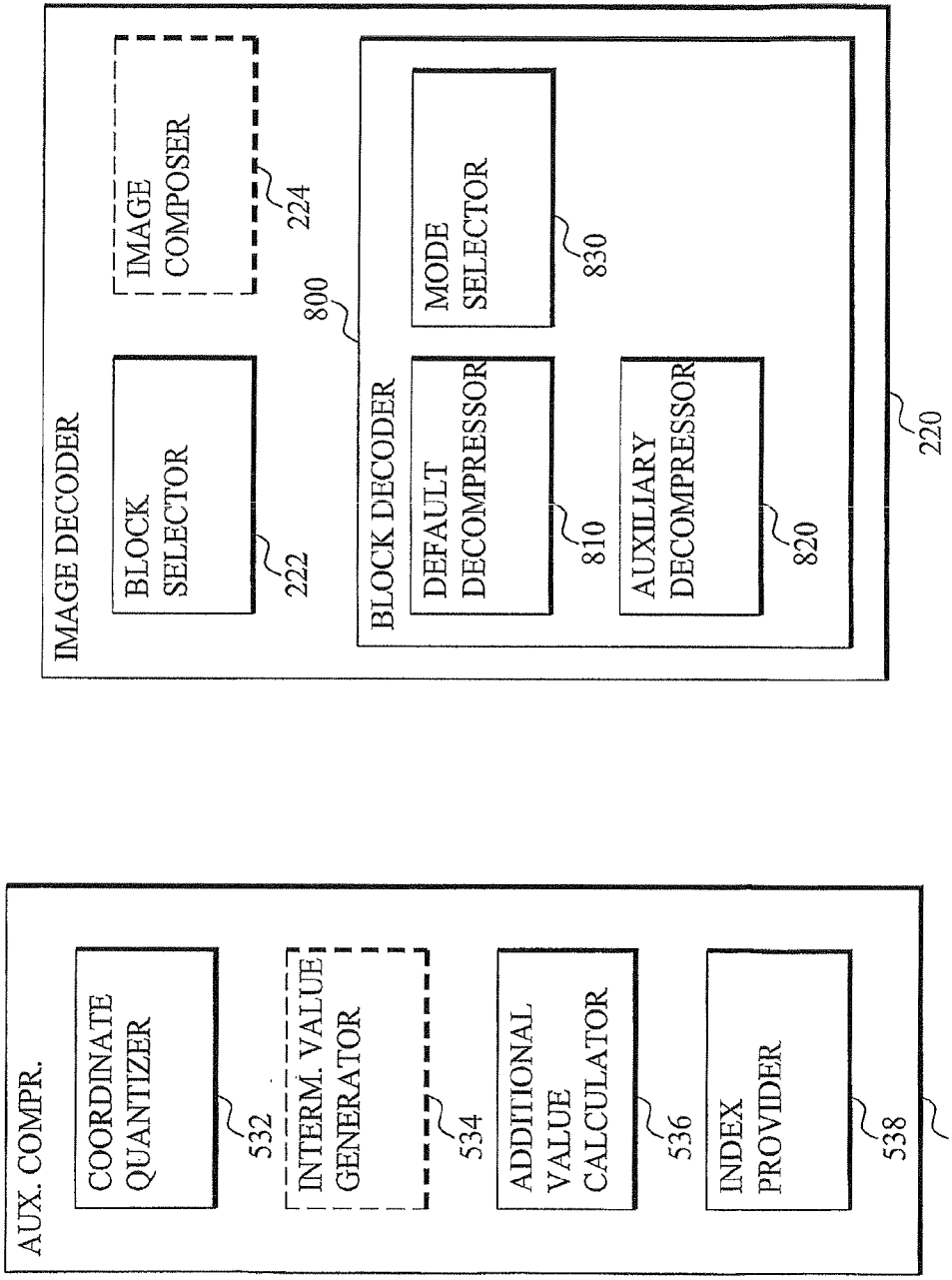

USING RESOLUTION NUMBERS TO DETERMINE ADDITIONAL COMPONENT VALUES

This application is a divisional application of U.S. patent application Ser. No. 12/161,851 filed Jul. 23, 2008, which is the U.S. national phase of International Application No. PCT/SE2007/000053 filed 22 Jan. 2007 which designated the U.S. and claims the benefit of U.S. Provisional Application Nos. 60/760,934, filed 23 Jan. 2006, and 60/855,748, filed 1 Nov. 2006, the entire contents of each of which are hereby incorporated by reference.

TECHNICAL FIELD

The technology disclosed herein generally refers to image processing, and in particular to methods and systems for encoding and decoding images.

BACKGROUND

The real-time rendering of three-dimensional graphics has a number of appealing applications on mobile terminals, including games, man-machine interfaces, messaging and m-commerce. Since three-dimensional rendering is a computationally expensive task, dedicated hardware must often be built to reach sufficient performance Innovative ways of lowering the complexity and bandwidth usage of this hardware architecture are thus of great importance.

The main bottleneck, especially for mobile phones, is memory bandwidth. A common technique for reducing memory bandwidth usage is texture compression. Texturing refers to the process of "gluing" images (here called textures) onto the rendered triangles. If the textures are compressed in memory, and then during accessing they are decompressed, a significant amount of bandwidth usage can be avoided.

Most texture compression schemes are concentrating on image-type data, such as photographs. However, with the advent of programmable shaders, textures have started to be used for many other types of data than just traditional photographic images. Bump mapping has therefore become a widespread technique which adds the illusion of detail to geometrical objects in an inexpensive way. More specifically, a texture, called a bump map or normal map, is used at each pixel to perturb the surface normal. A common approach to generate normal maps is to start with a high polygon count model and create a low complexity model using some geometrical simplification algorithm. The "difference" between these two models is then "baked" into a normal. For real-time rendering, the normal map is applied to the low complexity model, giving it a more detailed appearance. For instance, the document [1] shows how it is possible to go from a very high triangle-count model (15 000 polygons) to a very low one (1 000 polygons) with preserved quality by using normal maps.

To be able to use lower polygon-count models is of course very attractive for mobile devices, since they have lower computational performance than PC systems.

However, one problem is that the texture compression methods available are created with photographic images in mind and do not work well when the data is something else, such as a normal map. For example, S3TC (same as DXTC) [2] has been employed for compressing normal maps, however, with block artifacts as a result, see document [1].

In the majority of cases today, bump mapping is performed in local tangent space (X, Y, Z), of each rendering primitive, e.g. a triangle. Since the length of the normal is not of interest, unit normals can be employed. Thus, the problem is to compress triplets (X,Y,Z), where $X^2+Y^2+Z^2=1$. The simplest scheme, is just to treat X, Y, Z as RGB (Red, Green, Blue) and compress it with S3TC/DXT1, but that gives rather bad quality.

Another way is to only compress X and Y, and then compute Z using equation 1:

$$Z=\sqrt{1-X^2-Y^2} \qquad (1)$$

By concentrating on X and Y it is possible to get a lower distortion. In order to enhance quality further, DXT5 can be used. Normally DXT5 is a version of S3TC used for alpha textures, i.e., RGBA textures, where RGB are coded together and the alpha component (A) is coded independently. Thus one approach has been to use the alpha channel to code X and the G channel to code Y. R and B have been unused in order to give maximum quality to G. However, that still does not give enough quality.

Actually, for smooth surfaces it turns out that even uncompressed RGB888/XYZ888 does not give enough quality for some objects. Especially for smooth surfaces, more than eight bits are needed. Therefore ATI Technologies developed 3Dc [1], which is a compression format that will often allow higher quality than XYZ888.

Just as in DXT5, only X and Y are compressed, and Z is calculated. X and Y are compressed separately. The X-values are grouped into blocks of 4×4 pixels. These values can range from −127.000 to +127.000, (or alternatively, from 0 to 255), but they are often clustered in an interval. 3Dc takes advantage of this and specifies this value using 16 bits: eight bits for the start of the interval and eight bits for the end of the interval.

Inside this interval, each value is specified using 3 bits each. This means that eight reconstruction levels within the interval are possible. The reconstruction levels are always equispaced (evenly spaced), reflecting an assumption that the distribution inside the interval is often close to uniform.

In total, 16 bits are used to specify the interval, and 3×16=48 bits are spent on specifying the reconstruction levels for the individual pixels. Thus, a 4×4 block of X-data is compressed to 64 bits. The same coding is valid for Y, and in total thus 128 bits are used, or 8 bits per pixel.

While 3Dc produces much better quality than DXT1 or DXT5, it may still not be enough. The interval is specified with 8 bits, and the smallest possible interval is when there is a difference of only one between start and end of the intervals, such as, for instance, the interval [77, 78] or [−3, −4]. In this case, there are eight reconstruction levels in between, meaning another three bits. Thus, the theoretically maximal resolution is 8+3=11 bits per component. This may not be enough for slowly varying surfaces.

SUMMARY

There is, thus, a general need of improving the quality when compressing and decompressing images in the form of normal maps and other types of images having image element associated property coordinates.

It is a general object of the technology disclosed herein to provide image encoding and image decoding methods and system.

This and other objects are met by the technology disclosed herein as defined by the accompanying patent claims.

Briefly, the technology disclosed herein involves image processing in the form of encoding (compressing) an image and decoding (decompressing) an encoded (compressed) image.

According to the technology disclosed herein, an image to be encoded is decomposed into a number of image blocks comprising multiple image elements (pixels, texture elements, texels, or volume elements, voxels). An image block preferably comprises sixteen image elements and has a size of $2^m \times 2^n$ image elements, where m=4−n and n=0, 1, 2, 3, 4 or $2^m \times 2^n 2^p$ image elements, where m, n, p=0, 1, 2, 3, 4 with the proviso that m, n, p are not all zero. Each image element in a block is characterized by a feature vector, having two or three feature vector components. The image blocks are then encoded.

In a first aspect of the technology disclosed herein, at least a portion of first vector components of the feature vectors are used for determining first and second codewords. These two codewords are representations of a respective first and second component value, such as minimum and maximum X-component values. Correspondingly, at least a portion of second vector components of the feature vectors in the block are used for determining third and fourth codewords. These two codewords are representations of a third component value and a fourth component value, such as minimum and maximum Y-component values.

This aspect of the technology disclosed herein involves a dynamic selection of the respective resolution in the two vector component directions based on the distribution of the feature vector components in the block. Thus, a first resolution number $N_1$ and a second resolution number $N_2$ are selected based on a relation of the distribution of the first (X) vector components and the distribution of the second (Y) feature vector components in the block. This number $N_1$ is a non-zero integer and $N_2$ is zero or a non-zero integer, or $N_1$ is a zero or non-zero integer and $N_2$ is non-zero integer. The dynamic selection according to this aspect of the technology disclosed herein implies that different resolution numbers can be selected for different image blocks depending on the respective distributions of the vector components in the block.

$N_1$ first additional component values, if $N_1$ is a non-zero integer, are then generated based on the first and second codewords or the first and second component values, preferably as different linear combinations of the codewords or component values. The third and fourth codewords or component values are used in a similar manner to calculate, if $N_2$ is a non-zero integer, $N_2$ second additional component values.

The $N_1$ first additional component values and optionally, but preferably, the first and second component values form a first candidate set, while the $N_2$ second additional component values and optionally, but preferably, the third and fourth component values constitute a second candidate set. The different values in the first and second set are then, for each image element in the block, compared to the original vector components of that image element to find the most suitable component representation. A first component index indicative of the component value selected from the first set and a second component index indicative of the component value selected from the second set are provided and assigned to the image element.

The resulting compressed representation of the image block comprises the four codewords, a first sequence of first component indices and a second sequence of second component indices.

In the decompression of this aspect, first to fourth component values are determined based on the four codewords of the compressed image block. The calculated component values or the original codewords are used for selecting the first resolution number $N_1$ and the second resolution number $N_2$. $N_1$ first additional component values, if $N_1$ is non-zero, are then calculated based on the first and second codewords or component values. Correspondingly, the third and fourth codewords or component values are used, if $N_2$ is a non-zero integer, to calculate $N_2$ second additional component values. When an image block of the block is to be decoded, the first component index assigned to that image element is employed for selecting which of the first component value, the second component value and the $N_1$ first additional component value to use as a representation of the original first vector component for that image element. The second component index of the image element is used in a similar manner to select between the third component value, the fourth component value and if the $N_2$ second additional component values.

A second aspect of the technology disclosed herein relates to a multi-mode block processing, where an existing default compression/decompression mode is accompanied with at least one auxiliary compression/decompression mode. This auxiliary mode can then be used for handling image blocks that the default mode handles poorly, in terms of image quality, due to limitations of the default processing. The auxiliary mode can though, according to this aspect of the technology disclosed herein, by added freely, i.e. without any sacrifice of encoding bits in the default mode. This is possible since the auxiliary mode will utilize bit combinations that represent redundant bit sequences when processed according to the default processing mode or bit sequences that are not processable according to the default processing mode.

In the multi-mode compression, an image block is compressed according to a default mode to generate a default compressed block representation. This default compressed block comprises at least a first codeword bit sequence and a second codeword bit sequence. Interpreted as an integer, the first codeword bit sequence is smaller than the second codeword bit sequence. In addition, each decodable bit of the two bit sequence is dependent only on a single bit of the first or second codeword bit sequence at a position defined based on said decodable bit.

An error indicative of representing the image block with this default compressed block is then calculated.

The input image block is also compressed according to at least one auxiliary mode to generate an auxiliary compressed block representation. This auxiliary compressed block also comprises at least the first and second codeword bit sequence. However, in contrast to the default mode, the first sequence is now equal to or larger than the second codeword bit sequence, when interpreted as integers. In addition, the first and second codeword sequence comprises at least one non-encoding bit that does not carry any payload information in this auxiliary mode. Each remaining, decodable bit of the first and second codeword bit sequence is dependent on i) this non-encoding bit at a predefined bit position within the bit sequences and ii) another bit of the first or second codeword bit sequence at a position defined based on the decodable bit.

In correspondence to the default mode processing, an error indicative of representing the image block with the auxiliary compressed block is estimated.

A comparison of the estimated errors are then performed for selecting which compressed block, the default block or the auxiliary block, to use as compressed representation of the image block.

In the decompression, the bits positioned in the first and second codeword bit sequences are used for selecting whether the compressed block should be compressed according to a default decompression mode or an auxiliary decompression mode.

SHORT DESCRIPTION OF THE DRAWINGS

The technology disclosed herein together with further objects and advantages thereof, may best be understood by making reference to the following description taken together with accompanying drawings, in which.

Figure 9:
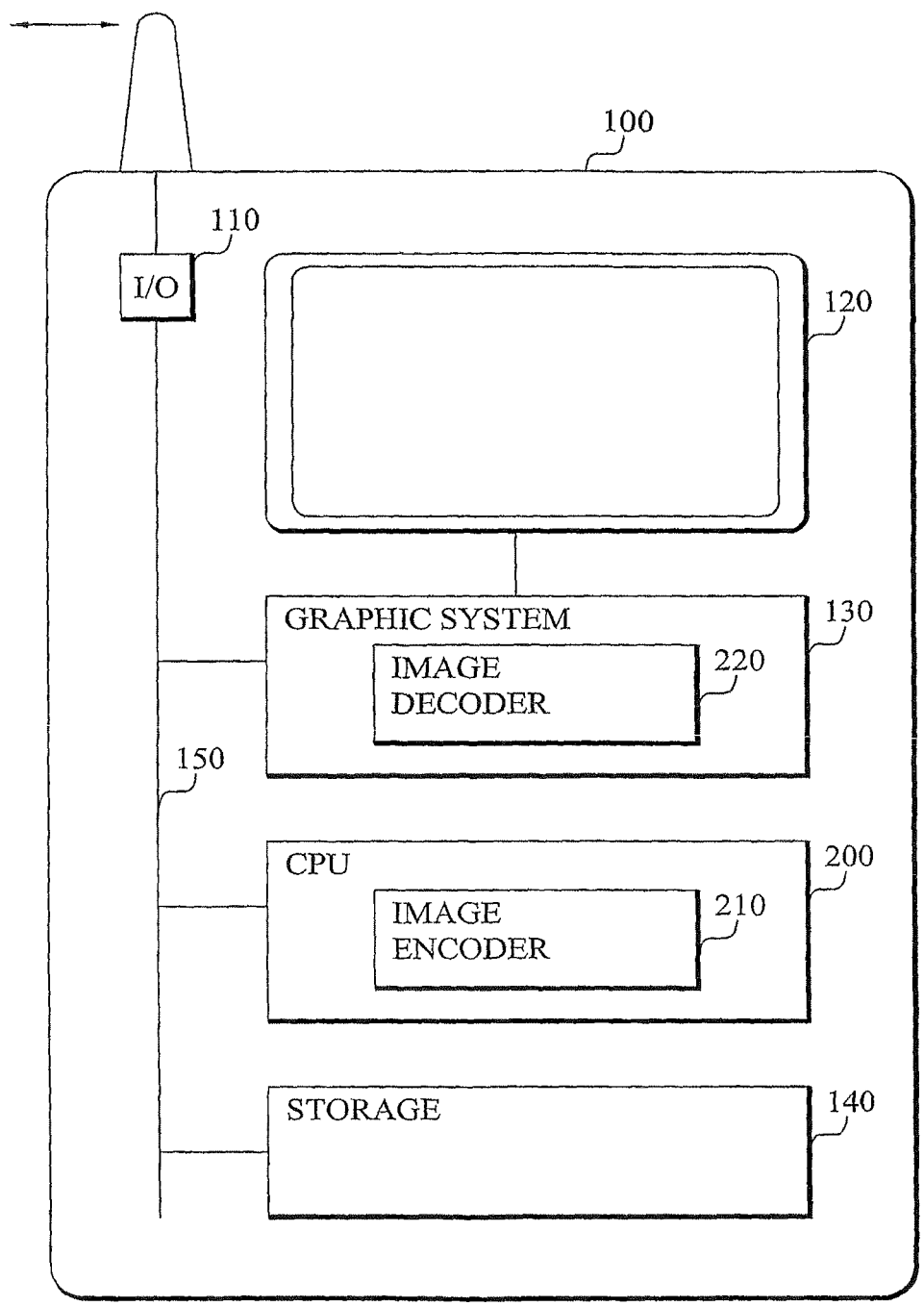
Figure 12:
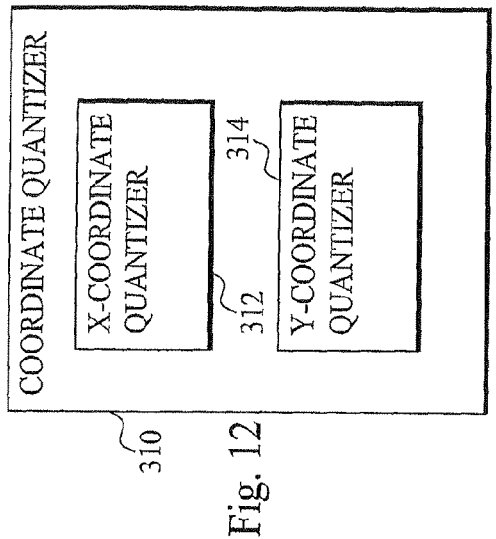
Figure 13:
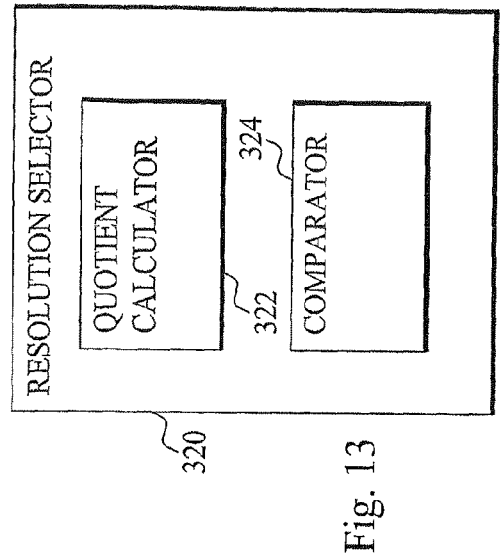
Figure 11:
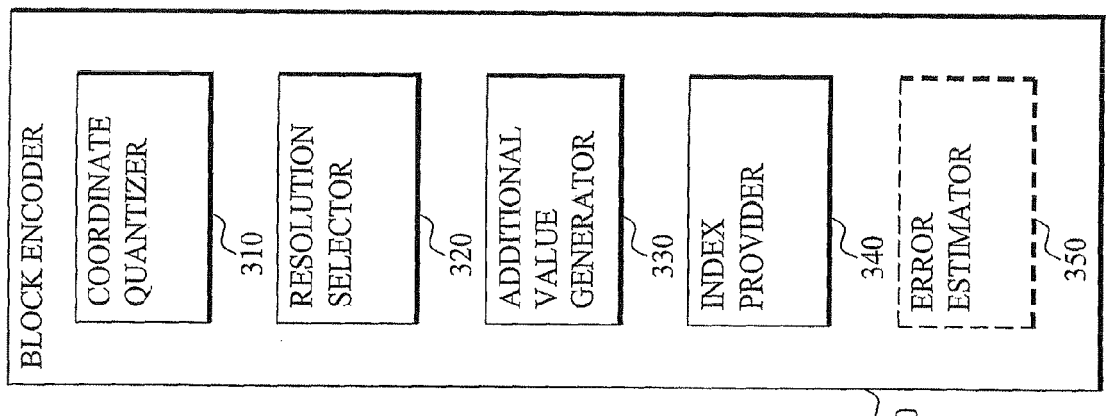
Figure 10:
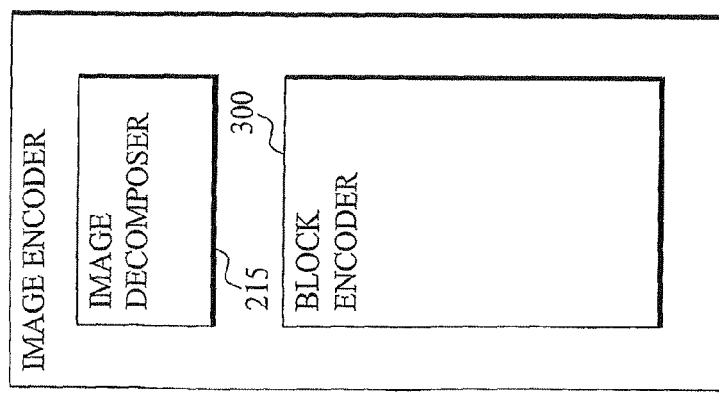
Figure 14:
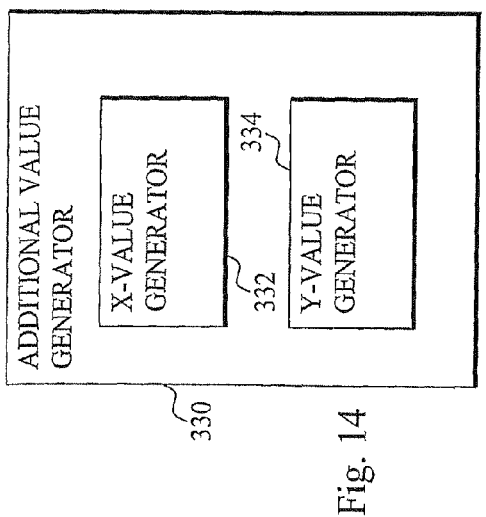
Figure 15:
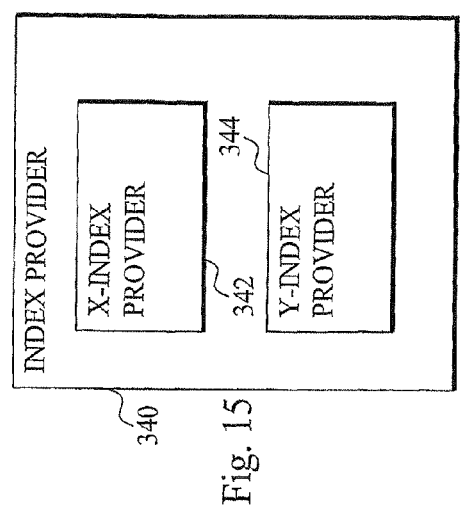
Figure 16:
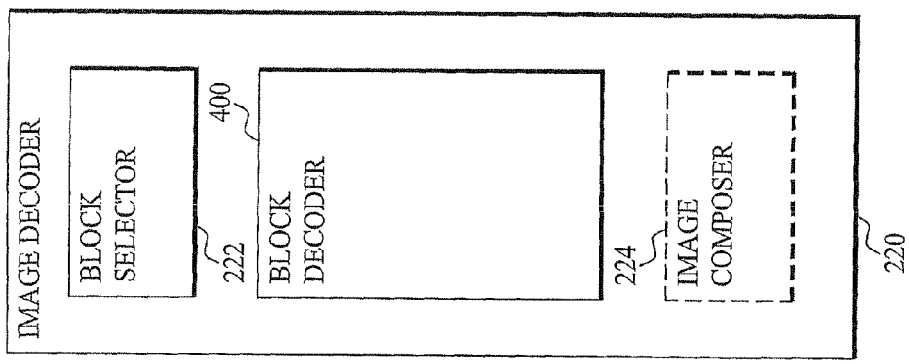
Figure 17:
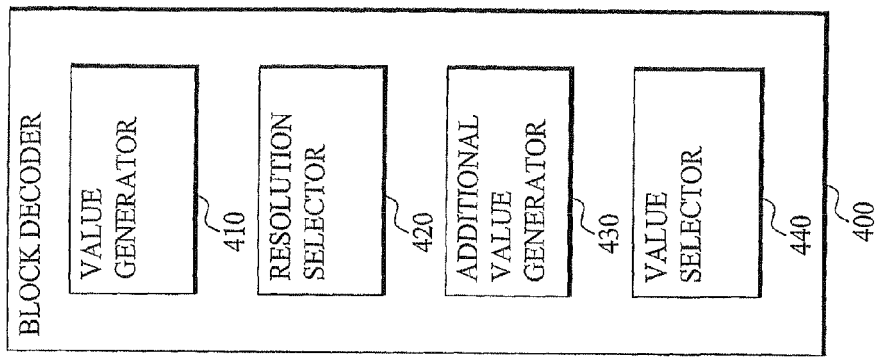
Figure 20:
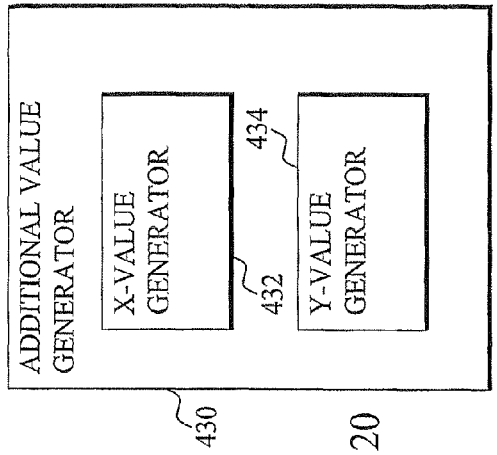
Figure 21:
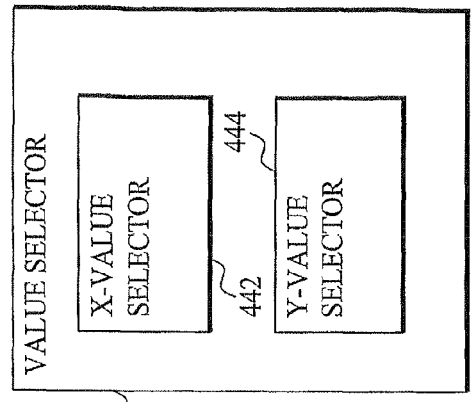
Figure 19:
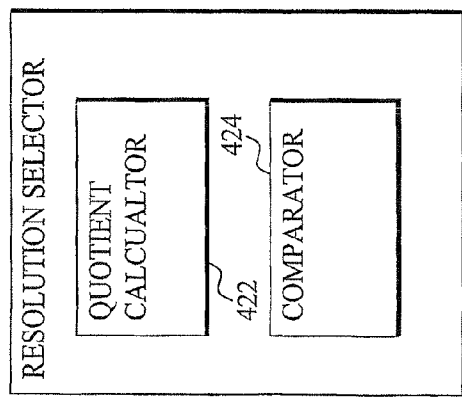
Figure 18:
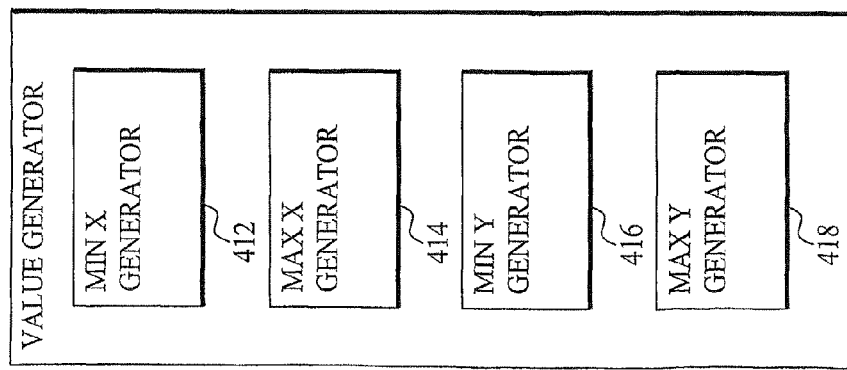
Figure 29:
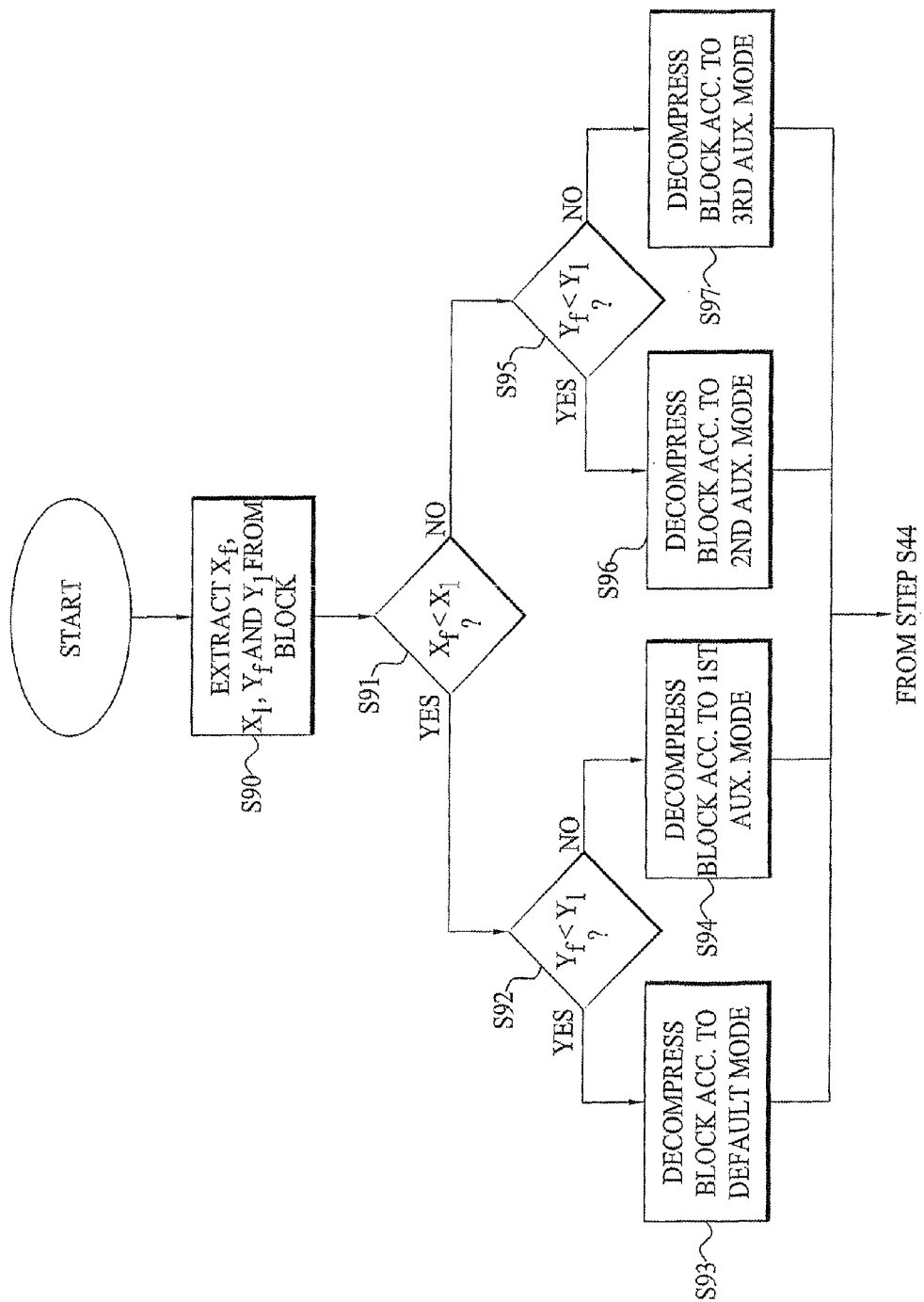
Figure 30:
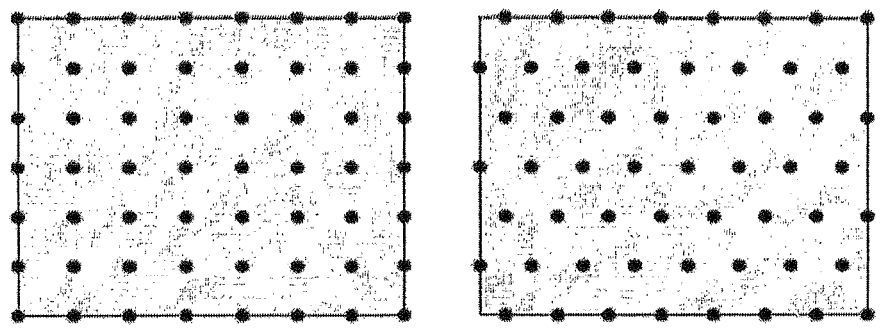
Figure 31:
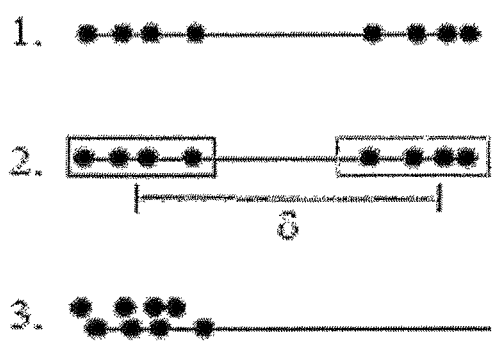
Figure 33:
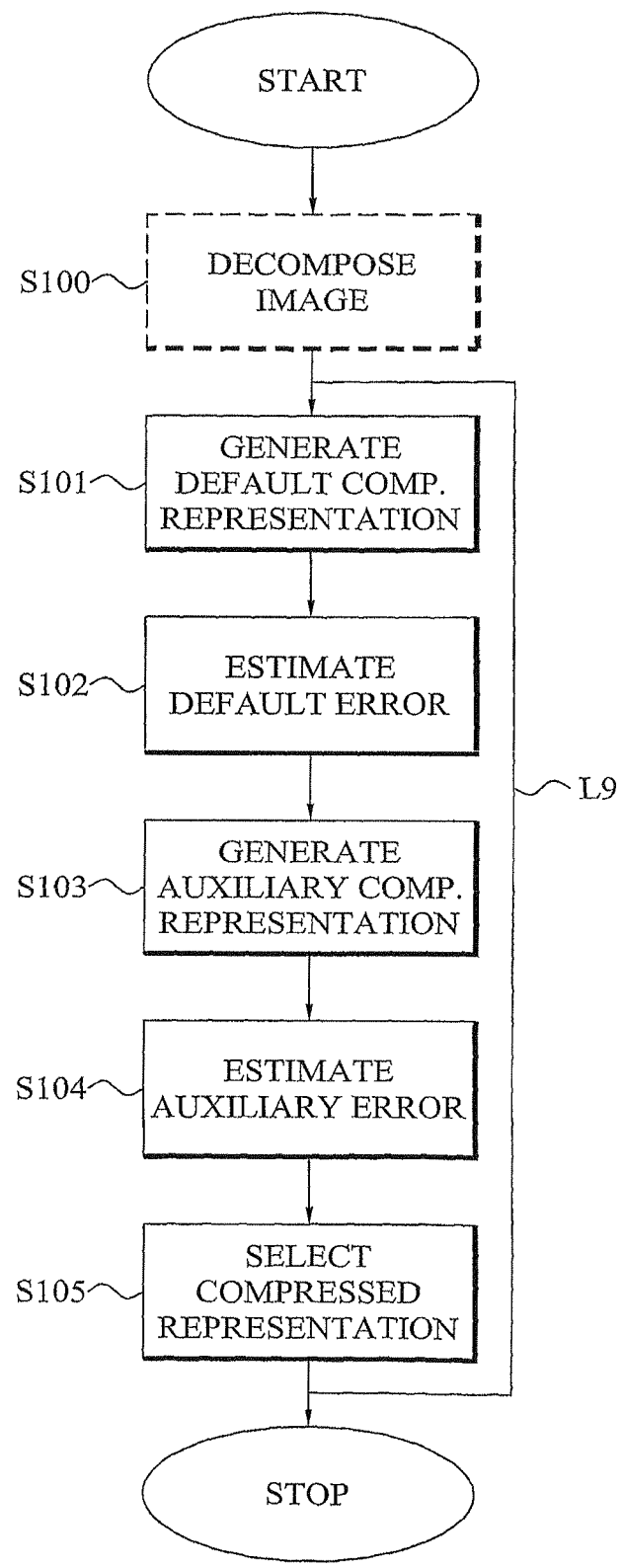
Figure 38:
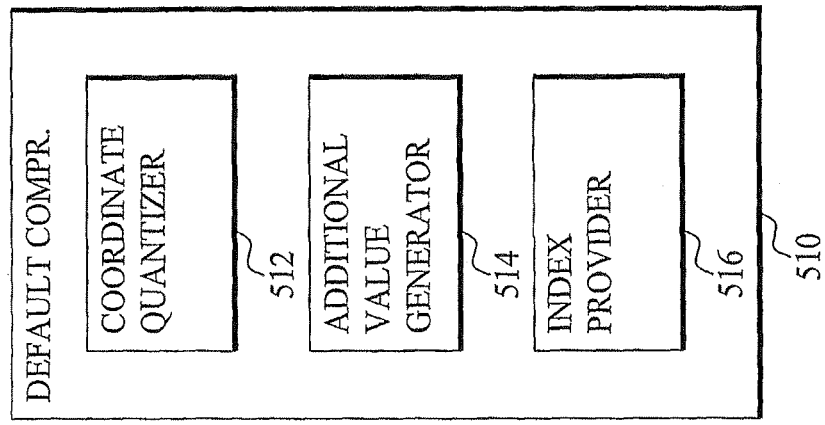
Figure 37:
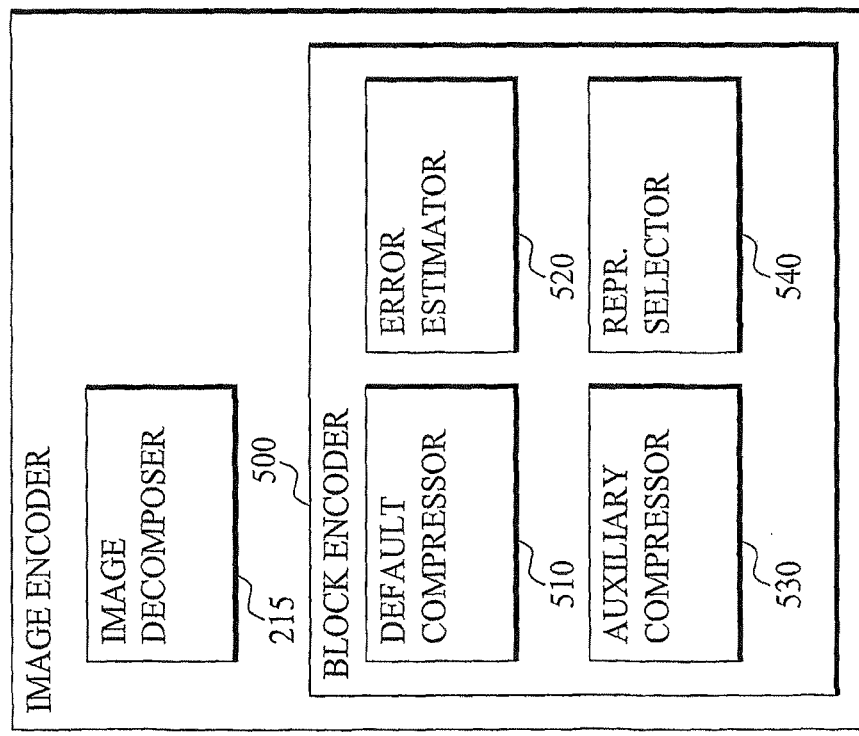
Figure 43:
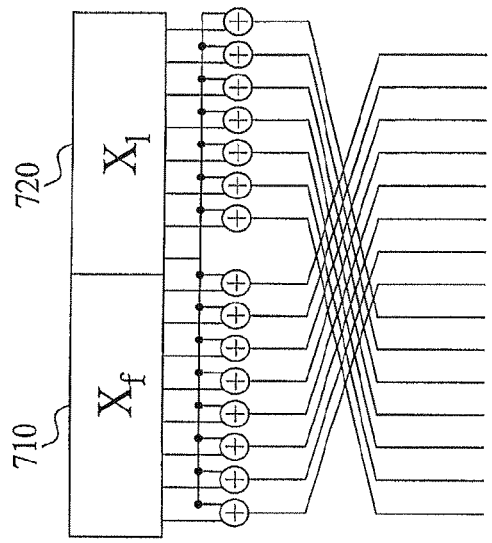
Figure 42:
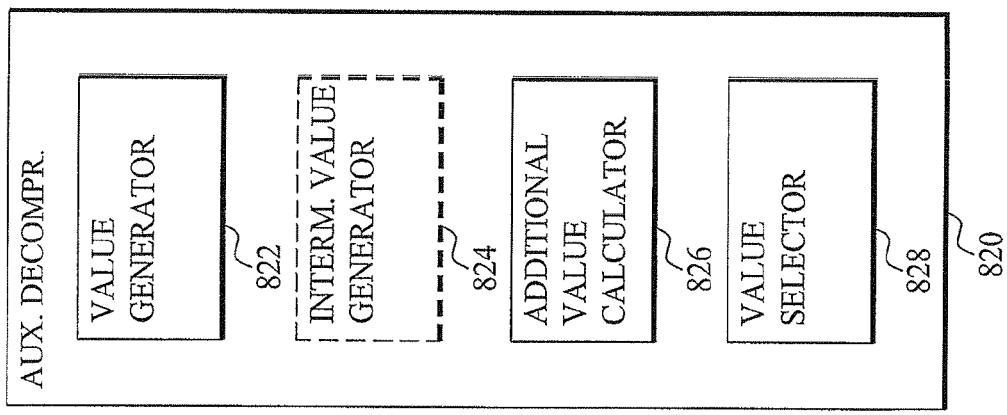
Figure 41:
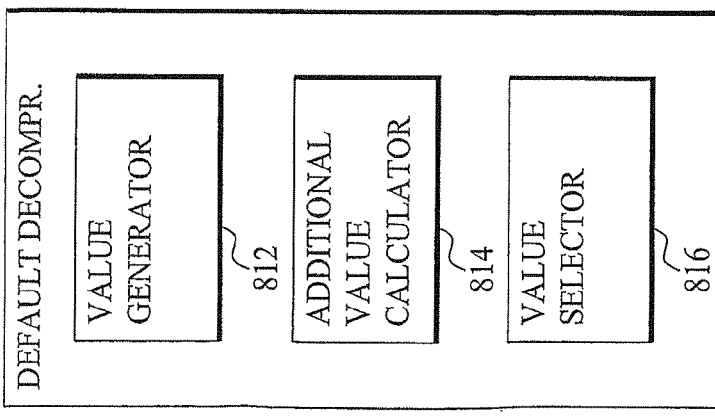

FIG. 9 schematically illustrates an example of a user terminal with an image encoder and decoder according to the technology disclosed herein;

FIG. 10 is a block diagram schematically illustrating an embodiment of an image encoder according to the technology disclosed herein;

FIG. 11 is a block diagram schematically illustrating an embodiment of a block encoder according to the technology disclosed herein;

FIG. 12 is a block diagram schematically illustrating an embodiment of the coordinate quantizer of FIG. 11;

FIG. 13 is a block diagram schematically illustrating an embodiment of the resolution selector of FIG. 11;

FIG. 14 is a block diagram schematically illustrating an embodiment of the additional value generator of FIG. 11;

FIG. 15 is a block diagram schematically illustrating an embodiment of the index provider of FIG. 11;

FIG. 16 is a block diagram schematically illustrating an embodiment of an image decoder according to the technology disclosed herein;

FIG. 17 is a block diagram schematically illustrating an embodiment of a block decoder according to the technology disclosed herein;

FIG. 18 is a block diagram schematically illustrating an embodiment of the value generator of FIG. 17;

FIG. 19 is a block diagram schematically illustrating an embodiment of the resolution selector of FIG. 17;

FIG. 20 is a block diagram schematically illustrating an embodiment of the additional value generator of FIG. 17;

FIG. 21 is a block diagram schematically illustrating an embodiment of the value selector of FIG. 17;

FIG. 22 is a flow diagram illustrating an image decoding method and an image block decompression method according to another embodiment of the technology disclosed herein;

FIG. 23 illustrates another embodiment of an encoded representation of an image block according to the technology disclosed herein;

FIG. 24 is a flow diagram illustrating an embodiment of the auxiliary decompressing step of FIG. 25;

FIG. 25 is a flow diagram illustrating an embodiment of the default decompressing step of FIG. 25;

FIG. 26 is a flow diagram illustrating another embodiment of the auxiliary decompressing step of FIG. 25;

FIGS. 27A to 27C are diagrams illustrating distributions of coordinate representations according to the auxiliary mode embodiment illustrated in FIG. 26;

FIG. 28 is a flow diagram illustrating a further embodiment of the auxiliary decompressing step of FIG. 25;

FIG. 29 is a flow diagram illustrating an image block decompression method according to a further embodiment of the technology disclosed herein;

FIG. 30 illustrates diagrams with possible distributions of coordinate representations according to the technology disclosed herein;

FIG. 31 is a diagram illustrating coordinate value management according to an auxiliary mode embodiment of the technology disclosed herein;

FIGS. 32A and 32B visualize distribution of coordinate representations according to an auxiliary mode of the technology disclosed herein;

FIG. 33 is a flow diagram illustrating an image encoding method and an image block compression method according to another embodiment of the technology disclosed herein;

FIG. 34 is a flow diagram illustrating an embodiment of the default compressing step of FIG. 33 in more detail;

FIG. 35 is a flow diagram illustrating an embodiment of the default auxiliary step of FIG. 33 in more detail;

FIG. 36 is a flow diagram illustrating another embodiment of the default auxiliary step of FIG. 33 in more detail;

FIG. 37 is a block diagram schematically illustrating another embodiment of an image encoder and a block encoder according to the technology disclosed herein;

FIG. 38 is a block diagram schematically illustrating an embodiment of the default compressor of FIG. 37;

FIG. 39 is a block diagram schematically illustrating an embodiment of the auxiliary compressor of FIG. 37;

FIG. 40 is a block diagram schematically illustrating another embodiment of an image decoder and a block decoder according to the technology disclosed herein;

FIG. 41 is a block diagram schematically illustrating an embodiment of the default decompressor of FIG. 40;

FIG. 42 is a block diagram schematically illustrating an embodiment of the auxiliary decompressor of FIG. 40; and FIG. 43 is a schematic hardware implementation of a unit for extracting bits of an encoded image block representation according to an auxiliary mode.

DETAILED DESCRIPTION

Throughout the drawings, the same reference characters will be used for corresponding or similar elements.

The technology disclosed herein relates to image and graphic processing, and in particular to encoding or compressing images and image blocks and decoding or decompressing encoded (compressed) images and image blocks.

Generally, according to the technology disclosed herein during image encoding, an image is decomposed or divided into a number of image blocks or tiles. Each such image block then comprises multiple image elements having certain image element associated properties or features. The image blocks are encoded or compressed to generate an encoded/compressed representation of the image.

When an encoded image or graphic primitive subsequently is to be rendered, e.g. displayed on a screen, the relevant image elements of the encoded image blocks are identified and decoded. These decoded image elements are then used to generate a decoded representation of the original image or graphics primitive.

The technology disclosed herein is well adapted for usage with three-dimensional (3D) graphics, such as games, 3D maps and scenes, 3D messages, e.g. animated messages, screen savers, man-machine interfaces (MMIs), etc., but is not limited thereto. Thus, the technology disclosed herein could also be employed for encoding other types of images or graphics, e.g. one-dimensional (1D), two-dimensional (2D) or 3D images.

The technology disclosed herein is in particular suitable for handling bump or normal maps, or images. As is well-known in the art, a normal or surface normal denotes a 3D vector which is perpendicular to the surface (for a flat surface) or perpendicular to the tangent plane of the surface (for a non-flat surface).

In 3D graphics processing, typically several triangles are created and the corresponding screen coordinates of the corners of these triangles are determined. Onto each triangle, an image (or portion of an image), or a so-called texture, is mapped ("glued"). The management of textures is, though, costly for a graphic system, both in terms of utilized memory for storage of textures and in terms of memory bandwidth during memory accesses, when textures are fetched from the memory. This is a problem particularly for thin clients, such as mobile units and telephones, with limited memory capacity and bandwidth. As a consequence, a texture or image encoding scheme is often employed. In such a scheme, a texture is typically decomposed or divided into a number of image blocks comprising multiple texels. The image blocks are then encoded and stored in a memory. Note that the size of an encoded (version of an) image block is smaller than the corresponding size of the uncoded version of the image block.

In the technology disclosed herein the expression "image element" refers to an element in an image block or encoded representation of an image block. This image block, in turn, corresponds to a portion of an image or texture. Thus, according to the technology disclosed herein, an image element could be a texel (texture element) of a (1D, 2D, 3D) texture, a pixel of a (1D or 2D) image or a voxel (volume element) of a 3D image. Generally, an image element is characterized by certain image-element properties or features. In a preferred embodiment of the technology disclosed herein, each image element has a feature vector representing a feature associated with the image elements. This feature could control or influence the appearance of an image element, such as a surface normal, or may represent a feature of the image element itself, such as chrominance information (color). A first such example of such a feature vector is a normal, preferably a normalized surface normal. Such a surface normal has three vector components or coordinates, i.e. X-, Y- and Z-components. However, it is generally enough to only specify two of the normal coordinates, such as X- and Y-coordinates per image element, as the remaining coordinate can be calculated therefrom, such as using equation 1 above. As a consequence, the preferred feature vector of this embodiment is a two-dimensional feature vector specifying two of the coordinates, such as the X- and Y-coordinates.

A second example of a feature vector is a chrominance vector in a color space. In the art of image processing, multiple different such color spaces have been employed, for example RGB, YUV or YCrCb space. In such a case, the feature vector preferably has three vector components, for instance, a red component, a green component and a blue component.

Furthermore, in the following, the term "image" is used to denote any 1D, 2D or 3D image or texture that can be encoded and decoded by means of the technology disclosed herein, including but not limited to bump maps, normal maps, photos, game type textures, text, drawings, high dynamic range images and textures, etc.

The technology disclosed herein provides an image processing that is in particular suitable for compressing and decompressing images and image blocks, where each image element has a two dimensional feature vector. In a preferred implementation of the technology disclosed herein, the two vector components represent two coordinates of a normalized surface normal, such as the X- and Y-coordinates (or X- and Z-coordinates or Y- and Z-coordinates). The technology disclosed herein teaches a dynamic selection of the resolution in the respective directions of the two coordinates in the coordinate space based on the distribution of the vector components throughout this space. This dynamic resolution adaptation leads to increased image quality in terms of reducing the quality loss when compressing or encoding an image as it allows a more correct representation of the original values of the image elements.

Compression

Figure 1:
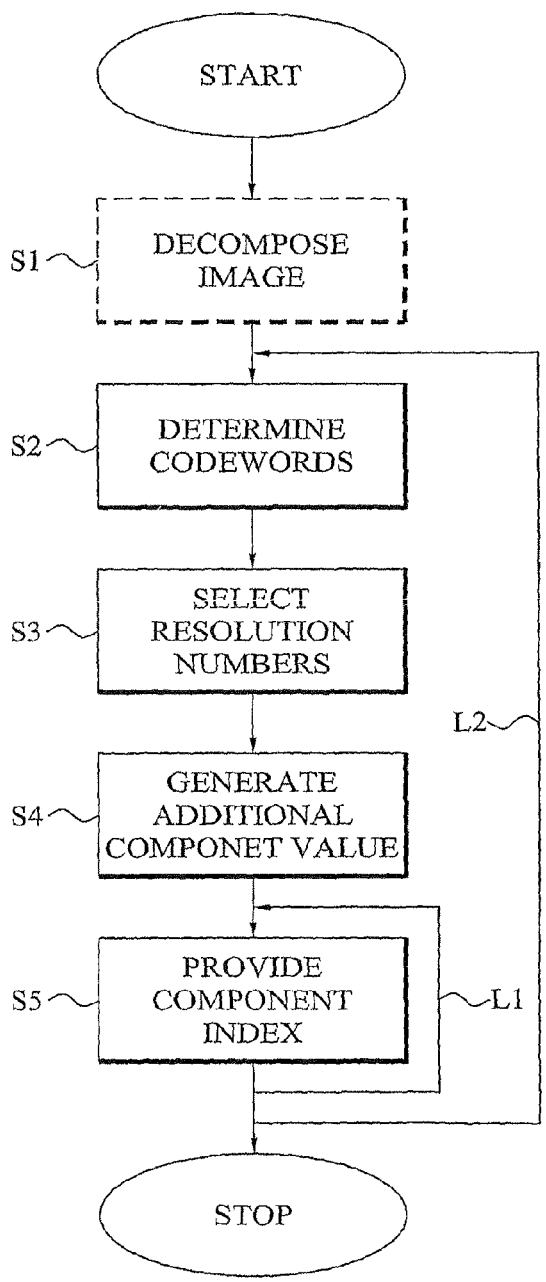
FIG. 1 is a flow diagram illustrating an image encoding method and an image block compression method according to an embodiment of the technology disclosed herein.
Figure 2:
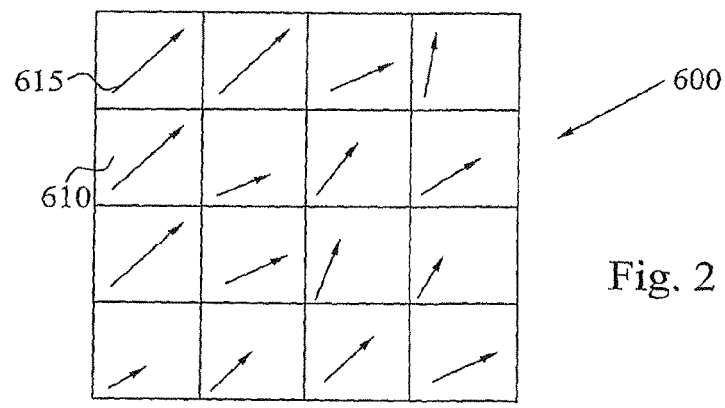
FIG. 2 illustrates an embodiment of an image block according to the technology disclosed herein.

FIG. 1 illustrates a (lossy) method of encoding an image according to an aspect of the technology disclosed herein. In a first step S1, the image is decomposed or divided into a number of image blocks. Each such image block comprises multiple, i.e. at least two, image elements. In a preferred embodiment of the technology disclosed herein, an image block comprises sixteen image elements (pixels, texels or voxels) and has a size of $2^m \times 2^n$ image elements, where m=4−n and n=0, 1, 2, 3, 4. More preferably, m and n are both 2. It could also be possible to utilize an image block of size $2^m \times 2^n$ or $2^m \times 2^n \times 2^p$ image elements, where m, n, p are zero or positive integers with the proviso that not all of m, n, p may simultaneously be zero. FIG. 2 schematically illustrates an example of an image block 600 with sixteen image elements 610 according to the technology disclosed herein. The figure also schematically illustrates the different feature vectors 615 associated with the image elements 610. In an alternative embodiment of the technology disclosed herein, the image is decomposed into a number of image sub-blocks, preferably having a size of 2×4 or 4×2 image elements. In such a case, two such sub-blocks could be handled together during compression to form a 4×4 block 600 as illustrated in FIG. 2. Returning to FIG. 1, the whole image block is preferably decomposed into (non-overlapping) image blocks in step S1. However, in some applications, only a portion of an image is encoded and, thus, only this portion is decomposed into image blocks.

The following steps S2 and S5 perform an encoding or compression of the image blocks. Firstly, in step S2 codewords are determined as representations of multiple component values. Basically, this step S2 involves determining a first codeword and a second codeword as representations of a first component value and a second component value. This codeword determination is performed based on a least a portion of the first vector components or original values of the image elements in the block to be compressed. In a typical implementation, the first vector components are first coordinates, such as X-coordinates, of normalized surface normals. In such a case, the two codewords determined based on these X-coordinates can be regarded as a first and a second (X) component or coordinate codeword. Furthermore, during decompression, it is possible to use these two (X) coordinate codewords for generating a first and a second (X) coordinate representation. As was mentioned in the foregoing, the two codewords are determined based on at least a portion of the original first vector components (X-coordinates). In a preferred implementation, the codewords are determined based on (all) these first vector components.

In a corresponding manner, a third and a fourth codeword is determined in step S2 as representations of a third and a fourth component value. This codeword determining process is performed based on at least a portion of the second vector components of the image elements in the block, preferably based on (all) the second vector components. In the line with the discussion above, these second vector components are preferably second coordinates, such as Y-coordinates, of the normalized surface normals associated with the image elements. The third and fourth codewords can then be regarded as a first and a second Y-coordinate or -component codeword representing a first and second Y-coordinate representation.

It the image elements of the block are each associated with a respective feature vector having three vector components, a fifth and sixth codeword could likewise be determined. However, in the following it is assumed that the feature vector only comprises two components (whereas the third component can be calculated from the other two). The teachings of the technology disclosed herein can though be extended to cope with three or more vector components.

In a preferred implementation, the four determined coordinate codewords each comprise 8 bits, but could alternatively be provided in a more compressed form, such as being of 7, 6, 5 or 4 bits. It is also possible to use codewords with different number of bits. For example, the second and forth codewords could each include M bits, whereas the first and fourth codewords each constitute P bits, where M>P.

In a next step S3, resolution numbers are selected or determined based on a relation of the distribution of the first vector components and the distribution of the second vector components. This selection involves selecting a first resolution number $N_1$ and a second resolution number $N_2$, where $N_1$ and $N_2$ are zero or non-zero positive integers, with the proviso that $N_1$ and $N_2$ are not both zero. These resolution numbers $N_1$, $N_2$ define and determine the number of additional component values that can be determined from the first and second component values and the third and fourth component values, respectively. The technology disclosed herein therefore provides for a dynamic resolution selection, in terms of having capability of selecting resolution number on image block basis. This should be compared to the prior techniques as represented by 3Dc [1], where a corresponding resolution number is fixed equal to six for both the X-coordinates and the Y-coordinate for all image blocks and images that are compressed. The technology disclosed herein, however, allows for a higher resulting image quality through this adaptation of the resolution numbers per block basis based on the properties of the actual image elements in the blocks.

Figure 3A:
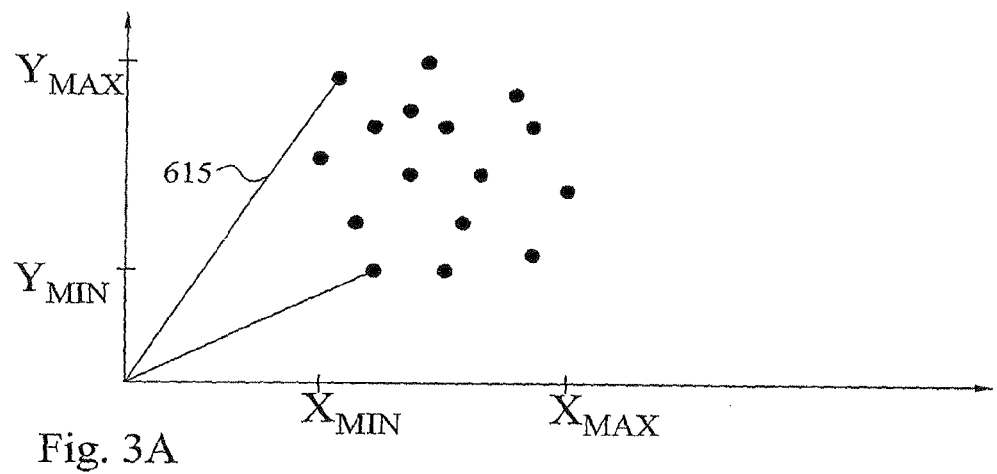
FIGS. 3A and 3B are diagrams illustrating distributions of coordinate values in the X, Y plane.
Figure 3B:
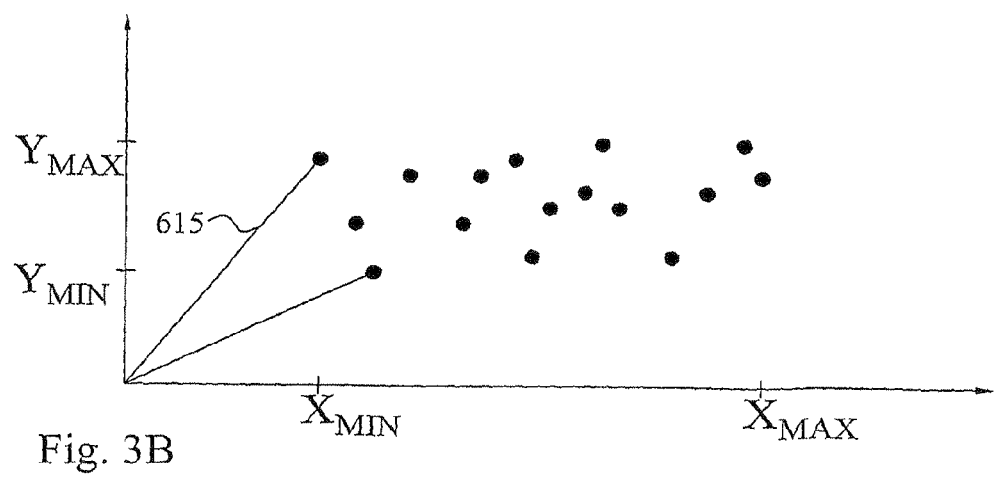

FIGS. 3A and 3B illustrate this concept and advantage of the technology disclosed herein. The figures are diagrams illustrating the X-Y plane in the coordinate space. Each image element of the image block has a respective feature vector 615 (surface normal) with an X- and Y-coordinate. In the figures it is assumed that there are sixteen image elements per block, e.g. as illustrated in FIG. 2. Thus, the two figures comprise sixteen marked points representing the X- and Y-coordinates of the image elements. In addition, only two feature vectors 615 have been indicated to make the figures clearer.

In FIG. 3A the coordinate or component values are fairly centered and can be enclosed with an imaginary square. Thus, the distribution of coordinate values along the X-axis is proportionally corresponding to the distribution of the coordinate values along the Y-axis. Therefore a quotient of a difference between the largest X-coordinate and the smallest X-coordinate in the block and a difference between the largest Y-coordinate and the smallest Y-coordinate is close to one or at least within a small interval centered on one. For such an image block, it would probably be best from quality point of view to use a same value for the X-resolution number $N_1$ and the Y-resolution number $N_2$, such as $N_1=N_2=6$.

In clear contrast to FIG. 3A, the coordinate values of the image block illustrated in FIG. 3B have a correspondingly larger distribution along the X-axis as compared to the Y-axis. In this example, the quotient of the difference between the largest X-coordinate and the smallest X-coordinate in the block and the difference between the largest Y-coordinate and the smallest Y-coordinate would be clearly larger than one. Instead of a square, an imaginary elongated rectangular would best fit to enclose the coordinate values in the diagram. In this case, it would probably be best from quality point of view to use a higher X-resolution number $N_1$ and at the cost of the Y-resolution number $N_2$, thus $N>N_2$.

In a next step S4 of the method illustrated in FIG. 1, $N_1$ first additional component values are generated based on the first and second codewords or the first and second component values, unless $N_1=0$. Correspondingly, $N_2$ second additional component values are generated, unless $N_2=0$, based on the third and fourth codewords or the third and fourth component values. Thus, the two resolution numbers $N_1$, $N_2$ determine the number of additional values that are potentially available for each (X and Y) vector component. As the first to fourth component values can be obtained from the first to fourth codewords, the calculation of the additional component values could either be made on codeword basis or using the first to fourth component values. In addition, if the codewords and component values comprise the same number of bits it is of cause a one-to-one relationship between them and they are interchangeable. However, it could be possible that the codewords are compressed versions of the component values and therefore have to be expanded to form the values.

In a preferred implementation, the first additional component values are linear combinations of the first and second component values and the second additional component values are linear combinations of the third and fourth representation values. Thus, if $X_{min}$ denotes the first component value, $X_{max}$ denotes the second component value, then the first additional component values $X_i$ can be determined using equation 2.

$$X_i = X_{min} + i \times \frac{X_{max} - X_{min}}{N_1 + 1} \qquad (2)$$

The second additional component values $Y_j$ can be determined in a similar manner, see equation 3:

$$Y_j = Y_{min} + j \times \frac{X_{max} - X_{min}}{N_2 + 1} \qquad (3)$$

where $Y_{min}$ denotes the third component value and $Y_{max}$ denotes the fourth component value. It is possible to use other weight-based forms of calculating the $N_1$ first additional values and the $N_2$ second additional values from the first, second component values and the third, fourth component values, respectively, and also such other approaches are within the scope of the technology disclosed herein.

In a next step S5, a first component index is provided for a current image element in the image block. This first component index is associated with a component value selected from a component set comprising i) the first component value, ii) the second component value and iii) a component value of the $N_1$ first additional values. Correspondingly, a second component index is provided for the image element.

This second index is indicative of a component value selected from i) the third component value, ii) the fourth component value and iii) a component value of the N2 second component values. In an alternative approach, the first value index is associated with 1) any of the i) the first component value and ii) a component value of the $N_1$ first additional values, 2) any of the i) the second component value and ii) a component value of the $N_1$ first additional values, or 3) any component value of the $N_1$ first additional values. The same principle applies mutatis mutandis for the second component index.

In this step S5, thus, component value are selected for an image element in the block and are used as representations of the "true" first and second vector components of that image element.

Figure 8A:
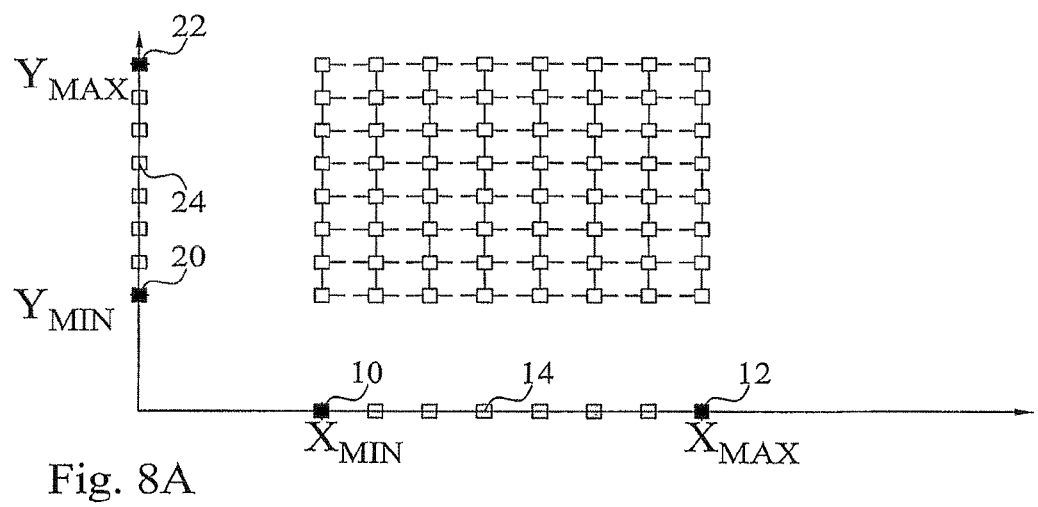
FIGS. 8A and 8B are diagrams illustrating distributions of coordinate representations in the X, Y plane.
Figure 8B:
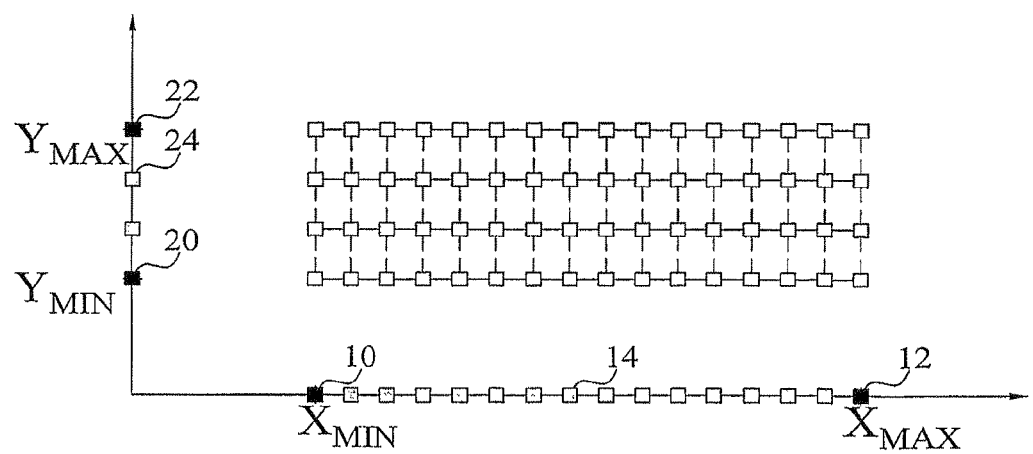

FIGS. 8A and 8B are diagrams schematically illustrating this concept for X- and Y-coordinates. Thus, the first and second codewords represent a minimum X-coordinate value 10 ($X_{min}$) and a maximum X-coordinate value 12 ($X_{max}$). Correspondingly, the third and fourth codewords represent a minimum Y-coordinate value 20 ($Y_{min}$) and a maximum Y-coordinate value 22 ($Y_{max}$). $N_1$ additional or, as illustrated in the figures, intermediate X-coordinate values 14 ($X_i$ according to above) 14 are generated or calculated from $X_{min}$ 10 and $X_{max}$ 12 (or the two X-codewords). In addition, $N_2$ additional Y-coordinate values 24 (denoted $Y_j$ in the foregoing) are determined based on $Y_{min}$ 20 and $Y_{max}$ 22 (or the two Y-codewords). In FIG. 8A $N_1=N_2=6$, whereas $N_1>N_2$ ($N_1=14$ and $N_2=2$) in FIG. 8B. The X- and Y-coordinate values ($X_{min}$, $X_{max}$ and $X_i$ and $Y_{min}$, $Y_{max}$ and $Y_j$) collectively form a grid of potential component values that are used as representations of the original X- and Y-coordinates of the image elements (see FIGS. 3A and 3B). Each point in the grid has an X-coordinate selected from $X_{min}$ 10, $X_{max}$ 12 and any of $X_i$ 14. Correspondingly, the Y-coordinates of the grid points are selected from $Y_{min}$ 20, $Y_{max}$ and any of $Y_j$ 24. In addition, each X-component value 10, 12, 14 is associated with an X-index (first component index) and each Y-component value 20, 22, 24 has an associated Y-index (second component index).

The grid point being a best representation of the original X and Y values of an image element is selected, for example as determined based on the calculation of error functions:

$$\epsilon_x^2 = (X_T - X_O)^2$$

$$\epsilon_y^2 = (Y_T - Y_O)^2 \quad (4)$$

where $X_O/Y_O$ represent the original X/Y-value of the image element and $X_T/Y_T$ represent an X/Y-component value selected from $X_{min}$, $X_{max}$ and $X_i/Y_{min}$, $Y_{max}$ and $Y_j$. The X- and Y-indices typically associated with grid point resulting in the smallest error are provided and used for the image element. Thus, the provision of value indices of step S5 is preferably performed based on these error estimates $\epsilon_x^2$ and $\epsilon_y^2$.

The usage of dynamic and adaptive resolution numbers become evident when comparing FIGS. 8A and 8B. In FIG. 8A there are the same numbers of potential X-component values as Y-component values. However, in FIG. 8B the resolution along the X-axis (the number of potential X-component values) is larger (more) as compared to the resolution (the number of potential Y-component values) along the Y-axis. FIG. 8A could advantageously be used for an image block having an X/Y-coordinate distribution as illustrated in FIG. 3A. However, FIG. 8A is not well-adapted for an image block having coordinate distribution as shown in FIG. 3B. FIG. 8B, on the other hand, is well suited for usage in connection with the image elements schematically illustrated in FIG. 3B.

The technology disclosed herein can therefore provide a block-specific adaptation of the respective number of component points for the two image element properties to suit the actual distribution of the property values of the image elements in the block.

Figures 4, 6:
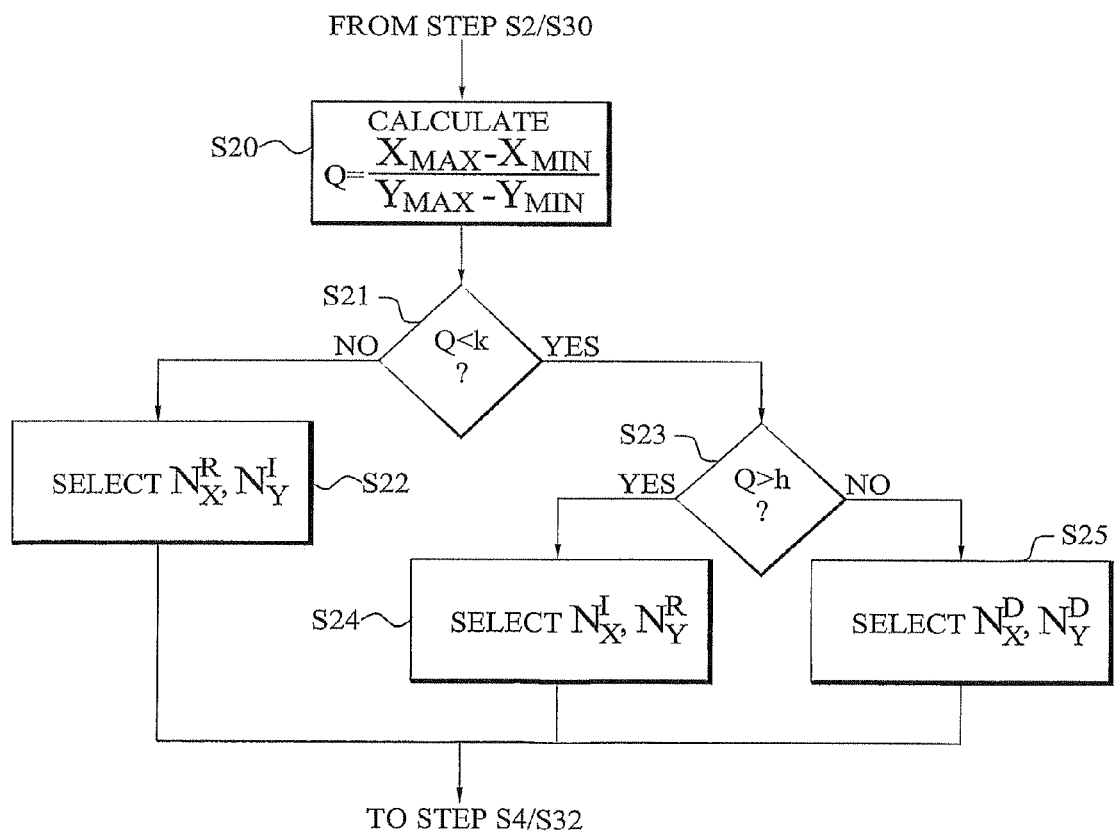
FIG. 4 illustrates an embodiment of an encoded representation of an image block according to the technology disclosed herein.
FIG. 6 is a flow diagram illustrating an embodiment of the selecting step of FIG. 1 or FIG. 7 according to an embodiment of the technology disclosed herein.

Returning to FIG. 1, step S5 is preferably repeated for all image elements in the image block (schematically illustrated by line L1). The result of the encoding of steps S2 to S5 is an encoded image block or more precisely an encoded (compressed) representation of the image block. Such an encoded block representation 700 is illustrated in FIG. 4. The representation 700 (encoded image block) comprises the first codeword 710, the second codeword 730, the third codeword 730, the fourth codeword 740, a sequence or bitmap 750 of first component indices (preferably one first component index for each image element in the block) and a sequence 760 of second component indices (preferably one second component index for each image element in the block). Note that the mutual order of the codewords 710, 720, 730 and 740 and the index sequences 750, 760 of the encoded image block 700 may differ from what is illustrated in the figure.

In a preferred implementation, 8 bits are spent per each codeword 710, 720, 730 and 740, resulting in a total of 32 bits. The total size of the compressed block 700 is preferably 128, thus, leaving 96 bits for the index sequences 750, 760. The number of bits spent per first/second value index is dependent on the first/second resolution numbers. For example, a resolution number of six is well handled with a 3-bit value index, which can specifically identify one of the total eight possible representation values for the image element property. Correspondingly, a resolution number of zero, two, fourteen and thirty can be handled by a value index of one, two, four or five bits, respectively.

In a preferred implementation of the technology disclosed herein, where a fixed number of bits, T, are available for the index sequences 750, 760, such as 96 bits, the following equation 5 is fulfilled:

$$16 I_1 + 16 \times I_2 = T \quad (5)$$

where $I_1/I_2$ represent the number of bits available per first value index/second value index. Table 1 below list preferred possible values for the $I_1/I_2$ parameters and the resolution numbers.

TABLE 1

| preferred resolution numbers and index sizes | | | |
|---|---|---|---|
| $N_1$ (#) | $N_2$ (#) | $I_1$ (bits) | $I_2$ (bits) |
| 30 | 0 | 5 | 1 |
| 14 | 2 | 4 | 2 |
| 6 | 6 | 3 | 3 |
| 2 | 14 | 2 | 4 |
| 0 | 30 | 1 | 5 |

Returning to FIG. 1, steps S2 to S5 are preferably repeated for all image blocks provided during the decomposing of step S1 (schematically illustrated by line L2). Note that due to the dynamic resolution selection of the technology disclosed herein, the resulting different compressed blocks can have different resolution numbers and therefore spend different number of bits on the first and second indices, though the total sizes of the compressed blocks in terms of bits are preferably the same. The result is then a sequence or file of encoded image blocks. The resulting encoded image blocks (encoded representations of the image blocks) could be ordered in a file from left to right and top to bottom in the same order in which they were broken down in the block decomposing of step S1. The method then ends.

The encoded image can be provided to a memory for storage therein until a subsequent rendering, e.g. display, of the image. Furthermore, the encoded image can be provided as a signal of encoded block representations to a transmitter for (wireless or wired) transmission to another unit.

Figure 5:
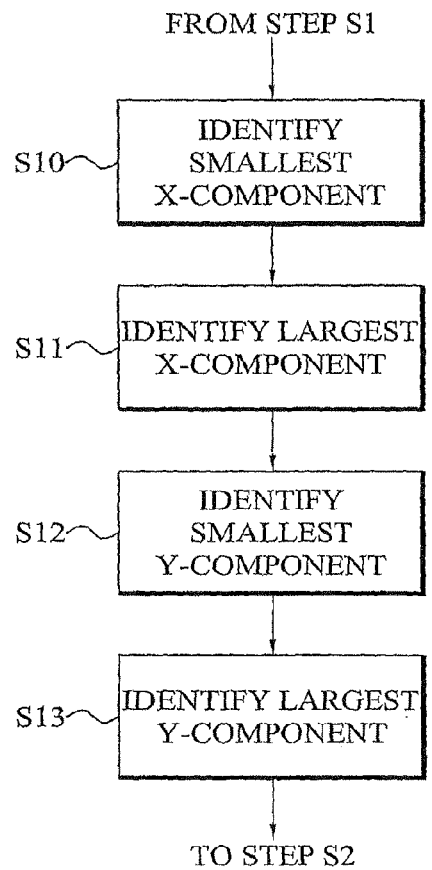
FIG. 5 is a flow diagram illustrating additional steps of the encoding and compressing method of FIG. 1.

FIG. 5 is a flow diagram illustrating additional steps of the compressing method of FIG. 1. In the following description of possible implementation embodiments, it is assumed that one of the first and second vector components is an X-coordinate of a surface normal and the other of the first and second vector components is a corresponding Y-coordinate of the surface normal. The method continues from step S1 in FIG. 1. In a next step S10, a smallest X-component or -coordinate of the image elements in the block is identified. This could simply be performed through an exhaustive search.

A next step S11 identifies the largest original X-coordinate value in the image block. This identification is performed in a similar manner to what is described above. The next two steps S12 and S13 identify the smallest and largest Y-coordinates in the image block.

The method continues to step S2, where the four codewords are determined based on the identified smallest and largest X- and Y-coordinates. In a preferred implementation, the first codeword is determined based on the smallest X-coordinate, the second codeword is determined based on the largest X-coordinate and the third and fourth codewords are preferably determined based on the smallest and largest Y-coordinate, respectively.

In a typical implementation, the smallest and largest X/Y-coordinates are each in eight bits and the codewords are 8-bit words. These four coordinates can therefore directly be employed as codewords. However, in other implementations, the number of bits per codeword and coordinate may be different. In such a case, the codewords could be calculated as compressed representations of the smallest and largest X/Y-coordinates.

These smallest and largest X- and Y-coordinates or the corresponding codewords can be used in the resolution number selection of step S3 in FIG. 1. Thus, these coordinates can be used as representations of the distribution of the X-coordinates and Y-coordinates of the image elements. In a first implementation, the distribution along the X-axis is defined as the difference between the largest and the smallest original X-coordinate. The Y-coordinate distribution is then calculated in a similar manner using the largest and smallest original Y-coordinates. The criterion for resolution selection can then be a quotient between these two differences.

In an alternative approach, the average X- and Y-coordinates and the respective standard X/Y-deviations are determined from the original X- and Y-values in the image block. These parameters could then be used as representations of the distribution of the original X- and Y-values in the selection of resolution numbers. Actually, any parameter(s) representative of the distribution of X- and Y-coordinates could be employed in the selection of step S3 and is within scope of the technology disclosed herein.

The technology disclosed herein can also be applied to usage of differential codewords, which is described in more detail below. Differential codewords means a codeword represents a difference value that is added to a component value encoded by another codeword.

FIG. 6 is a flow diagram illustrating a possible implementation of the selection step S3 of FIG. 1. The method continues from step S2 of FIG. 1. In a next step S20, a first difference between largest and smallest X-coordinates and a second difference between the largest and smallest Y-coordinates are calculated. A quotient Q between these two differences is then calculated in step S20 and employed as discriminating parameter.

In this embodiment of the technology disclosed herein, it is assumed that at least three different resolution numbers are available. The first such number is denoted default resolution value $N_1^D$, $N_2^D$, one for each of X and Y-coordinates. Corresponding, increased resolution numbers $N_1^I$, $N_2^I$ and reduced resolution numbers $N_1^R$, $N_2^R$ are available, where $N_1^R < N_1^D < N_1^I$ and $N_2^R < N_2^D < N_2^I$. In a preferred implementation $N_1^D = N_2^D$, $N_1^I = N_2^I$ and $N_1^R = N_2^R$. A typical preferred value for the default resolution numbers is six. Correspondingly, preferred increased resolution numbers are fourteen and thirty and preferred reduced resolution numbers are two and zero.

In a next step S21, the quotient Q is compared with a minimum threshold k. If the quotient is smaller than this difference, the distribution of the Y-vector components is comparatively larger than the distribution of the X-vector components. In such a case, it is preferred to select a larger resolution number, i.e. the so-called increased resolution number $N_2^I$, for the Y-coordinate and a smaller resolution number, i.e. the reduced resolution number $N_1^R$, for the X-coordinate in a next step S22. This means that the number of potential Y-coordinate values is larger than the number of potential X-coordinate values.

If, however, the quotient Q is equal to or larger than the minimum threshold k, the method continues to step S23, where the quotient is compared to a maximum threshold h. If the quotient exceeds the threshold h, the distribution along the X-axis of the original vector components is comparatively larger than the distribution along the Y-axis (see FIG. 3B). In such a case, the increased resolution number $N_1^I$ is selected for the X-coordinate and the reduced resolution number $N_2^R$ for the Y-coordinate in step S24. The resulting distribution of potential coordinate values may then be as illustrated in FIG. 8B. If the quotient Q is within the interval defined by the two thresholds k, h, the method continues to step S23, where the default resolution numbers $N_1^D$, $N_2^D$ are selected. An example of original vector components that would fall within this category is illustrated in FIG. 3A, with an example of the resulting coordinate value layout as illustrated in FIG. 8A.

It is anticipated by the technology disclosed herein that the order of the two threshold comparison steps S21 and S23 may be interchanged from what is illustrated in the figure. In such a case, the quotient is first compared to the maximum threshold and if it does not exceed this threshold, it will be compared to the minimum threshold. The overall result will be the same as is illustrated in FIG. 6.

The concept of minimum and maximum thresholds described above can of course be extended to usage of multiple minimum and/or maximum threshold values. In a preferred implementation, two minimum thresholds $k_1$, $k_2$ and two maximum thresholds $h_1$, $h_2$ are preferably employed. The threshold can then have the following values $$k_1 = \frac{1}{2^m},$$

$$k_2 = \frac{1}{2^n},$$

-continued $$h_1 = 2^m$$

and $$h_2 = 2^n,$$

where m<n. Preferred values are m=1 and n=3. Preferred values for the resolution numbers for different aspect ratios (quotient Q) are given below in Table 2.

TABLE 2

| | resolution numbers | |
|---|---|---|
| aspect ratio Q | X-resolution number $N_1$ | Y-resolution number $N_2$ |
| Q < 1/8 | 0 | 30 |
| 1/8 ≤ Q < 1/2 | 2 | 14 |
| 1/2 ≤ Q ≤ 2 | 6 | 6 |
| 2 < Q ≤ 8 | 14 | 2 |
| Q > 8 | 30 | 0 |

The resulting distribution of X- and Y-coordinate values are therefore, preferably, 2×32, 4×16, 8×8, 16×4 and 32×2. In all of these possible distributions, the total number of potential coordinate representations is 64.

Decompression

Figure 7:
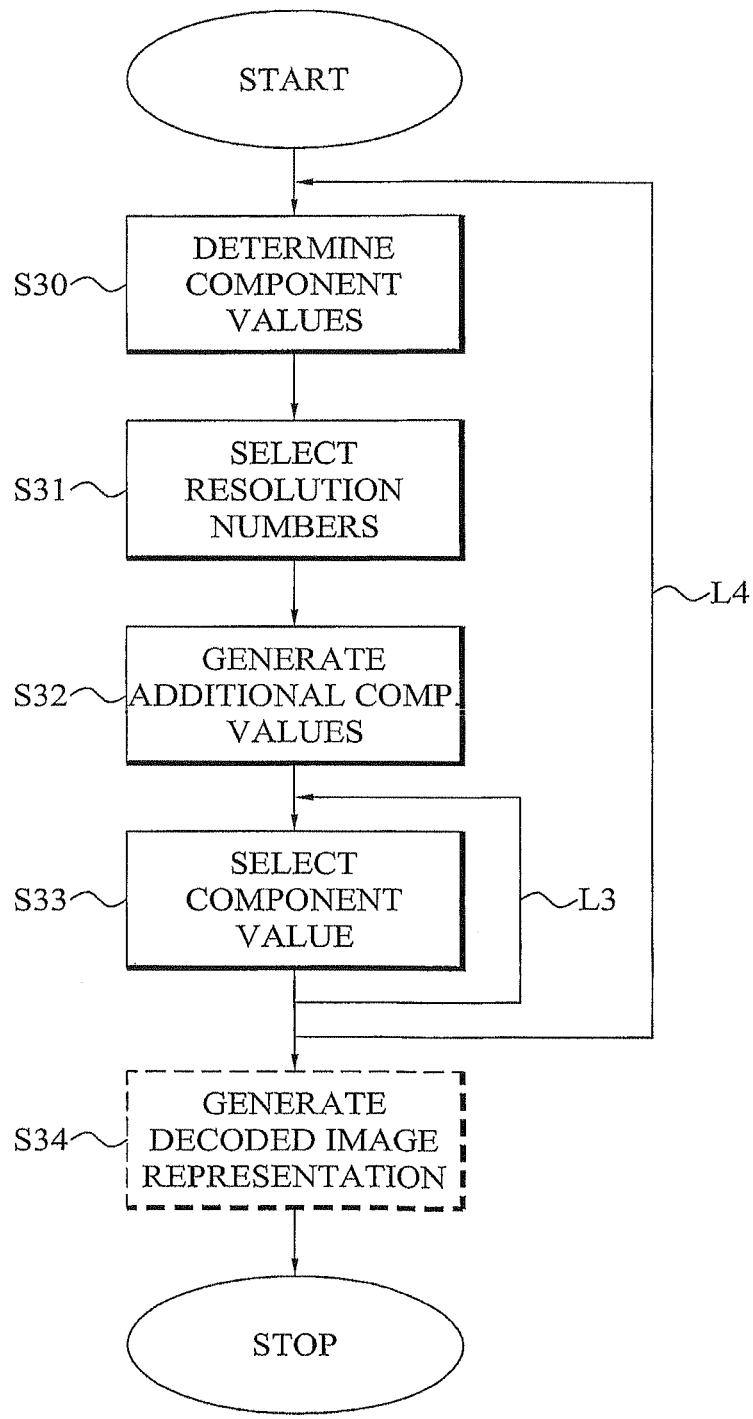
FIG. 7 is a flow diagram illustrating an image decoding method and an image block decompression method according to an embodiment of the technology disclosed herein.

FIG. 7 illustrates a flow diagram of a method of decoding an encoded image or encoded version of an original image according to the technology disclosed herein. The encoded image basically comprises several encoded representations of image blocks. These encoded block representations are preferably generated by the image encoding method discussed above.

The method generally starts by identifying encoded image block(s) to decode. It could be possible that all encoded image blocks of an encoded image should be decoded to generate a decoded representation of the original image. Alternatively, only a portion of the original image is to be accessed. As a consequence, only a selected number of image blocks have to be decoded (or more precisely, a selected number of image elements of certain image blocks have to be decoded).

Once the correct encoded (representation(s) of) image block(s) is identified, step S30 determines representation values from the codewords in the compressed image block representation. In this value determination, a first component value, e.g. a first X-coordinate or -component, is determined based at least partly on the first codeword, a second component value, e.g. a second X-coordinate, is determined based at least partly on the second codeword. Correspondingly, a third component value, e.g. a first Y-coordinate, is determined based at least partly on the third codeword and a fourth component value, e.g. a second Y-coordinate, is determined based at least partly on the fourth codeword.

In a preferred implementation, both the codewords and the component values are 8-bit words so that there is a one-to-one relationship between the codewords and the values. In such a case, the respective component value is simply determined by extracting the relevant bits from the compressed block. However, if codewords are compressed representations of the component values, the values can be determined by expanding or extending the codewords. For example, a 4-bit codeword of $1011_{bin}$ can be expanded into $10111011_{bin}$.

In an alternative approach differential encoding has been employed. In such a case, the first and third component values are obtained from the first and third codewords as described above. However, the second and fourth codewords represents difference values that are added to the first and third component value, respectively, to obtain the second and fourth component values. For example, assume that the first and second component values are 89 and 100, respectively. In such a case, the first codeword could be $01011011_{bin}$=89 and the second codeword is $0110010_{bin}$=100. In an alternative approach, the difference between these to values 100−89=11=$1011_{bin}$ is used as second codeword and, thus, both the first and second codewords are required for calculating the second representation value.

In a next step S31, resolution numbers $N_1$, $N_2$ for the two image element properties are selected. This step S31 basically corresponds to step S3 of FIG. 1, though possibly with slight modification. In step S3, the resolution numbers $N_1$, $N_2$ could be selected based on a relation of the distribution of the first vector components (X-coordinates) and the distribution of the second vector components (Y-coordinates) of the image elements. Thus, either at least a portion of these vector components, the codewords (which are determined based on the vector components) or first to fourth component values (obtainable through the codewords) could be used in the selection. In the current step S31, the vector components of the image element feature vectors in the compressed block are not available. As a consequence, the selection of resolution numbers $N_1$, $N_2$ is performed based on the four codewords or the four component values determined in step S30. The discussion of resolution numbers and the selection thereof provided in the foregoing applies mutatis mutandis to this step S31.

The next step S32 generates additional component values. This step S32 basically corresponds to step S4 of FIG. 1. Thus, the first and second codewords (X-codewords) or the first and second component values (X-coordinates) are employed for determining $N_1$ additional first component values (additional X-coordinates). In a preferred implementation, the additional first component values, $X_i$, are determined as a linear combination of the first component value, $X_{min}$, and the second component value, $X_{max}$ see equation 2 above. The third and fourth codewords (Y-codewords) or the third and fourth component values (Y-coordinates) are also employed in this step S32 for determining $N_2$ additional second component values (additional Y-coordinates). This is preferably performed as a linear combination according to equation 3 above.

In a next step S33, component values to use as representations of the original first and second (X and Y) vector components of an image elements are selected based on the first component index and the second component index associated with the image element. In this step S33 the first component index is used to select a component value from i) the first component value, ii) the second component value, and iii) the $N_1$ additional first component values. Correspondingly, the second component index is used to select a component value from i) the third component value, ii) the fourth component value, and iii) the $N_2$ additional second component values. Thus, in this step S33, preferably, an X-coordinate and a Y-coordinate is selected for the current image element to be decoded Step S33 could be performed for several image elements in the image block (schematically illustrated by line L3). It is anticipated by the technology disclosed herein that in some applications, only a single image element is decoded from a specific image block, multiple image elements of a specific image block are decoded and/or all the image elements of a specific block are decoded.

Steps S30 to S33 are then preferably repeated for all image blocks that comprise image elements that should be decoded (schematically illustrated by line L4). This means that the loop of steps S30 to S33 could be performed once, but most often several times for different encoded image blocks and/or several times for a specific encoded image block.

In the optional step S34, a decoded representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

The resolution number selection step S31 of FIG. 7 is preferably performed as illustrated in FIG. 6, previously described in this document. In such a case, the method continues from step S30 of FIG. 7. In a next step S20, a quotient Q of the difference between the second and first component values and the difference between the fourth and third component values is calculated. This quotient is then compared to different maximum and minimum thresholds as described above in connection with FIG. 6 to select between the default resolution numbers $N_1^D$, $N_2^D$, the increased resolution numbers $N_1^I$, $N_2^I$ and the reduced resolution numbers $N_1^R$, $N_2^R$. The actual selection of these resolution numbers is performed as previously described in connection with FIG. 6 and is not repeated herein.

DECOMPRESSION EXAMPLES

Herein follows decompression examples using a bit sequence layout as illustrated in FIG. 4.

Example 1

The compressed image block is represented by the following bit sequence:
01001100 10110001 110 001 . . . 001
00100000 01011001 101 110 . . . 010

Firstly, bit0-bit7 represent the first X-codeword 710, bit8-bit15 are the second X-codeword 720, bit16-bit63 represent the X-index sequence 750 with 3-bit indices (in the listing above only three such indices have been indicated). The bit64-bit71 represent the first Y-codeword 730 and bit72-bit79 are the second Y-codeword 740. Thereafter, follows the Y-index sequence 760 with 3-bit indices, of which only three have been indicated.

The first X-coordinate value is given from the first X-codeword:
$01001100_{bin}=76$ The second X-codeword gives the second X-coordinate:
$10110001_{bin}=177$ The two Y-coordinates are obtained from the two Y-codewords in a similar manner:
$00100000_{bin}=32$
$01011004_{bin}=89$ A quotient Q between the differences 177−76=101 and 89−32=57 becomes 101/57≈1.77. In the following examples the resolution numbers and maximum/minimum thresholds of Table 2 are employed. In this example the quotient is within the interval ½≤Q≤2. As a consequence, the default resolution number six should be employed for both the X and Y resolution numbers.

The additional X-coordinates are calculated from the equation 2, $$X_i = 76 + i \times \frac{177-76}{6+1},$$

where i=1, . . . , 6. The additional X-coordinates are, thus, 90.4, 104.9, 119.3, 133.7, 148.1 and 162.6. The additional Y-coordinates are calculated from equation 3, $$Y_j = 32 + j = 32 \times \frac{89-32}{6+1},$$

where j=1, . . . , 6. The resulting coordinates are 40.1, 48.3, 56.4, 64.6, 72.7 and 80.6.

The available X-coordinates become 76, 90.4, 104.9, 119.3, 133.7, 148.1, 162.6 and 177. The corresponding Y-coordinates are 32, 40.1, 48.3, 56.4, 64.6, 72.7, 80.6 and 89.

FIG. 8A could be a representation of this example. In the figure the maximum X-coordinate 12 has a value of 177, the minimum X-coordinate 10 is 76. The corresponding values for the Y-coordinates are 32 for the minimum Y-coordinate 20 and 89 for the maximum coordinate 22. These minimum 10, 20 and maximum 12, 22 values form, together with the additional component values 14, 24, a grid of possible coordinate points as illustrated in the figure.

The X- and Y-indices of the image elements are then employed for selecting coordinates as exemplified by Table 3.

TABLE 3

| X/Y-index | coordinate | |
|---|---|---|
| | X-coordinate | Y-coordinate |
| $000_{bin}$ | 76 | 32 |
| $001_{bin}$ | 90.4 | 40.1 |
| $010_{bin}$ | 104.9 | 48.3 |
| $011_{bin}$ | 119.3 | 56.4 |
| $100_{bin}$ | 133.7 | 64.6 |
| $101_{bin}$ | 148.1 | 72.7 |
| $110_{bin}$ | 162.6 | 80.6 |
| $111_{bin}$ | 177 | 89 |

The first image element in the block has X-index $110_{bin}$ and Y-index $101_{bin}$, which means that it should be assigned the values (X,Y)=(162.6, 80.6). In a preferred implementation, the X- and Y-coordinates are divided by 255 and remapped into the interval [−1,1]:2×162.6/255−1=0.28 and 2×80.6/255−1=−0.37. The Z-coordinate representation for the image element is then calculated, using equation 1, from these two remapped values: $\sqrt{1-0.28^2-(-0.37)^2}=0.89$. Thus, the final normalizes surface normal (feature vector representation) for the first image element is (X,Y,Z)=(0.28, −0.37, 0.89). This procedure can then be continued for the remaining image elements in the block that should be decoded.

Example 2

The compressed image block is represented by the following bit sequence:
00001100 10110001 1100 0101 . . . 1010
00100000 01011001 1110 . . . 0001 00 10 . . . 01

Firstly, bit0-bit7 represent the first X-codeword 710, bit8-bit15 are the second X-codeword 720, bit16-bit63 and bit80-bit95 include the 4-bit indices of the X-index sequence, of which only five has been indicated above. The bit64-bit71 represents the first Y-codeword 730 and bit72-bit79 is the second Y-codeword 740. Thereafter, follows the Y-index sequence 760 with 2-bit indices (bit96-bit127), of which only three has been indicated.

The first X-coordinate is given from the first X-codeword:
$00101100_{bin}=12$

The second X-codeword gives the second X-coordinate:
$10110001_{bin}=177$

The two Y-coordinates are obtained from the two Y-codewords in a similar manner:
$00100000_{bin}=32$
$01011001_{bin}=89$ A quotient Q between the differences 177−12=165 and 89−32=57 becomes 165/57≈89. According to Table 2 this quotient is within the interval 2<Q≤8. As a consequence, the increased resolution number 14 should be employed for the X resolution number, whereas the reduced resolution number two is available for the Y resolution number.

The additional X-coordinates are calculated from the equation 2, $$X_i = 12 + i \times \frac{177-12}{14+1},$$

where i=1, ..., 14. The additional X-representations are, thus, 23, 34, 45, 56, 67, 78, 89, 100, 111, 122, 133, 144, 155 and 166. The additional Y-coordinates are calculated from equation 3, $$Y_j = 32 + j \times \frac{89-32}{2+1},$$

where j+1, 2. The resulting Y-coordinates are 51 and 70.

The available X-coordinates become 12, 23, 34, 45, 56, 67, 78, 89, 100, 111, 122, 133, 144, 155, 166 and 177. The corresponding Y-coordinates are 32, 51, 70 and 89.

FIG. 8B could be a representation of this example. In the figure the maximum X-coordinate 12 has a value of 177, the minimum X-component 10 is 12. The corresponding values for the Y-coordinates are 32 for the minimum Y-coordinate 20 and 89 for the maximum coordinate 22. These minimum 10, 20 and maximum 12, 22 values form, together with the additional component values 14, 24, a grid of possible coordinate points as illustrated in the figure. As compared to FIG. 8A and the example 1 above, the number of possible X-coordinates is larger in this case, though at the cost of available Y-coordinates.

The X- and Y-indices of the image elements are then employed for selecting coordinate representations as exemplified by Table 4.

TABLE 4

| coordinates | | | |
|---|---|---|---|
| X-index | X-coordinate | Y-index | Y-coordinate |
| $0000_{bin}$ | 12 | $00_{bin}$ | 32 |
| $0001_{bin}$ | 23 | $01_{bin}$ | 51 |
| $0010_{bin}$ | 34 | $10_{bin}$ | 70 |
| $0011_{bin}$ | 45 | $11_{bin}$ | 89 |
| $0100_{bin}$ | 56 | | |
| $0101_{bin}$ | 67 | | |
| $0110_{bin}$ | 78 | | |
| $0110_{bin}$ | 89 | | |
| $1000_{bin}$ | 100 | | |
| $1001_{bin}$ | 111 | | |

TABLE 4-continued

| coordinates | | | |
|---|---|---|---|
| X-index | X-coordinate | Y-index | Y-coordinate |
| $1010_{bin}$ | 122 | | |
| $1011_{bin}$ | 133 | | |
| $1100_{bin}$ | 144 | | |
| $1101_{bin}$ | 155 | | |
| $1110_{bin}$ | 166 | | |
| $1111_{bin}$ | 177 | | |

The first image element in the block has X-index $1100_{bin}$ and Y-index $00_{bin}$, which means that it should be assigned the values (X,Y)=(144, 32). If a remapping into the interval [−1, 1] is used these values become: 2×144/255−1=0.13 and 2×32/255−1=−0.75. The Z-coordinate representation for the image element is then calculated, using equation 1, from these two remapped values: $\sqrt{1-0.13^2-(-0.75)^2}=0.76$. Thus, the final normal for the first image element is (X,Y,Z)=(0.13, −0.75, 0.76). This procedure can then be continued for the remaining image elements in the block that should be decoded.

Implementation Aspects

The image encoding (image block encoding) and image decoding (image block decoding or processing) scheme according to the technology disclosed herein could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

User Terminal

FIG. 9 illustrates a user terminal 100 represented by a mobile unit. However, the technology disclosed herein is not limited to mobile units but could be implemented in other terminals and data processing units, such as PC computers and game consoles. Only means and elements in the mobile unit 100 directly involved in the technology disclosed herein are illustrated in the figure.

The mobile unit 100 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular encoded image data (encoded image blocks) according to the technology disclosed herein.

An image encoder 210 according to the technology disclosed herein is typically provided in the mobile unit 100. This encoder 210 is configured for encoding an image or texture into an encoded representation of the image (or texture). As was discussed above, such an encoded representation comprises a sequence or file of multiple encoded image blocks. This image encoder 210 may be provided as software running on the CPU 200, as is illustrated in the figure. Alternatively, or in addition, the encoder 210 could be arranged in the graphic system 130 or elsewhere in the mobile unit 100.

An encoded representation of an image from the block encoder 210 may be provided to the memory 140 over a (memory) bus 150, for storage therein until a subsequent rendering of the image. Alternatively, or in addition, the encoded image data may be forwarded to an input and output (I/O) unit 110 for (wireless or wired) transmission to other external terminals or units. This I/O unit 110 can also be adapted for receiving image data from an external unit. This image data could be an image that should be encoded by the image encoder 210 or encoded image data that should be decoded. It could also be possible to store the encoded image representation in a dedicated texture memory provided, for example, in the graphic system 130. Furthermore, portions of the encoded image could also, or alternatively, be (temporarily) stored in a texture cache memory, e.g. in the graphic system 130.

An image decoder 220 according to the technology disclosed herein is typically provided in the mobile unit 100 for decoding an encoded image in order to generate a decoded image representation. This decoded representation could correspond to the whole original image or a portion thereof. The image decoder 220 provides decoded image data to the graphic system 130, which in turn typically processes the data before it is rendered or presented on the screen 120. The image decoder 220 can be arranged in the graphic system 130, as is illustrated in the figure. Alternatively, or in addition, the decoder 200 can be provided as software running on the CPU 200 or elsewhere in the mobile unit 100.

The mobile unit 100 could be equipped with both an image encoder 210 and an image decoder 220, as is illustrated in the figure. However, for some terminals 100 it could be possible to only include an image encoder 210. In such a case, encoded image data could be transmitted to another terminal that performs the decoding and, possibly, rendering of the image. Correspondingly, a terminal 100 could only include an image decoder 220, i.e. no encoder. Such a terminal 100 then receives a signal comprising encoded image data from another entity and decodes it to generate a decoded image representation. Thus, the encoded image signal could be wirelessly be transmitted between terminals using radio transmitter and receiver. Alternatively, other techniques for distributing images and encoded image representations between terminals according to the technology disclosed herein could be employed, such as BLUETOOTH®, IR-techniques using IR ports and wired transferring of image data between terminals. Also memory cards or chips that can be connected and exchanged between terminals could be used for this image data inter-terminal distribution.

The units 110, 130, 200, 210 and 220 of the mobile unit 100 may be provided as software, hardware or a combination thereof.

Image Encoder

FIG. 10 illustrates a block diagram of an embodiment of an image encoder 210 according to the technology disclosed herein. The encoder 210 typically comprises an image decomposer 215 for decomposing or dividing an input image into several image blocks. The decomposer 215 is preferably configured for decomposing the image into image blocks comprising sixteen image elements (pixels, texels or voxels), i.e. having a general size of 4×4 image elements. This decomposer 215 could be adapted for decomposing different input images into image blocks with different sizes. In such a case, the decomposer 215 preferably receives input information, enabling identification of which image block format to use for a given image.

This embodiment of the image encoder 210 comprises a single block encoder 300. This block encoder 300 encodes the image block(s) received from the image decomposer to generate encoded block representation(s). The overall size of the block representation is smaller than the corresponding size of the uncoded image block. The block encoder 300 is preferably configured for processing (encoding) each image block from the decomposer 215 sequentially.

In an alternative implementation, the encoder 210 includes multiple block encoders 300 for processing multiple image blocks from the image decomposer 215 in parallel, which reduces the total image encoding time.

The units 215 and 300 of the image encoder 210 may be provided as software, hardware or a combination thereof. The units 215 and 300 may be implemented together in the image encoder 210. Alternatively, a distributed implementation is also possible with some of the units provided elsewhere in the mobile unit.

Block Encoder

FIG. 11 illustrates a block diagram of an embodiment of a block encoder 300 according to the technology disclosed herein, such as the block encoder of the image encoder in FIG. 10. The encoder 300 comprises a codeword or coordinate quantizer 310 that is arranged for determining codewords for an image block to be encoded. This coordinate quantizer 310 determines a first and a second codeword based on at least a portion of the first vector components of the image element feature vectors. In a typical implementation, the first codeword is a representation of a smallest first (X) vector component in the block and the second codeword is a representation of a largest first (X) vector component. The two codewords are representations of a first and a second component value.

The coordinate quantizer 310 also determines a third and fourth codeword based on at least a portion of the second (Y) vector components of the image elements. These two codewords are representations of a third and a fourth component value.

A resolution selector 320 is arranged in the block encoder 300 for selecting a first resolution number $N_1$ and a second resolution number $N_2$, where $N_1$ and $N_2$ independently are zero or a non-zero integer, with the proviso that $N_1$ and $N_2$ are not both zero. This number selection is performed by the selector 320 based on a relation of the distribution of the first vector components and the distribution of the second vector components. This relation can be determined based on the four codewords generated by the coordinate quantizer 310 or the four component values encoded by the codewords.

The block encoder 300 also comprises a value generator 330 for generating, based on the first and second codewords or the first and second component values, $N_1$ additional first component values. In addition, the generator 330 generates, based on the third and fourth codewords or the third and fourth component values, $N_2$ additional second component values.

The component value of the component set containing the first component value, the second component value and the $N_1$ additional first component values, that best represents the first vector component of an image element in the block is identified by the block encoder 300, preferably by means of an error estimator 350 arranged therein. A first component index associated with the identified component value is then provided by an index provider 340. Thus, this first component index allows identification of the component value that best represents the original first vector component of that image element's feature vector. A corresponding procedure is performed by the error estimator 350 for a second component set containing the third component value, the fourth component value and the $N_2$ additional second component values (unless $N_2=0$). Thus, the component value from the second set that best represents the original second vector component of the image element is identified by the error estimator 350. The index provider 340 then provides a second component index for the image element that is associated with the identified component value. In an alternative approach, the first and/or second component sets only comprises the $N_1$ and $N_2$ additional component values, respectively.

The error estimator 350 is preferably implemented to estimating, for each component value of the first component set, an error estimate indicative of representing the first vector component of an image element with that component value. The estimator 350 also estimates, for each component value of the second component set, an error estimate indicative of representing the second vector component of the image element with the component value. The index provider 340 then uses these error estimates for selecting first and second component indices. Thus, the first component index is associated with the component value of the first component set resulting in the smallest error estimate. Correspondingly, the second component index is associated with the component value of the second set that resulted in the smallest error estimate.

The units 310 to 350 of the block encoder 300 may be provided as software, hardware or a combination thereof. The units 310 to 350 may be implemented together in the block encoder 300. Alternatively, a distributed implementation is also possible with some of the units provided elsewhere in the image encoder.

FIG. 12 is a block diagram schematically illustrating an embodiment of the coordinate quantizer 310 of FIG. 11 in more detail. This quantizer 310 comprises a first or X-coordinate quantizer 312 that is employed for determining two codewords for the first vector components of the image element, typically X-components or coordinates. In a preferred implementation, this X-coordinate quantizer 312 is arranged for identifying a smallest and a largest original X coordinate of the image elements' feature vectors. The quantizer 312 then determines the first and second X-codeword based on the smallest and largest X-value, respectively. For example, if the largest original X-value in the block is $178=10110010_{bin}$, this value can be used directly as an 8-bit X-codeword. However, if, for example, the largest original X-value is 178.85 then the value cannot be exactly represented with an 8-bit integer word. In such a case, the X-codeword could be $10110011_{bin}=179$, i.e. the closest possible representable value.

The coordinate quantizer 310 also comprises a second or Y-coordinate quantizer 314 used for determining two codewords for the second vector component of the feature vectors, typically Y-coordinates. This Y-coordinate quantizer 314 preferably determines a first and a second Y-codeword based on the smallest and largest Y-coordinate in the image block.

The units 312 and 314 of the coordinate quantizer 310 may be provided as software, hardware or a combination thereof. The units 312 and 314 may be implemented together in the coordinate quantizer 310. Alternatively, a distributed implementation is also possible with some of the units provided elsewhere in the block encoder.

FIG. 13 is a block diagram schematically illustrating an embodiment of the resolution selector 320 of FIG. 11 in more detail. This selector 320 comprises a quotient calculator 322 that is arranged for determining a parameter that is representative of the relation of the distribution of the original X-vector components and the distribution of the original Y-vector components among the image elements in the image block. In a preferred implementation, the parameter is quotient between an X-value difference and a Y-value difference. The X-value difference can be calculated as the largest original X-coordinate subtracted by the smallest X-coordinate. An alternative approach is to subtract the second X-component value (generated from the second X-codeword) with the first X-component value (providable from the first X-codeword). The Y-value difference can be determined in a similar manner from the largest and smallest original Y-vector components or the two Y-component values obtainable from the two Y-codewords.

Once the quotient, Q, has been determined, information thereof is forwarded to a comparator 324 arranged in the resolution selector for comparing the quotient to different pre-defined threshold values. In a preferred implementation four different thresholds are employed A, B, C and D, where A<B<C<D. Thus if Q<A, first X and Y resolution numbers are selected by the resolution selector 320, if A≤Q<B second X and Y resolution number are selected, if B≤Q≤C third X and Y resolution number are selected, if C<Q≤D fourth X and Y resolution numbers are selected and finally if Q>D fifth resolution number are selected. In a preferred implementation $A=\frac{1}{2}^m$, $B=\frac{1}{2}^n$, $C=2^n$ and $D^m$. Most preferably, m is three and n is one. The first X and Y resolution numbers are preferably zero and 30, the second X and Y resolution number are preferably two and 14, the third X and Y resolution numbers are preferably both six, the fourth X and Y resolution number are preferably 14 and two and the fifth resolution number are preferably 30 and zero, respectively.

In an alternative approach only two threshold values are employed by the comparator 324. Thus, if the quotient is within the interval [E, F], where E<F, default X and Y resolution number are employed (preferably each six), if the quotient is smaller than E a decreased X resolution number and an increased Y resolution number are used and if the quotient exceeds F an increased X resolution number and a decreased Y resolution are employed. The decreased X/Y resolution number is preferably two or zero, the increased X/Y resolution number is preferably 14 or 30, E is preferably ½, ¼ or ⅛ and F is preferably 2, 4 or 8.

The units 322 and 324 of the resolution selector 320 may be provided as software, hardware or a combination thereof. The units 322 and 324 may be implemented together in the resolution selector 320. Alternatively, a distributed implementation is also possible with some of the units provided elsewhere in the block encoder.

FIG. 14 is a block diagram schematically illustrating an embodiment of the additional value generator 330 of FIG. 11 in more detail. This value generator 330 comprises a first or X-value generator 332. This X-value generator 332 uses the two X-codewords or the two X-coordinates represented by the two X-codewords for determining a number of additional X-coordinate values, where the number is the X resolution number determined by the resolution selector. The generator 332 preferably determines the additional X-values as linear combinations of the two X-coordinate values. More preferably, the generator 332 is implemented for employing equation 2 or a corresponding equation for generating the additional X-coordinate values.

A Y-value generator 334 is also implemented in the value generator 330 for generating $N_2$ additional Y-coordinate values using the two Y-codewords or the two Y-coordinate values derivable from the codewords, where $N_2$ is the Y resolution number selected by the resolution selector. The generator 334 preferably uses equation 3 above for determining the additional Y-coordinate values as linear combination of the two Y-coordinate values.

The units 332 and 334 of the additional value generator 330 may be provided as software, hardware or a combination thereof. The units 332 and 334 may be implemented together in the value generator 330. Alternatively, a distributed implementation is also possible with some of the units provided elsewhere in the block encoder.

FIG. 15 is a block diagram schematically illustrating an embodiment of the index provider 340 of FIG. 11 in more detail. This index provider 340 comprises an X-index provider 342 that is arranged for providing an X-index associated with the X-coordinate selected, using the error estimates from the error estimator, as representation of the original X-vector component of an image element. Correspondingly, a Y-index provider 344 of the index provider 340 is implemented for providing a Y-index indicative of the Y-coordinate selected as representation of the original Y-vector component of the image element.

The relative sizes of these X- and Y-indices in terms of number of bits are dependent on the X- and Y-resolution numbers selected by the resolution selector. Therefore the index selector 340 preferably receives input of the actual number selection from the selector. In a preferred implementation, the indices can be 1-bit, 2-bit, 3-bit or 4-bit indices. Of course all X-indices of an image block have the same size and all Y-indices of an image block have the same size, which may be the same or different from the X-index size. However, note the bit-size of the X/Y-indices from a first image block of an image may be different from the size of the X/Y-indices in a second image block of that image, depending on the relative distribution of the original X- and Y-coordinates in the two image blocks.

The units 342 and 344 of the index selector 340 may be provided as software, hardware or a combination thereof. The units 342 and 344 may be implemented together in the index selector 340. Alternatively, a distributed implementation is also possible with some of the units provided elsewhere in the block encoder.

Image Decoder

FIG. 16 illustrates a block diagram of an embodiment of an image decoder 220 according to the technology disclosed herein. The image decoder 220 preferably comprises a block selector 222 that is adapted for selecting, e.g. from a memory, which encoded image block(s) that should be provided to a block decoder 400 for decoding. The block selector 222 preferably receives input information associated with the encoded image data, e.g. from a header or a rendering engine. An address of an encoded image block having the desired image element(s) is then computed based on the input information. This computed address is preferably dependent upon the image-element (pixel, texel or voxel) coordinates within an image. Using the address, the block selector 222 identifies the encoded image block from the memory. This identified encoded image block is then fetched from the storage and provided to the block decoder 400.

The (random) access to image elements of an image block advantageously enables selective decoding of only those portions of an image that are needed. Furthermore, the image can be decoded in any order the data is required. For example, in texture mapping only portions of the texture may be required and these portions will generally be required in a non-sequential order. Thus, the image decoding of the technology disclosed herein can with advantage by applied to process only a portion or section of an image.

The selected encoded image block is then forwarded to the block decoder 400. In addition to the image block, the decoder 400 preferably receives information specifying which image elements of the block that should be decoded. The information could specify that the whole image block, i.e. all image elements therein, should be decoded. However, the received information could identify only a single or a few of the image elements that should be decoded. The block decoder 400 then generates a decoded representation of the image element(s) in the block. This decoded representation is preferably a P-bit X-coordinate value and a P-bit Y-coordinate value, where P is the number of bits per X- and Y-coordinate per image element in the original image.

An optional image composer 224 could be provided in the image decoder 220. This composer receives the decoded image elements from the block decoder 400 and composes them to generate a pixel that can be rendered or displayed on a screen. This image composer 224 could alternatively be provided in the graphic system.

Alternatively, the image decoder 220 comprises multiple block decoders 400. By having access to multiple block decoders 400, the image decoder 220 can process (decode) multiple encoded image blocks in parallel. These multiple block decoders 400 allow for parallel processing that increases the processing performance and efficiency of the image decoder 220.

The units 222, 224 and 400 of the image decoder 220 may be provided as software, hardware or a combination thereof. The units 222, 224 and 400 may be implemented together in the image decoder 220. Alternatively, a distributed implementation is also possible with some of the units provided elsewhere in the user terminal.

Block Decoder

FIG. 17 is an illustration of an embodiment of a block decoder 400 according to the technology disclosed herein. The block decoder 400 comprises value generator 410 that uses the four codewords in the compressed image block for determining four representation values.

A resolution selector (420) of the block decoder uses the four codewords or the four component values determined by the generator 410 for selecting a first $N_1$ and a second $N_2$ resolution number. In a preferred implementation, this number selection is performed based on a comparison of the codewords or the component values and more preferably based on a quotient of a difference between the second and first codewords/component values and the fourth and third codewords/component values.

An additional value generator 430 uses the resolution numbers from the selector 420 and the component values determined by the value generator 410 for calculating $N_1$ additional first component values and $N_2$ additional second component values. The operation of this value generator 430 is similar the additional value generator of FIG. 11 and is not repeated herein.

The block decoder 400 also comprises a value selector that uses the index sequences of the compressed image block for selecting component values for the image elements in the block that should be decoded. This value selector 440 uses a first component index for an image element to select a first component from a first component set comprising the first and second component value from the value generator 410 and the $N_1$ additional first component values from the additional value generator 430. Correspondingly, the selector 440 employs the second component index for the image element to select a second component from a second component set comprising the third and fourth component value from the generator 410 and the $N_2$ additional second component values from the generator 430. Thus, a decoded image element will be assigned two component values as representations of the original first (X) and second (Y) vector components of the feature vector (surface normal) of that image element.

The units 410 to 440 of the block decoder 400 may be provided as software, hardware or a combination thereof. The units 410 to 440 may be implemented together in the block decoder 400. Alternatively, a distributed implementation is also possible with some of the units provided elsewhere in the image decoder.

FIG. 18 is a block diagram schematically illustrating an embodiment of the value generator 410 of FIG. 17 in more detail. This value generator 410 comprises minimum X generator 412 for generating a first X-coordinate based at least partly on the first codeword (first X-codeword). In a typical implementation, there is a one-to-one relation between the coordinate and the codeword so no calculation is required. Alternatively, the bit sequence of the codeword could be expanded to form the coordinate. A corresponding maximum X-generator 414 is provided for generating a second X-coordinate based at least partly on the second codeword (second X-codeword). If differential encoding has been employed both the first and second X-codewords are required in this coordinate generation, otherwise the second X-codeword is generally enough.

Corresponding minimum 416 and maximum 418 Y-generators are arranged for determining a first and a second Y-coordinate from the third codeword (first Y-codeword) and the fourth codeword (second Y-codeword).

The units 412 to 418 of the value generator 410 may be provided as software, hardware or a combination thereof. The units 412 to 418 may be implemented together in the value generator 410. Alternatively, a distributed implementation is also possible with some of the units provided elsewhere in the block decoder.

FIG. 19 is a block diagram schematically illustrating an embodiment of the resolution selector 420 of FIG. 17 in more detail. This resolution selector 410 comprises a quotient calculator 422 and a comparator 424. The operation of these two units is similar to what has been described in the foregoing in connection with FIG. 13 and is not repeated herein.

The units 422 and 424 of the resolution selector 420 may be provided as software, hardware or a combination thereof. The units 422 and 424 may be implemented together in the resolution selector 420. Alternatively, a distributed implementation is also possible with some of the units provided elsewhere in the block decoder.

FIG. 20 is a block diagram schematically illustrating an embodiment of the additional value generator 430 of FIG. 17 in more detail. This value generator 430 comprises an X-value generator 432 and a Y-value generator 434. The operation of these two units is similar to what has been described in the foregoing in connection with FIG. 14 and is not repeated herein.

The units 432 and 434 of the additional value generator 430 may be provided as software, hardware or a combination thereof. The units 432 and 434 may be implemented together in the additional value generator 430. Alternatively, a distributed implementation is also possible with some of the units provided elsewhere in the block decoder.

FIG. 21 is a block diagram schematically illustrating an embodiment of the value selector 440 of FIG. 17 in more detail. This value selector 440 comprises an X-value selector 442 and a Y-value selector 444. The X-value selector 442 retrieves the X-index assigned to an image element to be decoded from the compressed block sequence. This X-index is associated with an X-coordinate selected from an X-set comprising the first and second X-coordinates from the value generator and the $N_1$ additional X-coordinates. Thus, the X-index allows identification of an X-coordinate from the X-set to use as a representation of the original X-vector component of that image element. The Y-value selector 444 uses the Y-index of the image element from the compressed block to select a Y-coordinate from a Y-set comprising the first and second Y-coordinates and the $N_2$ additional coordinates.

The units 442 and 444 of the index selector 440 may be provided as software, hardware or a combination thereof. The units 442 and 444 may be implemented together in the index selector 440. Alternatively, a distributed implementation is also possible with some of the units provided elsewhere in the block decoder.

The image processing scheme of the technology disclosed herein has been compared with 3Dc [1] in terms of image quality. A set of 20 normal maps were tested and the technology disclosed herein resulted in increased PSNR (Peak Signal to Noise Ratio) for all maps [3]. The average PSNR for these 20 normal maps with 3Dc was 36.4 dB, whereas the technology disclosed herein had an average PSNR of 37.5 dB, i.e. over one dB image quality improvement, which is clearly noticeable for a viewer.

In another aspect the technology disclosed herein relates to methods and systems that can be applied to existing image/texture compressing/decompressing schemes and systems for the purpose of introducing a better utilization of the bit sequences representing compressed image blocks.

In the technology disclosed herein, the expression "default or standard processing (compressing or decompressing) mode" represents the normal processing (compressing or decompressing) procedure or algorithm dictated by a particular image or texture processing (compressing or decompressing) scheme, such as 3Dc [1], S3TC [2], etc. Thus, these default modes are the known prior art techniques employable for compressing an image or image block and decompressing a compressed image or image block. As a consequence, a default compressing mode generates a (default) compressed representation of an image block. According to the technology disclosed herein, the default compressed block representation comprises at least a first and a second bit sequence that are used for representing features of the image elements, preferably the original feature vectors of the image elements in the block. In a first implementation, the first bit sequence represents a first component value of a vector component and the second bit sequence represents a second component value of the vector component. For example, the first bit sequence could be a representation of a first X-, Y- or Z-component or coordinate value of a normalized surface normal, whereas the second bit sequence is a corresponding second X-, Y- or Z-component of the normal. This first implementation is in particular suited for the case where the default compressing scheme is 3Dc or another compression scheme used for compressing bump or normal map types of textures. In a second implementation, the first bit sequence comprises three vector components of a first feature vector and the second bit sequence likewise comprises three vector components of a second feature vector. The feature vectors are preferably chrominance vectors, such as vectors in the RGB space or another color space. In such a case, the respective three components are preferably a red, green and blue color component. This second implementation is in particular suited for the case where the default compressing scheme is S3TC or another compression scheme used for compressing textures comprising chrominance information.

For each such image processing scheme, the technology disclosed herein presents and utilizes at least one "auxiliary processing (compressing or decompressing) mode", in addition to the default processing (compressing or decompressing) mode. This auxiliary processing can be used to manage those image block types that the corresponding default mode handles poorly. For example, in 3Dc two component values are determined for the X- and Y-vector components. These two (X or Y) component values represent the end points of an interval, in which six additional (X or Y) component values are calculated as different linear combinations from the two end points. The smallest possible interval is when there is a difference of only one between the end points, such as, for instance, the interval [77, 78] or [−3, −4]. As a consequence, the maximum attainable resolution for 3Dc therefore becomes $1/7 \approx 0.14$ as there are six equidistanced intermediate component values between the end values. This may, however, not be enough for slowly varying surfaces.

The at least one auxiliary processing mode of the technology disclosed herein comes for free as it utilizes certain selected bit combinations that are not utilized according to the default mode or are redundant in the default mode. As a consequence, the technology disclosed herein introduces further ways of compressing/decompressing image blocks without affecting the default mode. For example, an auxiliary mode that allows a finer grade of resolution than 0.14 could be used as a complement to 3Dc. As a consequence, the combined scheme of this aspect of the technology disclosed herein with default and at least one auxiliary mode will at worst result in a same quality as the default mode. However, by being able to process certain image blocks that the default mode cannot handle efficiently, the introduction of the at least one auxiliary mode will for all practical implementations markedly increase the quality as compared to running only the default mode for all image blocks.

Decompression

FIG. 22 is a flow diagram illustrating a multi-mode method of processing (decompressing or decoding) a compressed representation of an image block comprising multiple image elements. The image block preferably has a layout as illustrated in FIG. 2 and the discussion in connection to that figure also applies to this aspect of the technology disclosed herein. The compressed block representation comprises at least a first bit sequence encoding a first feature codeword and a second sequence encoding a second feature codeword. In FIG. 22 and following figures this first codeword bit sequence is denoted $X_f$ and the second codeword bit sequence is denoted $X_1$.

The method generally starts by identifying encoded image block(s) to decode. It could be possible that all encoded image blocks of an encoded image should be decoded to generate a decoded representation of the original image. Alternatively, only a portion of the original image is to be accessed. As a consequence, only a selected number of image blocks have to be decoded (or more precisely, a selected amount of image elements of certain image blocks have to be decoded).

Once the correct encoded (representation(s) of) image block(s) is identified, step S40 extracts the first and second codeword bit sequence from the compressed block representation. The two codeword bit sequences are then employed, in step S41, as a selection sequence for discriminating between the default decompression mode and an auxiliary decompression mode. In a preferred embodiment, the selection between the default mode and the auxiliary mode is performed based on a comparison of the two codeword bit sequences $X_f$ and $X_1$. Thus, if the first codeword bit sequence $X_f$ is smaller than the second codeword bit sequence $X_1$ the default mode is selected in step S41 and the method continues to step S42, where the compressed image block is decompressed according to the default mode. If, however, the first bit sequence $X_f$ is equal to or larger, or in a preferred embodiment larger, than the second bit sequence $X_1$ the auxiliary mode is selected in step S41. The method then continues to step S43, where the compressed block is decompressed according to the auxiliary mode.

In the auxiliary mode, each bit to be decoded of the first $X_f$ and second $X_1$ codeword bit sequence is calculated or determined based on i) a bit of a predefined bit position within the first $X_f$ or second $X_1$ codeword bit sequence, preferably within the second codeword bit sequence $X_1$, and ii) another bit of the first $X_f$ or second $X_1$ codeword bit sequence at a bit position defined based on the bit to be decoded. This is in clear contrast to the default mode, where each bit to be decoded of the first $X_f$ and second $X_1$ codeword bit sequence is calculated or determined solely on a bit of the first $X_f$ or second $X_1$ codeword bit sequence at a bit position defined based on the bit to be decoded. As a consequence, if the two codeword bit sequences $X_f$, $X_1$ each comprises N bits, 2N bits of the two bit sequences $X_f$, $X_1$ will carry payload information for encoding the original properties or features of the image element in the default mode. However, in the auxiliary mode only 2N−1 bits of the codeword bit sequences $X_f$, $X_1$ will contain payload information as the odd bit is required for discriminating between the two modes. The technology disclosed herein, however, does not utilize dedicated mode bit(s) that could be employed for discriminating between the two modes as such an approach would "steal" one of the encoding bits of the default mode and thereby reduce the number of payload bits of the codeword bit sequences $X_f$, $X_1$ by at least one. As is described in more detail below, the inventors have found an inventive approach of being able to maximize the number of bits that can be used by the auxiliary mode, while not sacrificing any payload bits for the default mode. In addition, the 2N−1 bits of the combined codeword bit sequences can be set freely in the auxiliary mode as long as $X_f \geq X_1$.

The decompression according to the default mode in step S42 or auxiliary mode S43 generally involves decoding one or more of the image elements in the compressed block. Thus, step S42 or S43 could be performed for several image elements in the image block.

Steps S40 to S43 are then preferably repeated for all image blocks that comprise image elements that should be decoded (schematically illustrated by line L5). This means that the loop of steps S40 to S43 could be performed once, but most often several times for different encoded image blocks and/or several times for a specific encoded image block. As some of blocks in the original image or texture may have been compressed according to a default compressing mode, while others may have been compressed according to an auxiliary compressing mode, some of these blocks would be decompressed in step S42 while the others are decompressed according to step S43.

In the optional step S44, a decoded representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

In the following, a more detailed discussion of the opportunity of introducing the auxiliary mode of the technology disclosed herein to an existing default mode is described in more detail with 3Dc [1] as the default mode.

In 3Dc, an image block is traditionally compliant both if $X_f < X_1$ and $X_f \geq X_1$. However, according to the technology disclosed herein, if $X_f < X_1$, the block is decoded using the default mode. That means that it is decoded the same way as a 3Dc block. However, if $X_f \geq X_1$, the block is decoded using an auxiliary mode.

Note that a 3Dc block can always be coded in the default mode. If $X_f$ happens to be larger than $X_1$, the two codeword bit sequences can just be swapped and then $X_f < X_1$ holds. If $X_f = X_1$, the second codeword bit sequence can be set to $X_1 = X_f + 1$, and let all image element feature values be quantized according to the first codeword bit sequence. Alternatively, the first bit sequence can be set as $X_f = X_1 - 1$ and all image element values are quantized to the second codeword bit sequence. This means that all current 3Dc normal maps can be coded using only the default mode. The auxiliary mode therefore comes "for free" without any sacrifice of default payload bits.

The naive solution for the auxiliary mode would be to say that $X_f$ and $X_1$ are just used to signal the auxiliary mode, and the remaining 48 bits of a 3Dc block are used to describe the block. However, the inventors have found a way maximizing the bit utilization in the auxiliary mode so that up to 63 of the 64 bits employable in the default mode can be used by the auxiliary mode.

In order to identify how the bit utilization according to the auxiliary mode can be maximized, a simpler analogous case is illustrated. In 3Dc, the codeword bit sequences $X_f$, $X_1$ are each of 8 bits and represent a minimum and maximum X coordinate value of a normalized surface normal. In the illustrated analogous case, $X_f$ and $X_1$ are instead assumed to be of 4 bits. This means that both $X_f$ and $X_1$ are in the interval [0, 15]. If we plot all possible combinations of $X_f$ and $X_1$ and mark all combinations for which $X_f < X_1$ with an "s" (for standard mode), we get the following Table 5.

TABLE 5

|  |  | $X_f$ | | | | | | | | | | | | | | | |
|---|---|---|---|---|---|---|---|---|---|---|---|---|---|---|---|---|
|  |  | 0 | 1 | 2 | 3 | 4 | 5 | 6 | 7 | 8 | 9 | 10 | 11 | 12 | 13 | 14 | 15 |
| $X_1$ | 0 |  |  |  |  |  |  |  |  |  |  |  |  |  |  |  |  |
|  | 1 | s |  |  |  |  |  |  |  |  |  |  |  |  |  |  |  |
|  | 2 | s | s |  |  |  |  |  |  |  |  |  |  |  |  |  |  |
|  | 3 | s | s | s |  |  |  |  |  |  |  |  |  |  |  |  |  |
|  | 4 | s | s | s | s |  |  |  |  |  |  |  |  |  |  |  |  |
|  | 5 | s | s | s | s | s |  |  |  |  |  |  |  |  |  |  |  |
|  | 6 | s | s | s | s | s | s |  |  |  |  |  |  |  |  |  |  |
|  | 7 | s | s | s | s | s | s | s |  |  |  |  |  |  |  |  |  |
|  | 8 | s | s | s | s | s | s | s | s |  |  |  |  |  |  |  |  |
|  | 9 | s | s | s | s | s | s | s | s | s |  |  |  |  |  |  |  |
|  | 10 | s | s | s | s | s | s | s | s | s | s |  |  |  |  |  |  |
|  | 11 | s | s | s | s | s | s | s | s | s | s | s |  |  |  |  |  |
|  | 12 | s | s | s | s | s | s | s | s | s | s | s | s |  |  |  |  |
|  | 13 | s | s | s | s | s | s | s | s | s | s | s | s | s |  |  |  |
|  | 14 | s | s | s | s | s | s | s | s | s | s | s | s | s | s |  |  |
|  | 15 | s | s | s | s | s | s | s | s | s | s | s | s | s | s | s |  |

From Table 5, it is easily seen that not even half of all the available combinations of $X_f$ and $X_1$ are used. There are in fact 136 positions free. If we fill these empty positions with the numbers 0 through 127, we should be able to get a 7-bit value back from the case when $X_f \geq X_1$. In other words, $2 \times 4 - 1 = 7$ bits can be used in the auxiliary mode.

Therefore, the empty slots of Table 5 are filled with the numbers 0 through 127, and then we can use a lookup-table to get the seven bits back. For instance, we could try the following constellation as given in Table 6.

TABLE 6

| | $X_f$ | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| $X_1$ | 0 | 0 | 1 | 2 | 3 | 4 | 5 | 6 | 7 | 8 | 9 | 10 | 11 | 12 | 13 | 14 | 15 |
| | 1 | s | 16 | 17 | 18 | 19 | 20 | 21 | 22 | 23 | 24 | 25 | 26 | 27 | 28 | 29 | 30 |
| | 2 | s | s | 31 | 32 | 33 | 34 | 35 | 36 | 37 | 38 | 39 | 40 | 41 | 42 | 43 | 44 |
| | 3 | s | s | s | 45 | 46 | 47 | 48 | 49 | 50 | 51 | 52 | 53 | 54 | 55 | 56 | 57 |
| | 4 | s | s | s | s | 58 | 59 | 60 | 61 | 62 | 63 | 64 | 65 | 66 | 67 | 68 | 69 |
| | 5 | s | s | s | s | s | 70 | 71 | 72 | 73 | 74 | 75 | 76 | 77 | 78 | 79 | 80 |
| | 6 | s | s | s | s | s | s | 81 | 82 | 83 | 84 | 85 | 86 | 87 | 88 | 89 | 90 |
| | 7 | s | s | s | s | s | s | s | 91 | 92 | 93 | 94 | 95 | 96 | 97 | 98 | 99 |
| | 8 | s | s | s | s | s | s | s | s | 100 | 101 | 102 | 103 | 104 | 105 | 106 | 107 |
| | 9 | s | s | s | s | s | s | s | s | s | 108 | 109 | 110 | 111 | 112 | 113 | 114 |
| | 10 | s | s | s | s | s | s | s | s | s | s | 115 | 116 | 117 | 118 | 119 | 120 |
| | 11 | s | s | s | s | s | s | s | s | s | s | s | 121 | 122 | 123 | 124 | 125 |
| | 12 | s | s | s | s | s | s | s | s | s | s | s | s | 126 | 127 | | |
| | 13 | s | s | s | s | s | s | s | s | s | s | s | s | s | | | |
| | 14 | s | s | s | s | s | s | s | s | s | s | s | s | s | s | | |
| | 15 | s | s | s | s | s | s | s | s | s | s | s | s | s | s | s | |

To get the seven bits back from $X_f$ and $X_1$, a function get_7 bits_back that would be a look-up table could be implemented:

```
int get_7bits_back(x_f, x_l)
{
    if (x_f == 0 && x_l == 0)
        return 0;
    else if (x_l == 0 && x_f == 1)
        return 1;
    else if (x_l == 0 && x_f == 2)
        return 2;
    ...
    else if (x_l == 12 && x_f = 13)
        return 127;
}
The decoding of a compressed image block could then be handled by:
x_f = decode_X_f_from_block(block);
x_l = decode_X_l_from_block(block);
if (x_f < x_l)
{
    // default mode
    Decoded_block = decode_default_mode(x_f, x_l,
    block);
}
else
{
    // auxiliary mode
    7bits = get_7bits_back(x_f, x_l);
    Decoded_block = decode_auxiliary mode(7bits, block);;
}
```

In the real case, where $X_f$ and $X_1$, would be 8-bit integers, the function get_7_bits_back( ) would be replaced by a function that returns 15 bits instead of 7. However, the problem is that the lookup-table grows exponentially with the number of bits we get back—instead of 128 entries the lookup-table will contain $2^{15}=32\ 384$ entries. This is typically not feasible in hardware. Therefore, one interesting thing is to see if it is possible to implement the function get_7bits_back in a different, more efficient way.

Inspecting the first line in Table 6, it is seen that for the first row the function will just return the value of $X_f$.

get_7bits_back=$X_f$; //For the first row ($X_1$=0)

For the second row, we see that we should not only add 16 (to get to the next row), but since the values have shifted one step, we need also to subtract one:

get_7bits_back=$X_f$+16−1; //For the second row ($X_1$=1)

For the third row, we should add another row (16) and shift one more step:

get_7bits_back=$X_f$+16−1+16−2; //For the third row ($X_1$=2)

Generally, we can say that:
get_7bits_back=$X_f$+a($X_1$), where the function a(k) is equal to:

$$a(0) = 0$$

$$a(1) = 16 - 1$$

$$a(2) = 16 \times 2 - 1 - 2$$

...

$$a(k) = 16 \times k - 1 - 2 - 3 \ldots - k$$

The arithmetic sum 1+2+3+k can be rewritten (k+1)×k/2, and we get a(k)=16×k−(k+1)×k/2, or simplified a(k)=(31×k−k×k)/2.

The function get_7 bits_back can then be rewritten using the following function:

get_7bits_back=$X_f$+(31×$X_1$−$X_1$×$X_1$)/2

This is one square ($X_1 \times X_1$), one multiplication by a scalar (31×$X_1$) that can be implemented as a subtraction ($X_1$<<5−$X_1$), one subtraction between the two terms, and finally an addition between $X_f$ and the rest. The operation a<<b means that the bit sequence a should be shifted b steps to the left. Of these it is only the square that is really complex to implement in hardware. In the 4-bit case above, it can be implemented as a look-up table of 16 values. In the real 8-bit version, it is a look-up of 256 entries, which is bigger, but still feasible, and a big reduction from 32 384 entries.

However, the technology disclosed herein provides still another possibility of reducing the complexity in retrieving and exploiting the payload bits from $X_f$ and $X_1$ according to the auxiliary mode.

In order to get a simpler bit retrieval, the numbers entered in Table 6 might be rearranged. The simplest possible retrieval is of course:

get_7_bits_back=16×$X_f$+$X_1$

This can be implemented as ($X_1$<<4) OR $X_f$. Since ($X_1$<<4) and $X_f$ do not overlap, there is no need for a real OR-operation. If the function is to be implemented in hardware this can be done using only wires and no transistors. Table 7 illustrates this approach in a table form.

TABLE 7

| | $X_f$ | | | | | | | | | | | | | | | |
|---|---|---|---|---|---|---|---|---|---|---|---|---|---|---|---|---|
| $X_l$ | | 0 | 1 | 2 | 3 | 4 | 5 | 6 | 7 | 8 | 9 | 10 | 11 | 12 | 13 | 14 | 15 |
| | 0 | 0 | 1 | 2 | 3 | 4 | 5 | 6 | 7 | 8 | 9 | 10 | 11 | 12 | 13 | 14 | 15 |
| | 1 | s | 17 | 18 | 19 | 20 | 21 | 22 | 23 | 24 | 25 | 26 | 27 | 28 | 29 | 30 | 31 |
| | 2 | s | s | 34 | 35 | 36 | 37 | 38 | 39 | 40 | 41 | 42 | 43 | 44 | 45 | 46 | 47 |
| | 3 | s | s | s | 51 | 52 | 53 | 54 | 55 | 56 | 57 | 58 | 59 | 60 | 61 | 62 | 63 |
| | 4 | s | s | s | s | 68 | 69 | 70 | 71 | 72 | 73 | 74 | 75 | 76 | 77 | 78 | 79 |
| | 5 | s | s | s | s | s | 85 | 86 | 87 | 88 | 89 | 90 | 91 | 92 | 93 | 94 | 95 |
| | 6 | s | s | s | s | s | s | 102 | 103 | 104 | 105 | 106 | 107 | 108 | 109 | 110 | 111 |
| | 7 | s | s | s | s | s | s | s | 119 | 120 | 121 | 122 | 123 | 124 | 125 | 126 | 127 |
| | 8 | s | s | s | s | s | s | s | s | | | | | | | | |
| | 9 | s | s | s | s | s | s | s | s | s | | | | | | | |
| | 10 | s | s | s | s | s | s | s | s | s | s | | | | | | |
| | 11 | s | s | s | s | s | s | s | s | s | s | s | | | | | |
| | 12 | s | s | s | s | s | s | s | s | s | s | s | s | | | | |
| | 13 | s | s | s | s | s | s | s | s | s | s | s | s | s | | | |
| | 14 | s | s | s | s | s | s | s | s | s | s | s | s | s | s | | |
| | 15 | s | s | s | s | s | s | s | s | s | s | s | s | s | s | s | |

There are a lot of numbers missing in Table 7—the ones that should have been in the dark gray triangular area. At the same time Table 7 has a large triangular area that is free in the lower right corner. If the dark triangle is mirrored in both coordinates, it should fit perfectly. By also mirroring the numbers in the gray area, we arrive at Table 8.

TABLE 8

| | $X_f$ | | | | | | | | | | | | | | | |
|---|---|---|---|---|---|---|---|---|---|---|---|---|---|---|---|---|
| $X_l$ | | 0 | 1 | 2 | 3 | 4 | 5 | 6 | 7 | 8 | 9 | 10 | 11 | 12 | 13 | 14 | 15 |
| | 0 | 0 | 1 | 2 | 3 | 4 | 5 | 6 | 7 | 8 | 9 | 10 | 11 | 12 | 13 | 14 | 15 |
| | 1 | s | 17 | 18 | 19 | 20 | 21 | 22 | 23 | 24 | 25 | 26 | 27 | 28 | 29 | 30 | 31 |
| | 2 | s | s | 34 | 35 | 36 | 37 | 38 | 39 | 40 | 41 | 42 | 43 | 44 | 45 | 46 | 47 |
| | 3 | s | s | s | 51 | 52 | 53 | 54 | 55 | 56 | 57 | 58 | 59 | 60 | 61 | 62 | 63 |
| | 4 | s | s | s | s | 68 | 69 | 70 | 71 | 72 | 73 | 74 | 75 | 76 | 77 | 78 | 79 |
| | 5 | s | s | s | s | s | 85 | 86 | 87 | 88 | 89 | 90 | 91 | 92 | 93 | 94 | 95 |
| | 6 | s | s | s | s | s | s | 102 | 103 | 104 | 105 | 106 | 107 | 108 | 109 | 110 | 111 |
| | 7 | s | s | s | s | s | s | s | 119 | 120 | 121 | 122 | 123 | 124 | 125 | 126 | 127 |
| | 8 | s | s | s | s | s | s | s | s | 118 | 117 | 116 | 115 | 114 | 113 | 112 |
| | 9 | s | s | s | s | s | s | s | s | s | 101 | 100 | 99 | 98 | 97 | 96 |
| | 10 | s | s | s | s | s | s | s | s | s | s | 84 | 83 | 82 | 81 | 80 |
| | 11 | s | s | s | s | s | s | s | s | s | s | s | 67 | 66 | 65 | 64 |
| | 12 | s | s | s | s | s | s | s | s | s | s | s | s | 50 | 49 | 48 |
| | 13 | s | s | s | s | s | s | s | s | s | s | s | s | s | 33 | 32 |
| | 14 | s | s | s | s | s | s | s | s | s | s | s | s | s | s | 16 |
| | 15 | s | s | s | s | s | s | s | s | s | s | s | s | s | s | s | |

For the upper half of the table, the simple retrieval of:

get_7bits_back=($X_1$<<4) OR $X_f$ works. For the lower half of the table, the coordinates should first be mirrored, i.e. use (15−$X_1$) and (15−$X_f$) rather than $X_1$ and $X_f$. Thus, for the lower half, the retrieval function becomes:

get_7bits_back=((15−$X_1$)<<4) OR (15−$X_f$)

However, if we look at the binary codes, the binary code for 0 is $0000_{bin}$, and for (15-0) it is $1111_{bin}$. Similarly, for 1 we have $0001_{bin}$ and (15-1) we have $1110_{bin}$. The function (15-x) can therefore be implemented as NOT(x), where the NOT operator simply inverts the bits in x.

Also, in order to check if the current codeword bit sequence values are in the lower half of Table 8, an investigation of whether $X_1$>4 is preferably performed. This can be implemented efficiently by looking at the most significant bit (MSB) of $X_1$.

The retrieval function can therefore be rewritten as:

```
int get_7bits_back(X_f, X_1)
{
    if MSB(X_1 == 0)
```

-continued

```
        return X_1 << 4 OR X_f;
    else
        return (NOT(X_1) << 4) OR NOT(X_f);
}
or, for the real, 8-bit case:
int get_15bits_back(X_f, X_1)
{
    if MSB(X_1 == 0)
        return (X_1 << 8) OR X_f;
    else
        return (NOT(X_1) << 8) OR NOT(X_f);
}
```

Since ($X_1$<<8) and $X_f$ do not overlap, it is possible to do the NOT operation after the OR operation. The function can therefore be written

```
int get_15bits_back(X_f, X_1)
{
    bits = (X_1 << 8) OR X_f;
    if MSB(X_1 == 0)
        bits = NOT(bits);
    end;
    return bits;
}
``` which may sometimes be simpler.

When implementing the retrieval function in hardware, we can exploit the further advantage of the fact that the two OR operands never overlap and therefore can be replaced by wires. Moreover, the bits of $X_f$ and $X_1$ should only be inverted (do the NOT operation) if the most significant bit of $X_1$ is set, i.e. equal to $1_{bin}$. This can be implemented with an XOR circuit, since c=XOR(a,b) results in a NOT operation on a if b=1, and otherwise it leaves it unchanged. Performing bitwise XOR on $X_f$ with the MSB of $X_1$, and bitwise XOR between $X_1$ and the MSB of $X_1$ thus implements the operation extremely efficiently. FIG. 43 shows a diagram of such a hardware implementation of the function.

In FIG. 43 the retrieval function has been implemented in hardware as only 15 XOR boxes. The input to this hardware-implemented retrieval function is the first codeword bit sequence $X_f$ 710 and the second codeword bit sequence $X_1$ 720. From the figure it is evident that, in the auxiliary mode, 2N−1 payload bits can be retrieved if the two codeword bit sequences 710, 720 are of equal bit lengths N. In addition, the value of each decoded bit of these 2N−1 bits depends on the value of a bit in a predefined bit position of the second codeword bit sequence 720, i.e. the MSB of the second codeword sequence 720. Therefore, two different bits of the codeword bit sequences 710, 720 have to be collectively processed in order to generate one decoded payload bit in the auxiliary mode.

The complete decoding process for the eight bit case is shown below:

```
x_f = decode_X_f_from_block(block);
x_1 = decode_X_1_from_block(block);
if (x_f < x_1)
{
    // standard mode
    decoded_block = decode_default_mode(x_f, x_1, block);
}
else
{
    // auxiliary mode
    15bits = get_15bits_back(x_f, x_1);
    Decoded_block = decode_auxiliary_mode(15bits, block);
}
where
int get_15bits_back(X_f, X_1)
{
    if MSB(X_1 == 0)
        return X_1 << 8 OR X_f;
    else
        return NOT(X_1) << 8 OR NOT(X_f);
}
```

Note that the 15 bits of the codeword bit sequences can be spent in any way we want, since there is no restriction of how to use the bits. This flexibility in the auxiliary mode allows the introduction of different possible block encodings as auxiliary modes, which is described further herein.

In a preferred implementation, the encoded image block comprises additional bit sequences besides the first and second codeword sequences. FIG. 23 is a diagram illustrating such a possible implementation of a compressed image block 700. This encoded block representation 700 comprises the first codeword bit sequence 710, the second codeword bit sequence 720 and a sequence of X-component or -coordinate indices 750. This index sequence 700 preferably comprises one such X-component index per image element in the block, i.e. preferably 16 indices. In the default mode, these component indices are employed for selecting a respective X-component value from multiple X-component values derivable from the first 710 and second 720 codeword bit sequences. The index sequence 750 is assumed to have a length of M bits, preferably 48 bits. It is anticipated by the technology disclosed herein that the actual order of the components 710, 720, 750 of the encoded block representation 700 may differ from what is illustrated in the figure.

FIG. 24 is a flow diagram illustrating the auxiliary decompressing step of FIG. 22 in more detail according to an embodiment of the technology disclosed herein. The method continues from step S41 of FIG. 22, where it was determined that the first codeword bit sequence was equal to or larger than the second codeword bit sequence and the encoded block should be processed according to the auxiliary mode. In a next step S50, the 2N bits of the two codeword bit sequences are processed (input to the previously described hardware or software implemented get_15 bits_back ($X_f$, $X_1$) function) to extract 2N−1 bits from $X_f$ and $X_1$. This involves processing two of the 2N bits together to form a decoded payload bit. A first of these two bits is a bit of a predefined position, preferably in the second codeword bit sequence, more preferably the MSB of the second codeword bit sequence. The second bit depends on the actual bit to be decoded. Generally, the MSB of the output 15-bit word is obtainable by processing the MSB of the first codeword bit sequence and the MSB of the second codeword bit sequence. The next most significant bit of the output word is obtained by processing the next most significant bit of the first codeword bit sequence and the MSB of the second codeword bit sequence, and so on.

In a next step S51, the encoded block is decompressed using the extracted 2N−1 bits and the remaining M bits according to the auxiliary mode. If N=8 and M=48, thus, 63 bits can be used as encodable payload bits in the auxiliary mode, whereas the default mode then can use all 64 bits. The method then continues to step S44 of FIG. 22 or back to step S40 of FIG. 22.

FIG. 25 is a flow diagram illustrating a preferred embodiment of the default decompressing step in FIG. 24 when the default mode is 3Dc. A bit layout as illustrated in FIG. 23 is assumed. The method continues from step S41 of FIG. 24, where it was determined that the first codeword bit sequence was smaller than the second codeword bit sequence. In a next step S60, a first component value ($X_{min}$) is determined based on the first codeword bit sequence ($X_f$) and a second component value ($X_{max}$) is determined based on the second codeword bit sequence ($X_1$). In 3Dc, the codeword bit sequences are of 8 bits and the component values are also of 8 bits. In such a case, this determining step S60 is a simply an extraction of the two 8-bit words from the encoded bit representation. A next step S61, generates additional intermediate component values ($X_i$) from the codeword bit sequences or the component values. Six such additional component values ($X_i$) are preferably determined as linear combinations of the first ($X_{min}$) and second ($X_{max}$) component values according to equation 6:

$$X_i = X_{min} + i \times \frac{X_{max} - X_{min}}{7} \qquad (6)$$

Where i=1-6

A next step S62 selects a component value to use for an image element to be decoded. This component value is selected from the first component value $X_f$, the second component value $X_{max}$ and the six intermediate component values $X_1, X_2, \ldots, X_6$ using the component index associated with the image element. The step S62 is then repeated for all image elements in the block that should be decoded (schematically illustrated by the line L6). The method then continues to step S44 of FIG. 22 or step S40 of FIG. 22.

In the following several possible embodiments of auxiliary modes that can be used together with 3Dc as default will be presented. The technology disclosed herein is, however, in its general aspect not limited to a particular default mode or a particular auxiliary mode but can actually be applied to any default mode, in which an encoded block comprises two codeword bit sequences and there is redundancy in the utilization of the possible bit sequences for the encoded blocks. Furthermore, the technology disclosed herein is not in its general aspect limited to a particular auxiliary mode. In clear contrast, different such modes can be used for processing those redundant bit sequences that have been identified according to the technology disclosed herein.

FIG. 26 is a flow diagram illustrating an embodiment of the auxiliary decompressing step of FIG. 22 in more detail. The method continues from step S41 of FIG. 22, where it was determined that the first codeword bit sequence was equal to or larger than the second bit sequence for the current compressed block. In this embodiment, a portion of the first and second bit sequence represents a first codeword and another portion of the first and second bit sequence represents a second codeword. In the default mode, all the (16) bits of the first and second bit sequence were available. However, in the auxiliary mode at maximum 15 of these 16 bits can be used for the two codewords. In a possible implementation, the first codeword therefore uses 7 of the available bits, while the second codeword has access to 8 bits.

The method continues to step S70, where a first ($X_{min}$) and a second ($X_{max}$) component value are determined from the two codewords. This step S70 first involves extracting the 16 bits of the two codeword bit sequences and processing them according to the technology disclosed herein to obtain the 15 useful payload bits. The first component value $X_{min}$ is obtained from the first codeword, preferably by extracting the 7 most significant bits from the 15-bit output word and expanding the 7 bits into an 8-bit sequence. This is preferably performed by adding the MSB of the 7-bit codeword to the least significant bit (LSB) of the 8-bit first component value. The second component value $X_{max}$ is preferably obtained by extracting the eight least significant bits from the 15-bit output word.

In a next step S71, at least one intermediate component value ($X_{int}$) is calculated based on the first ($X_{min}$) and second ($X_{max}$) component values determined in step S70. In a preferred implementation, this at least one intermediate value ($X_{int}$) is calculated as a defined linear combination of the two component values according to equation 7:

$$X_{int} = \alpha \times X_{min} + (1-\alpha) \times X_{max} \qquad (7)$$

Where 0<a<1.

Thus, the intermediate component value $X_{int}$ will be positioned somewhere between the first $X_{min}$ and second $X_{max}$ component values on a line passing through the two component values.

A next step S72 generates at least one additional component value ($X_i$) based on the at least one intermediate component value ($X_{int}$) and one of the first ($X_{min}$) and second ($X_{max}$) component values. In a preferred implementation, the at least one additional component value is generated as a linear combination of one of the at least one intermediate component value and one of the first and second component values. The two equations 8 and 9 below disclose the calculation of the additional component values using 1) the first component value and the intermediate value or 2) the second component value and the intermediate value. Which of the two equations to be employ could be predefined. Alternatively, the actual value of a could be decisive in discriminating between the two alternative calculations.

$$X_i = X_{min} + i \frac{X_{min} + X_{int}}{i+1} \qquad (8)$$

$$X_i = X_{int} + i \frac{X_{int} + X_{max}}{i+1} \qquad (9)$$

In a preferred implementation of this embodiment i=1, 2, . . . 5, so that five additional component values are generated in step S72 according to the above listed equation.

If multiple intermediate values were calculated in step S71 as in equation 10:

$$X_{int}^I = a_1 \times X_{min} + (1=a_1) \times X_{max}$$

$$X_{int}^{II} = a_2 \times X_{min} + (1=a_2) \times X_{max} \qquad (10)$$

where $0 < \alpha_2 < \alpha_1 < 1$, a first set of at least one additional component value ($X_i$) is generated in step S72 as linear combinations of the first component value ($X_{min}$) and the first intermediate value ($X_{int}^I{}_{nt}$) and a second set of at least one additional component value ($X_j$) is generated as linear combinations of the second component value ($X_{max}$) and the second intermediate value ($X_{int}^{II}$). This is illustrated by equation 11:

$$X_i = X_{min} + i \frac{X_{min} + X_{int}^I}{i+1} \qquad (11)$$

$$X_j = X_{int}^2 + j \frac{X_{int}^{II} + X_{max}}{j+1}$$

In a preferred implementation of this embodiment i+j=4, more preferably i=j=2, so that four additional component values are generated in step S72 according to the above listed equation. In a particular embodiment $\alpha_2 = 1 - \alpha_1$.

In a next step S73, a component value is selected for an image element to be decoded and based on the component index associated with the image element. This component value is preferably selected from the first component value, the second component value, the intermediate component value(s) and the additional component value(s). These available candidate component values together preferably amount to a total of eight different values. In such a case, a component index of three bits can be used for discriminating between the candidate values. In another approach, the intermediate value(s) is (are) not selectable but instead one or more additional component values are generated to sum up to preferably eight candidate values. This selecting step S73 is repeated for each image element in the compressed block that should be decoded (schematically illustrated by the line L7). The method then continues to step S44 or S40 of FIG. 22.

FIGS. 27A to 27C illustrate the concept of this auxiliary mode embodiment. The figures illustrates the first 10 and second 12 component values, the intermediate value(s) 16 and the additional component values 14. In FIG. 27A, the additional values 14 are calculated from the first component value 10 and the intermediate value 16. FIG. 27B illustrates the case where the additional values 14 are obtained from the second component value 12 and the intermediate component value 16.

These two alternative approaches of the auxiliary mode is well-adapted for handling image blocks for which small differences between the two end component values 10, 12 are required. As was mentioned in the foregoing, according to the 3Dc default mode, the smallest possible resolution of the component values is $1/7 \approx 0.14$. This auxiliary mode can, however, provide a much higher resolution by usage of different values of $\alpha$. For example, if $\alpha=0.75$ (0.25) and the difference between $X_{max}$ and $X_{min}$ is one, the distance between the first 10 (second 12) component value, additional values 14 and intermediate value 16 becomes $0.25/6 \approx 0.04$. This is more than 3 times better resolution than 3Dc. In addition, by increasing or reducing the value $\alpha$ further, the intermediate value 16 will be moved towards the first component value 10 (FIG. 27A) or towards the second component value 12 (FIG. 27B). As a consequence, an even higher resolution is thereby achievable.

The embodiments illustrated in FIGS. 27A and 27B are adapted for those image blocks where the original feature vector components of the image elements are grouped close together, possibly with one or more odd value (which can be handled by $X_{max}$ in FIG. 27A or $X_{min}$ in FIG. 27B). If the original vector components are instead found in two different groups, the embodiments illustrated in FIG. 27C can efficiently be used. In this case, two intermediate values 16 are calculated. A first group of additional values 14 are positioned equidistanced between $X_{min}$ and $X_{int}^1$, whereas a second group of additional values 14 are found between $X_{int}^2$ and $X_{max}$.

In another auxiliary mode of the technology disclosed herein, a differential encoding is employed. This mode is also adapted for handling slow varying normals, which 3Dc handles poorly. FIG. 28 is a flow diagram illustrating the auxiliary decompressing step in more detail according to this particular auxiliary mode. The method continues from step S41 of FIG. 22. In a next step S80, a first component value ($X_{min}$) is determined based on a first portion of the first and second bit sequences and the bit of the predefined bit position. In a first implementation, this first portion is the ten most significant bits of the available 15-bit payload word. This corresponds to bit0-bit7, bit9 and bit 10 of the combined sequence of the first and second codeword bit sequence if the MSB (bit8) of the second codeword bit sequence is the bit of the predefined bit position and a layout as in FIG. 23 is assumed. As a consequence, the second portion of the first and second codeword bit sequence can use the five least significant bits of the 15-bit word (bit11-bit15 of the combined sequence). In such a case, the first component value can be determined in the format 8.2, i.e. eight bits for the integer part and three bits for the fractional part. Alternatively, the first portion corresponds to the eleven most significant bits and the second portion can use the four least significant bits. The first component value can then be in the format 8.3 instead of 8.2.

The next step S81 determines a difference representation ($\delta$) based on the second portion of the codeword bit sequences. This difference representation is preferably in the format 2.3 or 2.2 depending on the number of available bits for the difference representation.

The second component value ($X_{max}$) is then calculated based on the first component value ($X_{min}$) and the differential representation ($\delta$) in step S82. This step S82 preferably involves adding the differential representation to the first component value according to equation 12:

$$X_{max} = X_{min} + \delta \qquad (12)$$

In an optional but preferred step S83, at least one additional component value ($X_i$) is generated based on the component values determined in step S80 and S82. In a preferred implementation, six such additional component values are generated as linear combinations of $X_{min}$ and $X_{max}$ as previously described and disclosed by equation 6.

In the next step S84, a component value to use for an image element is selected, based on the component index of that image element, from the first and second component values and the additional component values. This step S84 can be performed once or multiple times (schematically illustrated by line L8) depending on the number of image elements of the block that should be decoded. The method then continues to step S44 or S40 of FIG. 22.

This embodiment of auxiliary modes solves several of the problems of the 3Dc default mode. Firstly it improves the resolution as the smallest representable interval ($X_{max} - X_{min}$) becomes four times smaller with $X_{min}$ in the 8.3 format and $\delta$ in the 2.2 format. Furthermore, as the precision of the location of the interval (3 fractional bits) is twice that of the smallest length (2 fractional bits), it is possible to handle the case where the original feature vector values of a block are present on both sides of a quantization level. With only 3Dc such a case would require using the next smallest quantization level as first component value and the next largest quantization level as second component value, which would require a doubling of the smallest interval size in 3Dc. However, with this auxiliary mode no doubling of the interval is required to handle this situation.

As has been described further herein, an image block encoded according to 3Dc comprises two X-codeword bit sequences and two Y-codeword bit sequences. The teachings of the present technology disclosed herein in terms of discriminating between the default mode and an auxiliary mode can therefore be applied to the two X-codeword bit sequences or the two Y-codeword sequences. However, in a preferred implementation, all four component bit sequences are investigated, allowing introduction of three auxiliary modes besides the traditional default mode. This means that the compressed block representation basically comprises a duplicate of the sequence presented in FIG. 23. Thus, the block representation contains the first ($X_f$) and second ($X_1$) X-codeword bit sequences and the first ($Y_f$) and second ($Y_1$) Y-codeword bit sequences, a sequence of X-component indices and a sequence of Y-component indices (see FIG. 4).

The multi-auxiliary mode concept is illustrated in more detail in FIG. 29. The method starts in step S90, where the first ($X_f$) and second ($X_1$) X-codeword bit sequences and the first ($Y_f$) and second ($Y_1$) Y-codeword bit sequences are extracted from the compressed block representation. In a next step S91, the first X-codeword sequence ($X_f$) is compared with the second X-codeword sequence ($X_1$). If $X_f < X_1$, the method continues to step S92, where the two Y-codeword bit sequences are compared. If also $Y_f < Y_1$, the block should be decompressed according to the default mode in step S93. This step S93 is preferably performed by performing the steps S60 to S62 for each of the X- and Y-components. If the codeword bit sequences each comprises N bits and the component index sequences comprises M bits, the total payload portion available in this default mode becomes 4N+2M and preferably 4×8+2×48=128 bits.

If, however, $Y_f \geq Y_1$, the method continues to step S94, where a first auxiliary mode is employed for decompressing the image block. In this mode only 2N−1 bits of the two Y-codeword bit sequences are available in addition to the remaining 2N+2M bits as each decodable bit of these Y-codeword bit sequences depends on the actual bit value of i) a predefined bit position (MSB of $Y_1$) and ii) a bit position defined based on the bit to be decoded. Thus, in total 4N−1+2M bits, preferably 127 bits, are used as payload bits for encoding the block.

If $X_f \geq X_1$ as determined in step S91, the method continues to step S95, where the Y-codeword bit sequences are compared. This step S95 is performed in a same manner as step S92. If $X_f < Y_1$, the method continues to step S96. In this step S96, the compressed block representation is decompressed according to a second auxiliary mode. This mode can use all the bits of the two Y-codeword bit sequences and the index sequences but only 2N−1 bits of the X-codeword bit sequences as payload bits.

The third and final auxiliary mode is used in step S97 if $X_f \geq X_1$ and $Y_f \geq Y_1$. This mode only has access to 4N−2+2M bits, preferably 126 bits, as one bit of the first and second X-codeword bit sequences and one bit of the first and second Y-codeword bit sequences cannot be used as payload bits.

In an alternative approach, the two Y-codeword bit sequences are compared in step S91, while the X-codeword bit sequences are compared in the steps S92 and S95. The result will be the same except that the second auxiliary decompression mode will be performed in step S94, while the first auxiliary mode is performed in step S96.

It is anticipated by the technology disclosed herein that an encoded image or texture can have compressed block representations that are compressed only according to the default mode or one of the auxiliary modes. However, in practice an encoded image typically will be a mosaic of image blocks that should be processed according to different modes selected from the default mode and the three auxiliary modes. This embodiment of the technology disclosed herein therefore has the possibility of introducing three auxiliary modes that comes for free to be used to combat different weaknesses of default mode in terms of taking care of those image blocks that the default mode handles poorly.

The two auxiliary mode embodiments described in the foregoing in connection with FIG. 26 and FIG. 28 could be two of the three available auxiliary modes in FIG. 29. Alternatively, one of the embodiments of FIG. 26 and FIG. 28 is used for all the three auxiliary modes but for different feature vector components. For example, in step S93 both the X- and Y-components are handled according to the 3Dc mode. In step S94, the X-component is handled according to 3Dc, while the Y-component is processed as illustrated in FIG. 26 or FIG. 28. The opposite situation is true for step S96, which handles the X-component according to FIG. 26 or FIG. 28 and the Y-component according to 3Dc. In step S97, both components are processed as disclosed in connection with FIG. 26 or FIG. 28.

Normally, the default 3Dc technique places the sample points uniformly in both X and Y, see leftmost diagram of FIG. 30. However, other distributions may allow for better compression. For instance, it is a well-known fact that a hexagonal distribution provides better sphere-packing than a uniform grid. It is also well-known from Monte-Carlo sampling that many functions are dependent much more on one of the variables than the other, and therefore a uniform grid is bad since many points get the same X- (or Y-) coordinate. However, neither the hexagonal, nor the random pattern is regular enough to be spread out easily on a rectangle. Instead, the pattern in the rightmost diagram of FIG. 30 might be a good candidate. It is similar to a hexagonal pattern, but more regular so that it is easier to fit into a rectangle. It is also avoids having columns of points with the same X-coordinate, and therefore the resolution in the X-direction is higher. Unfortunately this is not true in the Y-direction. However, in such a case the regular point distribution (left in FIG. 30) is used in connection with the default 3Dc mode. The displacement of every other row along the X-direction can be used in the first or second auxiliary mode, while a corresponding displacement of every other column along the Y-direction will be employed in the other of the first or second auxiliary mode.

If the displacement is made in the X-direction, every other row is displaced $$\frac{X_{max} - X_{min}}{2(p+1)}$$

units along the X-axis, where p is the number of additional component value ($X_i$). The candidate values available then become:

$$Y_k = Y_{min} + k\frac{Y_{max} - Y_{min}}{p+1} \tag{13}$$

$$k = 0, 1, \ldots p+1$$

$$X_l = X_{min} + l\frac{X_{max} - X_{min}}{p+1} \text{ if } l \text{ is odd/even}$$

$$X_l = X_{min} + (2l \pm 1)\frac{X_{max} - X_{min}}{2(p+1)} \text{ if } l \text{ is even/odd}$$

$$l = 0, 1, \ldots p+1$$

The sign of ± depends on whether the row is displayed towards larger X-values (+) or smaller X-values (−). The corresponding equations are valid for the displacement along the Y-axis if Y is replaced by X and vice versa in the equations.

Normal maps often contain image blocks with edges, cases which are not handled optimally by the 3Dc default algorithm. Such image blocks can be handled according another auxiliary mode of the technology disclosed herein. The uppermost diagram of FIG. 31 illustrates the distribution of original feature vector components of the image elements in the block. In the figure only eight such values have been illustrated, while a practical image block preferably comprises 16 image elements. This has been done in order to simplify the drawings. As can be seen from the diagram, the vector components are generally distributed in two groups with a distance between the groups. The key concept of that auxiliary mode is to remove the largest interval (distance between groups) where there are no values. This could be seen as an alternative auxiliary mode to the auxiliary mode disclosed in FIG. 27C and described in connection with FIG. 26.

The compression according to this auxiliary mode involves grouping the original vector components into two groups, a and b, such that the variance of each group is minimized. A bitmask or index sequence bm determines which group a value belongs to. Thus, each image element is associated with a group index that specifies whether the image element belongs to group a ($0_{bin}$) or group b ($1_{bin}$). The average component values ma and mb are computed for each group. The distance between the groups as represented by $\delta$=mb−ma, see middlemost diagram of FIG. 31, is computed. This distance value is $\delta$ subtracted from all original vector values for the image elements in the group b. The resulting original vector values will then become centralized as illustrated in the undermost diagram of FIG. 31.

These centralized vector values are then compressed according to the default 3Dc mode with the difference that fewer payload bits can be used for representing the image block. Firstly, one bit of a predefined bit position is not available in the auxiliary mode. In addition, the compressed block representation needs also contain the value $\delta$ or a compressed representation thereof and the bitmask bm. In order to cope with this, the 3Dc mode can be modified to only allow two additional component values. Together with the first and second component values, there are therefore four possible candidate component values available for the X- or Y-component. A selection therebetween can be realized using a 2-bit component index. This saves the 16 bits required for the bitmap bm. The bits for the distance value and the predefined bit can be taken from the bits used for encoding the first and second (X/Y) component values. The distance value can be heavily quantized, as its only function is to diminish the interval.

During decompression, the block is basically handled as a regular 3Dc block but with the above-listed differences. Thereafter, the distance value $\delta$ is added to all selected candidate values, where the corresponding groups index of the image elements are tagged ($1_{bin}$) by the bitmask.

Another shortcomings of the 3Dc default mode is when the major axis of the box with candidate component values, see FIG. 32A, do not coincide with either the X- or the Y-axis. However, an auxiliary mode of the technology disclosed herein can handle this case by rotating the coordinate frame, resulting in a much tighter fit. FIG. 32B illustrates the corresponding grid or box of candidate complement values of FIG. 32A but rotated at an angle $\beta$. In such a case, the default mode of the technology disclosed herein could be a traditional 3Dc processing but with the rotation angle $\beta$=0. The auxiliary mode could then have an angle $\beta \neq 0$. This non-zero angle could be any angle in the interval $0<\beta<.\pi/2$, such as $\pi/8$, $\pi/6$, $\pi/4$, $\pi/3$, $3\pi/8$. If three auxiliary modes are available as in FIG. 29, the first auxiliary mode could use $\beta=\pi/8$, the second mode has $\beta=\pi/4$ and the third auxiliary mode has $\beta=3\pi/8$. Estimations of the increase in peak-signal-to-noise ratio (PSNR) have been made for a set of 20 normal maps as a function of the number of available angles. If three additional angles, besides $\beta$=0, is available the PSNR will increase with more than one decibel.

In the foregoing, the multi-mode processing of the technology disclosed herein has mainly been directed to processing of normal maps and image blocks comprising surface normal components. In these cases, the default mode has been 3Dc. However, as has previously been mentioned, the multi-mode processing could also be applied to other types of images and textures, where the image blocks comprises other feature vectors or values besides normal components. Such an example includes chrominance information, i.e. a color vector in a color space, preferably a vector in the RGB space. The default mode could then instead be S3TC [2].

In S3TC, a compressed block representation comprises two color codewords col0, col1, which corresponds to the first and second codeword bit sequence as described herein. In addition, the block representation comprises an index sequence, with a respective color or component index per image element in the block.

In the decoding of a block, a first color value CV0 is generated by expanding the first color codeword col0 from RGB565 into RGB888, i.e. eight bits per color component. The same procedure is performed with the second color codeword coil to obtain a second color value CV1. Two additional color values CV2, CV3 are then calculated as pre-defined linear combinations of CV0 and CV1, see equation 14:

$$CV2 = \tfrac{2}{3}CV0 + \tfrac{1}{3}CV1$$

$$CV3 = \tfrac{1}{3}CV0 + \tfrac{2}{3}CV1 \quad (14)$$

The S3TC default mode will be selected for a compressed block if col0<col1 (or if CV0<CV1), as determined by comparing the bit sequence of col0 with the bit sequence of coil.

If an image block has col0≥col1, this is a signal that the block should be decompressed according to an auxiliary mode. Since these two codeword bit sequences (occupying 2×16 bits) are used to signal the mode, the naive approach would be to not use those bits, but as shown by Munkberg et al. [3], it is possible to use 31 of these 32 bits using the following simple decoding scheme:

```
function get31bits(col0, col1)
   if col1 < 2^15
       bits31 = (col1 << 16) OR col0;
   else
       bits31 = (NOT(col1) << 16) OR NOT(col0);
   end
   return bits 31;
``` which can be implemented with a single 32-pin XOR circuit in hardware. This means that in the auxiliary mode, each bit of col0 and col1 to be decoded depends on a bit of a predefined bit position within the first and second bit sequence (MSB of col1) and another bit of the col0 or col1 selected based on the actual bit to be decoded.

Together with the rest of the bits, a payload of 63 bits can be used in the auxiliary mode, while the default mode has access to 64 bits.

These 63 bits can be used in an auxiliary mode denoted ETC or iPACKMAN [4, 5]. These 63 bits fits perfectly with the so-called differential mode of ETC, in which a compressed block representation comprises a RGB555 color codeword a dRdGdB333 differential codeword, two 3-bit intensity codewords or table indices, a 1-bit flip bit and a 32-bit sequence of intensity indices. For processing and generation of such a compressed block, reference is made to the documents [4, 5].

ETC could in turn give rise to additional sub-auxiliary modes as the respective color components could overflow. During decoding according to ETC the red, green and blue components of the differential codeword are added to the respective red, green and blue components of the color codeword. If any such color component falls outside of the interval [0, 31], a so-called overflow has happened, which can be exploited for introducing additional sub-auxiliary modes. As is thoroughly described in the document [4], three such additional sub-modes are possible depending on which color component(s) that overflow(s). These different sub-modes can use 59, 58 and bits for payload information and therefore have 4, 5 and 6 bits that cannot be freely selected.

The pseudo code to decode such a block could look like this:

```
function decodeBlock(col0, col1, rest32bits)
    if col0 < col1
        decodeBlockAsS3TC(col0, col1, rest32 bits);
    else
        31 bits = get 31bits(col0, col1);
        63 bits = (31bits << 31) OR rest32bits);
        R0 = getR0(63bits); dR = getdR(63bits);
        G0 = get G0(63bits); dG = getdG(63bits);
        B0 = getB0(63bits); dB = getdB(63bits);
        if R0 + dR in inverval [0,31]
            if G0 + dG in interval [0,31]
                if B0 + dB in interval [0,31]
                    decodeUsingDifferential(63bits);
                else
                    decodeUsing57bitMode(63bits);
                end;
            else
                decodeUsing58bitMode(63bits);
            end;
        else
            decodeUsing59bitMode(63bits);
        end;
end;
```

The decodeBlockAsS3TC is the traditional default decompression according to S3TC briefly mentioned above and described further in the document [2]. The processing in decodeUsingDifferential is performed as described in the documents [4, 5]. Basically, a first color value is generated by expanding the color codeword (R0, G0, B0) into RGB888. This color value is used for all eight image elements in a first half of the 4×4 image block. A second color value (R1, G1, B1) is generated by adding the differential codeword (dR, dG, dB) to the color codeword (R0, G0, B0) and then expanding the result into RGB888. This second color value is employed for all remaining eight image elements. The two intensity codewords point to an intensity table comprising eight different intensity modifier sets, where each set comprises multiple intensity modifiers. The first intensity codeword and therefore its associated modifier set is applied to the first half of the image elements, while the second intensity codeword and modifier set is applicable to image elements in the remaining half of the block. Each image element has an associated intensity index pointing to one of the intensity modifiers in the modifier set applied to the group of image elements, to which the particular image element belongs. The relevant intensity modifier is then applied to all color components of the color value assigned to the image element group to get the final color representation for that image element.

In this embodiment, three new sub-modes of 59, 58 and 57 bits respectively are available to use in addition to the default S3TC mode and the differential auxiliary mode described above. For this reason, the T-mode was introduced [6, 7]. In this mode, the compressed block representation comprises a first color codeword, a second color codeword, a color modifier codeword and a color index sequence. The method involves determining a first base color based on the first color codeword and determining a second base color based on the second color codeword. The first and second base colors are located on a first line having a first direction in color space. In the T-mode, two color representations are generated along a second line having a second direction in color space by modifying the first base color with at least one color modifier represented by the color modifier codeword. The second direction is different from the first direction. The two color representations are typically obtained by adding the vectors (−d, −d, −d) and (d,d,d) to the first base color, where the number d is determined from the color modifier codeword. A color representation to use for an image element is then selected from the two color representations, the first base color and the second base color based on the color index of that image element.

This T-mode can use the 59 payload bits, with RGB444 for the two color codewords, and specifying the distance d with three bits using the following small look-up table (LUT): {3, 6, 11, 16, 23, 32, 41, 64} or another such table. Note that the same LUT is used for all T-mode blocks in all textures, and can therefore be kept on-chip and hard-wired. Since two bits per image element are enough to choose from the four candidate color representations, 12×2+3+16×2=59 bits are required for this mode.

Sometimes there are two groups of colors for which intensity modulation could be useful. It is then possible to modulate both base colors with the vectors (−d, −d, −d) and (d,d,d) to produce four candidate color representations. This mode is called the H-mode [6, 7], since the pattern can resemble the letter "H". Using RGB444 for both color codewords, and two bits per color index, 58−12×2−2×16=2 bits are left to specify the distance d (color modifier codeword), if we want to fit it in the bit budget of the 58-bit mode. However, since the H-pattern is completely symmetrical, we can swap the two color codewords and obtain exactly the same result. Thus, we can use this ordering trick to get an extra bit for d. The two most significant bits of d are stored explicitly, and the two color codewords col0 and col1 are treated as two 12-bit integers. If col0<col1, we set the least significant bit (LSB) in d to 0. However, if col0>col1, we set the LSB in d to 1. In this way, the variable d can be specified with three bits in both the "T"-mode and the "H"-mode, and the same look-up table can be used.

For the last mode, it is desirable to find a representation that can cope well with smoothly varying chrominances. Note that it is not important that this mode can handle all types of blocks, as long as those can be well represented with the previous four modes. Therefore a planar approximation of the color components in the block could be a good candidate [8]. While it may work poorly on most types of "regular" blocks (e.g., blocks containing edges), it can approximate slowly varying functions well.

In order to specify a plane, three points on the plane should be specified. This is equivalent to specifying the color in three specific points in the block. These three points are denoted $(R_0, G_0, B_0)$, $(R_H, G_H, B_H)$ and $(R_V, G_V, B_V)$. The red component can now be calculated anywhere in the block by using the equation 15:

$$R(x,y)=x(R_H-R_0)/4+y(R_v-R_0)/4+R_0 \qquad (15)$$

Where x, y are the coordinates of the image element in the 4×4 image block. The corresponding equation also applies to the other two color components.

The three plane points are stored as three RGB676 codewords, resulting in (6+7+6)×3=57 bits for the compressed block representation, which exactly fits the 57-bit mode.

Thus, the above present description illustrates the possibility of introducing an auxiliary mode for a default chrominance processing scheme, such as S3TC.

Decompression Examples

Three decompression examples are presented herein for further illustrating this aspect of the technology disclosed herein. In these examples, a default mode as described in connection with FIG. 25 and auxiliary modes as described in connection with FIGS. 26 and 28 are assumed. The compressed block representations have a layout as illustrated by FIG. 23. Note also that only the X-components of the image blocks are decoded in the examples.
Default Decompression
The compressed block representation has the following bit sequence:
00110101 01110011
101001100010110111000001010110001100101001111010
The first eight bits correspond to the first bit sequence, the second eight bits constitute the second bit sequence, while the remaining 48 bits are the component index sequence.
In this case, the first codeword bit sequence is, when interpreted as an integer value, smaller than the second bit sequence and the block should be processed according to the default mode. Component values are first determined based on the codeword sequences:
$00110101_{bin}=54$
$01110011_{bin}=115$
The six additional component values are then generated as linear combinations of these two values:

$$X_i = 53 + i \times \frac{115 - 63}{7}$$

The values are 61.86, 70.71, 79.57, 88.43, 97.29 and 106.14. Thus, the available candidate values will be 53, 61.86, 70.71, 79.57, 88.43, 97.29, 106.14 and 115. The first image element has index $101_{bin}$, which corresponds to 97.29. The second image element has $001_{bin}$ as its component index and should therefore use 61.86 as candidate value. This procedure is then repeated for the remaining image elements.
Auxiliary Decompression 1
The compressed block representation has the following bit sequence:
11110101 01110011
101001100010110111000001010110001100101001111010
In this case, the first codeword bit sequence is, when interpreted as an integer value, larger than the second bit sequence and the block should be processed according to the auxiliary mode (see FIG. 26).
The first eight bits correspond to the first bit sequence, the second eight bits constitute the second bit sequence, while the remaining 48 bits are the component index sequence. The MSB of the second codeword bit sequence does not carry any payload information.
When processing the 16 bits as illustrated in FIG. 43, the following 15-bit sequence is obtained:
111001111110101
The first seven bits could represent the first component value while the last eight bits represent the second component value. The first seven bits are expanded into eight bits:
$1110011 \rightarrow 11100111_{bin}=231$
$11110101_{bin}=245$
In this illustrative example .alpha.=0.75 so the intermediate value becomes
$0.75 \times 231 + 0.25 \times 245 = 234.5$
Five additional values are then calculated as linear combinations of the first component value and the intermediate value:

$$X_i = 231 + i \times \frac{234.5 - 231}{6}$$

The values are 231.58, 232.17, 232.75, 233.33 and 233.92. Thus, the available candidate values will be 231, 231.58, 232.17, 232.75, 233.33, 233.92, 234.5 and 245. The first image element has index $101_{bin}$, which corresponds to 233.92. The second image element has $001_{bin}$ as its component index and should therefore use 232.17 as candidate value. This procedure is then repeated for the remaining image elements.
Auxiliary Decompression 2
The compressed block representation has the following bit sequence:
11110101 11010011
101001100010110111000001010110001100101001111010
In this case, the first codeword bit sequence is, when interpreted as an integer value, larger than the second bit sequence and the block should be processed according to the auxiliary mode (see FIG. 28).
The first eight bits correspond to the first bit sequence, the second eight bits constitute the second bit sequence, while the remaining 48 bits are the component index sequence. The MSB of the second codeword bit sequence does not carry any payload information. The following eleven bits constitute a first codeword, while the last four bits of the second codeword bit sequence is a second codeword.
When processing the 16 bits as illustrated in FIG. 43, the following 15-bit sequence is obtained:
010110000001010
Component values are first determined based on the codeword sequences. The eleven bits are used to generate the first component value in the format 8.3:
Integer bits: $01011000_{bin}=88$
Fractional bits: $000_{bin}=0$
The first component value is thus 88. The second codeword represents a distance value in the format 2.2:
Integer bits: $10_{bin}=2$
Fractional bits: $10_{bin}=0.5$
The second component value is then obtained as 88+2.5=90.5.
The six additional component values are then generated as linear combinations of these two values:

$$X_1 = 88 + i \times \frac{90.5 - 88}{7}$$

The values are 88.36, 88.71, 89.07, 89.43, 89.79 and 90.14. Thus, the available candidate values will be 88, 88.36, 88.71, 89.07, 89.43, 89.79, 90.14 and 90.5. The first image element has index $101_{bin}$, which corresponds to 89.79. The second image element has $001_{bin}$ as its component index and should therefore use 88.71 as candidate value. This procedure is then repeated for the remaining image elements.
Compression
FIG. 33 illustrates a (lossy) method of encoding an image according to an aspect of the technology disclosed herein. In a first step S100, the image is decomposed or divided into a number of image blocks. Each such image block comprises multiple, i.e. at least two, image elements. In a preferred embodiment of the technology disclosed herein, an image block comprises sixteen image elements (pixels, texels or voxels) and has a size of $2^m \times 2^n$ image elements, where m=4−n and n=0, 1, 2, 3, 4. More preferably, m and n are both 2. It could also be possible to utilize an image block of size $2^m \times 2^n$ or $2^m \times 2^n \times 2^p$ image elements, where m, n, p are zero or positive integers with the proviso that not all of m, n, p may simultaneously be zero. FIG. 2 schematically illustrates an example of an image block 600 with sixteen image elements 610 according to the present technology disclosed herein. The figure also schematically illustrates the different feature vectors 615 associated with the image elements 610. In an alternative embodiment of the technology disclosed herein, the image is decomposed into a number of image sub-blocks, preferably having a size of 2×4 or 4×2 image elements. In such a case, two such sub-blocks could be handled together during compression to form a 4×4 block 600 as illustrated in FIG. 2. Returning to FIG. 33, the whole image block is preferably decomposed into (non-overlapping) image blocks in step S100. However, in some applications, only a portion of an image is encoded and, thus, only this portion is decomposed into image blocks.

The following steps S101 and S105 perform an encoding or compression of the image blocks. Firstly, in step S101 a default compressed representation of the image block is generated by compressing the image block according to a default compressing mode. This compressed block representation comprises at least a first codeword bit sequence and a second codeword bit sequence. In addition, in this default compressing mode the first codeword bit sequence will be smaller than the second codeword bit sequence in terms of bit values. All the bits in these two bit sequences can be used for carrying payload information and each of the bits is dependent solely on a respective single bit of the first or second codeword bit sequence at a position defined based on the actual decodable bit.

In a next step S102, a default error representation indicative of representing the image block with the generated default compressed representation is estimated. This step S102 basically involves decompressing the default compressed block according to a corresponding default decompressing mode to generate a decompressed block representation. The component values of this decompressed block representations are then compared to the original feature vector components of the unprocessed image block to get the error estimate $\epsilon^2$, see equation 16:

$$\varepsilon^2 = \sum_{i=0}^{3} \sum_{j=}^{3} \left( (X_{ij} - X_{ij}^0)^2 \right) \quad (16)$$

where $X_{ij}$ is the component value for image element (i, j) in the block as obtained from the default decompression and $X_{IJ}^0$ is the original feature vector value for that image element.

A next step S103 compresses the original image block (or a copy thereof) according to an auxiliary compressing mode to generate an auxiliary compressed block representation. This compressed block comprises at least the first and second codeword bit sequence. However, in clear contrast to the default mode processing in step S101, the first codeword bit sequence is now equal to or larger than the second codeword bit sequence. In addition, not all bits of these two sequences will carry payload information. Instead each decodable bit (payload information carrying bit) is dependent on i) a bit of a predefined bit position within the first or second bit sequence (typically the MSB of the first or second bit sequence) and ii) another bit of the two bit sequences at a position defined based on the decodable bit. However, even if the default compressed block has access to fewer bits for carrying payload information, the size in terms of total number of bits of the auxiliary compressed block is preferably the same as for a default compressed block.

An auxiliary error representation is estimated for the auxiliary block representation in step S104. This error estimate is indicative of representing the original feature vector components of the block with the component values obtainable from the auxiliary compressed representation. The error is estimated in a similar manner to what was described in connection with step S102 with the exception of using the auxiliary compressed block instead of the default compressed block.

In the next step S105, a compressed block representation to use for the current image block is selected from the default compressed block and the auxiliary compressed block. This selection is performed based on the error estimates calculated in steps S102 and S104. Thus, the compressed block representation that resulted in the smallest error estimate and which therefore is best suited to represent the original block in terms of PSNR is selected in this step S105.

The steps S101 to S105 are preferably repeated for all image blocks provided during the decomposing of step S100 (schematically illustrated by line L9). Note that due to the dynamic selection of compression mode of the technology disclosed herein, all of the resulting compressed blocks can have been generated according to the default or the auxiliary compressing mode. However, for most practical textures, some of the compressed blocks will be generated according the default mode while the remaining blocks are generated according to the auxiliary mode. The result is then a sequence or file of encoded image blocks. The resulting encoded image blocks (encoded representations of the image blocks) could be ordered in a file from left to right and top to bottom in the same order in which they were broken down in the block decomposing of step S100. The method then ends.

The encoded image can then be provided to a memory for storage therein until a subsequent rendering, e.g. display, of the image. Furthermore, the encoded image can be provided as a signal of encoded block representations to a transmitter for (wireless or wired) transmission to another unit.

FIG. 34 is a flow diagram illustrating an embodiment of the default compressing step S102 of FIG. 33 in more detail. This default mode corresponds to the compression according to 3Dc. The method continues from step S100 of FIG. 33. In a next step S110, two component codewords are determined as the first and second codeword bit sequence. This determination is performed based on the original feature vector (X or Y) components of the image elements in the block. These two codewords then represent the first and second component values. In a typical implementation, the first codeword is set to be equal to the smallest feature vector component of the image elements, while the second codeword will be equal to the largest feature vector component.

A next step S111 generates at least one, typically six, additional component values from the two determined codewords or the two component values represented by the codewords. This step S111 basically corresponds to the step S61 of FIG. 25 and is not described further herein.

Preferably eight candidate values are now available, the first and second component values and the six additional component values. The original feature vector components of the image elements are then each represented by one of these eight candidate values. This involves selecting the candidate value that is closest to the original vector component unless one of the candidate values is actually equal to the vector component, in which case that candidate value is selected. In step S112, the component index associated with the selected candidate value is provided for the current image element. This step S112 is then repeated for all image elements in the block (schematically illustrated by the line L10). The resulting default compressed image block will then contain the two (8-bit) codeword bit sequence and the 16 3-bit component indices. The procedure of steps S110 to S112 is also preferably repeated for the other feature vector component (Y or X). The method then continues to step S102 of FIG. 33.

FIG. 35 is a flow diagram of an embodiment of the auxiliary compressing step S103 of FIG. 33 in more detail. The method continues from step S102 of FIG. 33. The next step S120 determines a first codeword, a second codeword and a non-payload encoding bit that together constitutes or forms the first and second codeword bit sequence. The first codeword is determined to be a representation of a first component value and the second codeword is a corresponding representation of a second representation value. The determination of the two codewords is performed based on at least a portion of the original feature vector (X or Y) components in the block, preferably based on all the vector components. In addition, the determination of the codewords and the non-encoding bit at a predefined position within the first or second codeword bit sequence must be performed so that the first codeword bit sequence is equal to or larger than the second codeword bit sequence. One of the first and second codewords could be a representation of the smallest original feature vector component in the block, while the other codeword is then a representation of the largest original feature vector component.

A next step S121 calculates at least one intermediate component value based on the first and second codewords or the first and second component values. This step S121 corresponds to step S71 of FIG. 26 and is not described further herein. At least one additional component value is then calculated in step S122 based on the at least one intermediate component value and one of the first and second component values (or codewords). This step S122 corresponds to step S72 of FIG. 26 and the discussion thereof in connection with FIG. 26 applies mutatis mutandis to step S122.

Preferably eight candidate values are now available. In a first embodiment they include the first and second component values, one intermediate component value and five additional values. In a second embodiment, two intermediate values are available in addition to the first and second component values and four additional values. A candidate value that best represents the original feature vector component of an image element is selected and the component index associated with the selected candidate value is assigned to the image element in step S123. This step is performed in a manner similar to step S112 of FIG. 34 and is preferably repeated for all image elements in the block (schematically illustrated by the line L11). The steps S120 to S123 are then preferably performed for the other feature vector component. The method continues to step S104 of FIG. 33.

FIG. 36 is a flow diagram of another embodiment of the auxiliary compressing step of FIG. 33. The method continues from step S102 of FIG. 33. A next step S130 determines a first codeword and a second or difference codeword together with the non-encoding bit of a predefined position within the auxiliary compressed block. These three components together form the first and second codeword bit sequences. The two codewords are determined based on at least a portion of the original feature vector components of the image elements, preferably based on all the (X or Y) vector components. The first codeword could then be a, possible quantized or compressed, version of the smallest or largest vector component in the block. The second codeword does not directly represent a vector component but is instead a representation of a difference or distance value. The codeword could therefore be a, possibly quantized, version of the difference between the smallest and largest vector component in the block. The non-encoding bit is defined so that when the non-encoding bit, first and second codewords are laid out together, the first codeword bit sequence will be equal to or larger than the second codeword bit sequence.

The step S131 calculates a first component value from the first codeword, typically by expanding the codeword, if necessary, into eight bits. A corresponding second component value is generated, in step S132, based on the first and second codewords or based on the first component value and the distance value represented by the second codeword and possibly expanded into eight bits if necessary.

Optionally, but preferably, at least one additional component value is calculated from the first and second component values. This step S133 corresponds to step S83 of FIG. 28 and is not described further.

Preferably eight candidate values are now available as representations for the original feature vector components in the block. These values include the two component values and, preferably six, additional component values. The step S134 selects which of these candidate values to use for the different image elements (schematically illustrated by the line L12) and provides corresponding component indices. The step is performed in a same manner as step S112 of FIG. 34 and step S123 of FIG. 35. The steps S130 to S134 are then preferably performed for the other feature vector component. The method continues to step S104 of FIG. 33.

In FIG. 33 a selection between the default mode and one auxiliary mode was made. In similarity to FIG. 29 multiple alternative auxiliary compressing modes could be available if the two X- and Y-vectors components of the surface normals are handled together. In such a case, four different compressed versions of an input image block are generated and four different error estimates are calculated. The compressed block representation resulting in the smallest error estimate is then used as compressed representation of the image block, while the other non-selected versions are discarded.

The different compressed representations then contain at least a first 700, second 710, third 730 and fourth 740 codeword bit sequence, see FIG. 4. The first 710 and second 710 codeword sequences handles the first (X) normal component and the two remaining codeword sequences 730, 740 relate to the other (Y) normal component. Note though that these four codeword bit sequences not necessarily need to be interpreted in a same way depending on the actual mode used for generating them.

The default compressed representation is generated so that the first codeword bit sequence is smaller than the second codeword bit sequence and the third codeword bit sequence is smaller than the fourth codeword bit sequence. All of the bits in these four codeword sequences can carry useful payload information.

The first auxiliary compressed block representation has a first codeword bit sequence that is equal to or larger, when interpreted as integer value, than the second codeword bit sequence, while the third codeword bit sequence is smaller than the fourth codeword bit sequence. One of the bits in the first or second codeword bit sequences is a non-encoding bit that cannot carry any payload information. Each remaining bit of these sequences is dependent on this non-encoding bit and a respective other bit in the first or second sequence at a position defined by the relevant bit. All bits are encoding bits in the third and fourth codeword bit sequence.

In the second auxiliary compressed block, all bits of the first and second sequences are encoding bits, while one bit of the third or fourth codeword bit sequence cannot carry any payload information. In addition, the first codeword bit sequence is smaller than the second sequence and the third sequence is equal to or larger than the fourth codeword bit sequence, when interpreted as integers.

The third auxiliary compressed block has a first/third codeword bit sequence that is equal to or larger than the second/fourth codeword bit sequence. One bit in the first or second bit sequence and one bit in the third and fourth bit sequence does not carry any payload information.

Implementation Aspects

The image encoding (image block encoding) and image decoding (image block decoding or processing) scheme according to the technology disclosed herein could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

User Terminal

The discussion above in connection to FIG. 9 also applies to this aspect of the technology disclosed herein.

Image and Block Encoder

FIG. 37 illustrates a block diagram of an embodiment of an image encoder 210 according to the technology disclosed herein. The encoder 210 typically comprises an image decomposer 215 for decomposing or dividing an input image into several image blocks. The decomposer 215 is preferably configured for decomposing the image into image blocks comprising sixteen image elements (pixels, texels or voxels), i.e. having a general size of 4×4 image elements. This decomposer 215 could be adapted for decomposing different input images into image blocks with different sizes. In such a case, the decomposer 215 preferably receives input information, enabling identification of which image block format to use for a given image.

This embodiment of the image encoder 210 comprises a block encoder 500. This block encoder 500 encodes the image block(s) received from the image decomposer to generate encoded block representation(s). The overall size of the block representation is smaller than the corresponding size of the uncoded image block. The block encoder 500 is preferably configured for processing (encoding) each image block from the decomposer 215 sequentially.

The block encoder 500 comprises or has access to a default compressor 510 that compresses an input image block according to a default compressing mode, such as 3Dc or S3TC. The resulting default compressed block comprises at least a first and a second codeword bit sequence, where the bit value of the first sequence is smaller than the second bit sequence. In addition, each decodable bit of these two sequences depend only on a single bit within these sequences at a position defined based on the particular bit to be decoded.

An auxiliary compressor 530 is likewise arranged in the encoder 500 for compressing the input block according to one or multiple alternative auxiliary compressing modes. For example, the auxiliary compressor 530 could generate one auxiliary compressed block if one auxiliary mode is available or three different auxiliary compressed blocks if there are three possible auxiliary modes. The auxiliary compressed block likewise comprises at least a first and a second codeword bit sequence. However, in contrast to the default mode, the bit value of the first sequence is equal to or larger than the second codeword bit sequence. In addition, not all bits in these two sequences are decodable and carry payload information. Furthermore, each decodable bit in the sequences is dependent on a non-payload-carrying bit at a predefined position within the first or second sequence and a bit at a bit position within the sequences defined based on the given decodable bit.

An error estimator 520 is arranged in the encoder 500 for estimating a respective error indicative of representing the input image block with the default compressed block from the default compressor 510 or the at least one auxiliary compressed block from the auxiliary compressor 530. The error estimates are output to a representation selector 540 that uses the estimates for selecting which compressed version to use for the input block. This selector 540 preferably selects the compressed representation that resulted in the smallest error value as determined by the estimator 520 and thereby best represents the original features of the image block.

The units 215, 500, 510, 520 and 530 of the image encoder 210 may be provided as software, hardware or a combination thereof. The units 215, 500, 510, 520 and 530 may be implemented together in the image encoder 210. Alternatively, a distributed implementation is also possible with some of the units provided elsewhere in the user terminal.

FIG. 38 is a schematic block diagram of a default compressor 510 adapted for compressing image block based on the 3Dc default mode. The compressor comprises a coordinate quantizer that determines the first codeword bit sequence as a representation of a first component value and the second codeword bit sequence as a representation of a second component value. The quantizer 512 performs this coordinate quantization and codeword determination based on original feature vector components of the image elements in the input block. An additional value generator 514 is arranged in the compressor 510 for calculating at least one, preferably, six additional component values based on the two codeword bit sequences from the quantizer 512. These (six) additional component values constitute together with the first and second component values the candidate values available for representing the original vector components of the block. An index provider 516 receives these candidate values from the quantizer 512 and the value generator 514. The provider 516 then determines, for each image element in the block, which candidate value that best represents the original vector component of that image element. The provider 516 also assigns a component index associated with the selected candidate value to the image element.

As the image elements preferably each comprises two feature vector components, the above described operation of the quantizer 512, generator 514 and provider 516 is preferably performed, in parallel or in sequence, for the two vector components.

The units 512, 514 and 516 of the default compressor 510 may be provided as software, hardware or a combination thereof. The units 512, 514 and 516 may be implemented together in the default compressor 510. Alternatively, a distributed implementation is also possible with some of the units provided elsewhere in the block encoder.

FIG. 39 is a schematic block diagram of an auxiliary compressor 530 according to an embodiment of the technology disclosed herein adapted to usage in connection with a default compressor operating according to the 3Dc scheme. A coordinate quantizer 532 of the compressor 530 uses at least a portion of the original feature vector components in the input block for determining a first codeword as a representation of a first component value, a second codeword as a representation of a second component value and the bit of the predefined bit position. These codewords and the determined bit together form the first and second codeword bit sequence.

An intermediate value generator 534 calculates at least one intermediate component value as defined linear combination(s) of the first and second component values as previously described. The compressor 530 also comprises an additional value calculator 536 that receives the first and/or second component values or codewords from the quantizer 532 and the intermediate value(s) from the generator 534. The calculator 536 calculates at least one additional component value as linear combination(s) of the input data. Thus, each such additional component value will be a linear combination of the intermediate value and one of the first and second component values. The first and second component values, the intermediate value(s) and the additional value(s) collectively form the candidate values available for the input block. The generator 534 and calculator 536 are preferably configured for determining enough intermediate and additional values to form in total eight candidate values.

An index provider 538 is arranged for selecting a respective candidate value as originating from the quantizer 532, the generator 534 and the calculator 536 for each image element in the block and providing the associated index of the selected value. The operation of this provider 538 is similar to the index provider described in connection with FIG. 38.

In an alternative embodiment, the coordinate quantizer 532 determines the first codeword to be a representation of a first component value and the second codeword to be a difference or distance representation in addition to the non-encoding bit at the predefined bit position. In this embodiment, the value generator 534 determines the second component value from the first component value or codeword and the difference representation as previously described. In a preferred implementation, the first and second component values are forwarded to the additional value calculator for generation of at least one, preferably six, additional component values. These additional values are preferable calculated as linear combinations of the input component values. Together these optional additional values and the first and second component values constitute the candidate values available for the image block. The index provider 538 provides component indices for the image elements in the block, which indices being associated with the different candidate component values. This provider 538 operates as previously described.

The units 532, 534, 536 and 538 of the auxiliary compressor 530 may be provided as software, hardware or a combination thereof. The units 532, 534, 536 and 538 may be implemented together in the auxiliary compressor 530. Alternatively, a distributed implementation is also possible with some of the units provided elsewhere in the block encoder.

Image and Block Decoder

FIG. 40 illustrates a block diagram of an embodiment of an image decoder 220 according to the technology disclosed herein. The image decoder 220 preferably comprises a block selector 222 that is adapted for selecting, e.g. from a memory, which encoded image block(s) that should be provided to a block decoder 800 for decoding. The block selector 222 preferably receives input information associated with the encoded image data, e.g. from a header or a rendering engine. An address of an encoded image block having the desired image element(s) is then computed based on the input information. This computed address is preferably dependent upon the image-element (pixel, texel or voxel) coordinates within an image. Using the address, the block selector 222 identifies the encoded image block from the memory. This identified encoded image block is then fetched from the storage and provided to the block decoder 800.

The (random) access to image elements of an image block advantageously enables selective decoding of only those portions of an image that are needed. Furthermore, the image can be decoded in any order the data is required. For example, in texture mapping only portions of the texture may be required and these portions will generally be required in a non-sequential order. Thus, the image decoding of the technology disclosed herein can with advantage by applied to process only a portion or section of an image.

The selected encoded image block is then forwarded to the block decoder 800. In addition to the image block, the decoder 800 preferably receives information specifying which image elements of the block that should be decoded. The information could specify that the whole image block, i.e. all image elements therein, should be decoded. However, the received information could identify only a single or a few of the image elements that should be decoded. The block decoder 800 comprises a mode selector 830 that is used for selecting the particular decompression mode to use for the compressed block. This mode selector 830 investigates a first and a second codeword bit sequence of the compressed block and checks whether the first codeword bit sequence is smaller than the second codeword bit sequence. As the two sequences preferably comprise the same number of bits, this comparison can be performed in a simple bit-by-bit comparison starting from the MSB of the respective sequence. If the first bit sequence is indeed smaller than the second sequence, the input compressed block is forwarded to the default decompressor 810. The compressed block is likewise forwarded to an auxiliary decompressor 820 in the case the first sequence is equal to or larger than the second codeword bit sequence.

The default decompressor 810 processes the compressed block for generating a default decompressed representation of at least a portion of the image block. In this decompression, each bit position of the compressed block only depends on the bit value at that particular position. In clear contrast, the auxiliary decompressor 820 processes the compressed block for generating an auxiliary decompressed representation of at least a portion of the image block. This auxiliary decompression requires, for each decodable bit of the first and second bit position, usage of a non-decodable bit at the predefined bit position in the sequences and an encoding bit at a bit position defined based on the bit to the decoded.

In an alternative approach, the compressed block could be input to both the default 810 and auxiliary decompressor 820 that will then, in parallel or sequence, process the block to generate a default and auxiliary decompressed block version, respectively. The mode selector 830 then selects which of the two decompressed block versions to use. Thus, the selection can be performed before or after the actual decompression operations. In either case, the generated decoded representation of the image element(s) in the block are preferably a P-bit X-coordinate value and a P-bit Y-coordinate value, where P is the number of bits per X- and Y-coordinate per image element in the original image. Alternatively, the decoded representations could be a Q-bit color value.

It is anticipated by the technology disclosed herein that the block decoder 800 could comprise multiple different auxiliary decompressors 820, such as three decompressors 820. These decompressors could then operate according to the previously described auxiliary decompression modes.

An optional image composer 224 could be provided in the image decoder 220. This composer receives the decoded image elements from the block decoder 800 and composes them to generate a pixel that can be rendered or displayed on a screen. This image composer 224 could alternatively be provided in the graphic system.

Alternatively, the image decoder 220 comprises multiple block decoders 800. By having access to multiple block decoders 800, the image decoder 220 can process (decode) multiple encoded image blocks in parallel. These multiple block decoders 800 allow for parallel processing that increases the processing performance and efficiency of the image decoder 220.

The units 222, 224, 800, 810, 820 and 830 of the image decoder 220 may be provided as software, hardware or a combination thereof. The units 222, 224, 800, 810, 820 and 830 may be implemented together in the image decoder 220. Alternatively, a distributed implementation is also possible with some of the units provided elsewhere in the user terminal.

FIG. 41 is an illustration of an embodiment of a default decompressor 810 according to an embodiment of the technology disclosed herein. This decompressor embodiment operates according to the 3Dc mode. The decompressor 810 comprises a value generator 812 for generating a first component value based on the first codeword bit sequence and for generating a second component value based on the second codeword bit sequence. Alternatively, two separate generators could be provided in the decompressor 810 for determining the first and second component values, respectively. If the bit sequences are each of eight bits, the generator 812 simply extracts them from the compressed block representation. The two component values are then input to an additional value calculator 814 that calculates preferably six additional component values based on the two input values. This calculator 814 operates in a similar manner to the calculator of FIG. 38.

The resulting additional values and the two component values are forwarded to a value selector 816. This selector uses the component indices of the image elements found in the compressed block to select which particular component value of the eight input values to use as a representation of the original feature vector components of the image elements.

The operation of these three units 812, 814, 816 are preferably performed for both (X and Y) components of the image elements.

The units 812, 814 and 816 of the default decompressor 810 may be provided as software, hardware or a combination thereof. The units 812, 814 and 816 may be implemented together in the default decompressor 810. Alternatively, a distributed implementation is also possible with some of the units provided elsewhere in the block decoder.

FIG. 42 is a corresponding schematic block diagram of an embodiment of an auxiliary decompressor 820 according to the technology disclosed herein that can be implemented in a block decoder together with the default decompressor of FIG. 41. The decompressor 820 comprises a value generator 822 for determining i) generating a first component value based on a first portion of the first and second codeword bit sequences and the non-encoding bit at the predefined positions within these two bit sequences and ii) generating a second component value based on a second portion of the two bit sequences and the non-encoding bit. This generation could in the form of simply extracting e.g. the first portion to get the first component value. However, if any of the portions are of few bits than the corresponding component value, the component value is obtained by expanding the extracted bit sequence into the correct number of bits.

An intermediate value generator 824 and additional value calculator 826 are provided for generating intermediate component value(s) and additional component value(s) are previously described with reference to FIG. 39. The output values from the generators 822, 824 and calculator 826 are input as candidate values to the value selector 828. The selector selects one of them to use for a current image element to be decoded based on the assigned component index of that image element.

In an alternative embodiment, the value generator 822 generates the first component value as described above. The generator 822 also generates a difference or distance representation based on a second portion of the two codeword bit sequences and the predefined bit position. The generator 822 uses this difference representation together with the first component value for obtaining the second component value. The two resulting component values are optionally but preferably input to the additional value calculator for calculation of additional component values 826. The selector 828 then selects, using the component indices, between the two component values and the additional component values.

The units 822, 824, 826 and 828 of the auxiliary decompressor 820 may be provided as software, hardware or a combination thereof. The units 822, 824, 826 and 828 may be implemented together in the auxiliary decompressor 820. Alternatively, a distributed implementation is also possible with some of the units provided elsewhere in the block decoder.

In the foregoing, particular embodiments of compressors and decompressors have been described in connection with 3Dc as the default mode and suitable auxiliary modes that complements 3Dc. However, the default compressor/decompressor could alternatively operate according to the previously described S3TC or some other scheme adapted for handling chrominance vectors. In such a case, the auxiliary compressor/decompressor operates on those image blocks S3TC does not handle effectively, e.g. according to one of the previously mentioned modes.

It will be understood by a person skilled in the art that various modifications and changes may be made to the technology disclosed herein without departure from the scope thereof, which is defined by the appended claims.

REFERENCES

[1] http://www.ati.com/products/radeonx800/3DcWhitePaper.pdf ATI™ Radeon™ X800 3Dc™ White Paper
[2] U.S. Pat. No. 5,956,431
[3] Munkberg, Akenine-Möller and Ström, "High-Quality Normal Map compression", *Graphics Hardware* (2006), ACM Press, pp. 96-101
[4] WO 2006/006915
[5] Ström and Akenine-Möller, "iPACKMAN: High Quality, Low Complexity Texture Compression for Mobile Phones", *Graphics Hardware* (2005), ACM Press, pp. 63-70
[6] PCT/SE2006/000885
[7] PETTERSSON, M., and STRÖM, J. 2005. Texture Compression: THUMB-Two Hues Using Modified Brightness. *Proceedings of Sigrad, Lund*, pp. 7-12
[8] WO 2006/126949

What is claimed is:

1. A method of processing a compressed representation of an image block comprising multiple image elements, said compressed representation comprising a first, a second, a third and a fourth codeword and a component index sequence, said method comprising the steps of:
   determining a first component value based at least partly on said first codeword;
   determining a second component value based at least partly on said second codeword;
   determining a third component value based at least partly on said third codeword;
   determining a fourth component value based at least partly on said fourth codeword;
   selecting, based on said codewords or said component values, a first resolution number $N_1$ and a second resolution number $N_2$, where $N_1$ is a non-zero integer and N2 is a non-zero integer;

generating, based on said first and second codewords or said first and second component values, $N_1$ first additional component values;

generating, based on said third and fourth codewords or said third and fourth component values and, N2 second additional component values;

for at least one image element in said image block:

selecting, based on said component index sequence, a component value from i) said first component value, ii) said second component value, iii) said $N_1$ first additional component value; and selecting, based on said component index sequence, a component value from i) said third component value, ii) said fourth component value, iii) said N2 second additional component values.

2. The method according to claim 1, wherein said step of selecting said resolution numbers comprises selecting, based on a comparison of said codewords or said component values, said first resolution number $N_1$ and said second resolution number $N_2$.

3. The method according to claim 1, wherein said step of generating said first additional component values comprises generating said $N_1$ first additional component values as linear combinations of said first component value and said second component value, and said step of generating said second additional component values comprises generating said $N_2$ second additional component values as linear combinations of said third component value and said fourth component value.

4. The method according to claim 1, wherein said first vector components, said first component value, said second component value and said $N_1$ first additional component values constitute a first coordinate of a normalized surface normal, and said second vector components, said third component value, said fourth component value and said $N_2$ second additional component values constitute a second coordinate of said normalized surface normal.

5. The method according to claim 1, wherein said step of selecting said resolution numbers comprises the steps of:

selecting, based on a comparison of said codewords or said component values, said first resolution number $N_1$ from a first default resolution value $N_1^D$, a first increased resolution value $N_1^I$, and a first reduced resolution value $N_1^R$, where $N_1^R < N_1^D < N_1^I$; and selecting, based on a comparison of said codewords or said component values, said second resolution number $N_2$ from a second default resolution value $N_2^D$, a second reduced resolution value $N_2^R$ and a second increased resolution value $N_2^I$, where $N_2^R < N_2^D < N_2^I$.

6. The method according to claim 5, wherein said steps of selecting said first resolution number and said second resolution number comprise selecting, if a quotient of a difference between said second component value and said first component value and a difference between said fourth component value and said third component value or a quotient of a difference between said second codeword and said first codeword and a difference between said fourth codeword and said third codeword exceeds a maximum threshold, said first increased resolution value $N_1^I$ and said second reduced resolution value $N_2^R$.

7. The method according to claim 5, wherein said steps of selecting said first resolution number and said second resolution number comprise selecting, if a quotient of a difference between said second component value and said first component value and a difference between said fourth component value and said third component value or a quotient of a difference between said second codeword and said first codeword and a difference between said fourth codeword and said third codeword is smaller than a minimum threshold, said first reduced resolution value $N_1^R$ and second increased resolution value $N_2^I$.

8. The method according to claim 5, wherein said steps of selecting said first resolution number and said second resolution number comprise selecting, if a quotient of a difference between said second component value and said first component value and a difference between said fourth component value and said third component value or a quotient of a difference between said second codeword and said first codeword and a difference between said fourth codeword and said third codeword is within a interval defined by a maximum threshold and a minimum threshold, said first default resolution value $N_1^D$ and said second default resolution value $N_2^D$.

9. The method according to claim 5, wherein said first default resolution value $N_1^D$ is six, said first increased resolution value $N_1^I$ is fourteen or thirty, said second default resolution value $N_2^D$ is six and said second reduced resolution value $N_2^R$ is two or zero.

10. A system for processing a compressed representation of an image block comprising multiple image elements, said compressed representation comprising a first, a second, a third and a fourth codeword and a value index sequence, said system comprising:

a first value generator for determining a first component value based at least partly on said first codeword;

a second value generator for determining a second component value based at least partly said second codeword;

a third value generator for determining a third component value based at least partly said third codeword;

a fourth value generator for determining a fourth component value based at least partly on said fourth codeword;

a resolution selector for selecting, based on said codewords or said component values, a first resolution number $N_1$ and a second resolution number $N_2$, where $N_1$ is a non-zero integer and $N_2$ a non-zero integer;

a first additional value generator for generating, based on said first and second codewords or said first and second component values $N_1$, $N_1$ first additional component values;

a second additional value generator for generating, based on said third and fourth codewords or said third and fourth component values, $N_2$ second additional component values;

a first value selector for selecting, for at least one image element in said image block and based on said component index sequence, a component value from i) said first component value, ii) said second component value, iii) said $N_1$ first additional component values; and a second value selector for selecting, for said at least one image element and based on said component index sequence, a component value from i) said third representation value, ii) said fourth component value, iii) said $N_2$ second additional component values.

11. The system according to claim 10, wherein said resolution selector is arranged for selecting, based on a comparison of said codewords or said component values, said first resolution number $N_1$ and said second resolution number $N_2$.

12. The system according to claim 10, wherein said first additional value generator is arranged for generating said $N_1$ first additional component values as linear combinations of said first component value and said second component value and said second additional value generator is arranged for generating said $N_2$ second additional component values as linear combinations of said third component value and said fourth component value.

13. The system according to claim 10, wherein said resolution selector is arranged for selecting, based on a comparison of said codewords or said component values, said first resolution number $N_1$ from a first default resolution value $N_1^D$, a first increased resolution value $N_1^I$ and a first reduced resolution value $N_1^R$, where $N_1^R<N_1^D<N_1^I$, and said second resolution number $N_2$ from a second default resolution value $N_2^D$, a second reduced resolution value $N_2^R$ and a second increased resolution value $N_2^I$, where $N_2^R<N_2^D<N_2^I$.

14. The system according to claim 13, wherein said resolution selector comprises:
   a quotient calculator for calculating a quotient of a difference between said second component value and said first component value and a difference between said fourth component value and said third component value or a quotient of a difference between said second codeword and said first codeword and a difference between said fourth codeword and said third codeword; and
   a comparator for comparing said quotient with a maximum threshold, wherein said resolution selector is arranged for selecting said first increased resolution value $N_1^I$ and said second reduced resolution value $N_2^R$ if said comparator determines that said quotient exceeds said maximum threshold.

15. The system according to claim 13, wherein said resolution selector comprises:
   a quotient calculator for calculating a quotient of a difference between said second component value and said first component value and a difference between said fourth component value and said third component value or a quotient of a difference between said second codeword and said first codeword and a difference between said fourth codeword and said third codeword; and
   a comparator for comparing said quotient with a minimum threshold, wherein said resolution selector is arranged for selecting said first reduced resolution value $N_1^R$ and said second reduced resolution value $N_2^I$ if said comparator determines that said quotient is smaller than said minimum threshold.

16. The system according to claim 13, wherein said resolution selector comprises:
   a quotient calculator for calculating a quotient of a difference between said second component value and said first component value and a difference between said fourth component value and said third component value or a quotient of a difference between said second codeword and said first codeword and a difference between said fourth codeword and said third codeword; and
   a comparator for comparing said quotient with a minimum threshold, wherein said resolution selector is arranged for selecting wherein said resolution selector is arranged for selecting said first default resolution value $N_1^D$ and said second default resolution value $N_2^D$ if said comparator determines that said quotient is within an interval defined by a maximum threshold and a minimum threshold.

17. A user terminal comprising a system according to claim 10.

* * * * *

UNITED STATES PATENT AND TRADEMARK OFFICE
CERTIFICATE OF CORRECTION

| | | |
|---|---|---|
| PATENT NO. | : 8,644,627 B2 | Page 1 of 2 |
| APPLICATION NO. | : 13/747793 | |
| DATED | : February 4, 2014 | |
| INVENTOR(S) | : Akenine-Möller et al. | |

It is certified that error appears in the above-identified patent and that said Letters Patent is hereby corrected as shown below:

On the Title Page, in item (71), under "Applicant", in Column 1, Line 1, delete "Ericsson," and insert -- Ericsson (publ), --, therefor.

In the Specification:

In Column 1, Line 27, delete "performance" and insert -- performance. --, therefor.

In Column 9, Line 12, delete "It the" and insert -- If the --, therefor.

In Column 11, Line 23, delete "14 are" and insert -- are --, therefor.

In Column 11, Line 35, delete "$Y_{max}$ and" and insert -- $Y_{max}$ 22 and --, therefor.

In Column 12, Line 14, delete "second codeword 730," and insert -- second codeword 720, --, therefor.

In Column 16, Line 7, delete "these to values" and insert -- these two values --, therefor.

In Column 17, Line 58, delete "$01011004_{bin}=89$" and insert -- $01011001_{bin}=89$. --, therefor.

In Column 20, Line 40, delete "(central)" and insert -- central --, therefor.

In Column 21, Line 19, delete "decoder 200" and insert -- decoder 220 --, therefor.

In Column 27, Line 54, delete "selector 410" and insert -- selector 420 --, therefor.

In Column 33, Line 59, delete "$X_f$." and insert -- $X_f$: --, therefor.

Signed and Sealed this
Fifth Day of August, 2014

Michelle K. Lee
*Deputy Director of the United States Patent and Trademark Office*

CERTIFICATE OF CORRECTION (continued)
U.S. Pat. No. 8,644,627 B2

In Column 34, Line 65, delete "get_7_bits_back=" and insert -- get_7bits_back= --, therefor.

In Column 39, Line 9, delete "$X_f$," and insert -- $X_{min}$, --, therefor.

In Column 40, Line 1, delete "0<a<1." and insert -- $0<\alpha<1$. --, therefor.

In Column 40, Line 40, delete "$(X_{int\ nt}^I)$" and insert -- $(X_{int}^I)$ --, therefor.

In Column 46, Line 17, delete "of coil." and insert -- of col1. --, therefor.

In Column 47, Line 10, delete "inverval" and insert -- interval --, therefor.

In Column 48, Line 49, in Equation (15),
delete "$R(x,y)=x(R_H-R_0)/4+_Y(R_v-R_0)/4+R_0$" and
insert -- $R(x,y)=x(R_H-R_0)/4+y(R_v-R_0)/4+R_0$ --, therefor.

In Column 54, Line 38, delete "first 700, second 710," and
insert -- first 710, second 720, --, therefor.

In Column 54, Line 39, delete "second 710" and insert -- second 720 --, therefor.

In the Claims:

In Column 62, Line 29, in Claim 10, delete "partly said" and insert -- partly on said --, therefor.

In Column 62, Line 31, in Claim 10, delete "partly said" and insert -- partly on said --, therefor.

In Column 62, Line 37, in Claim 10, delete "$N_2$ a" and insert -- $N_2$ is a --, therefor.

In Column 62, Line 40, in Claim 10, delete "values $N_1$," and insert -- values, --, therefor.